(12) United States Patent
Wickramasekera

(10) Patent No.: US 10,985,689 B2
(45) Date of Patent: Apr. 20, 2021

(54) COLLAPSIBLE SHELTER

(71) Applicant: Ananda Wickramasekera, Cambridge, MA (US)

(72) Inventor: Ananda Wickramasekera, Cambridge, MA (US)

(*) Notice: Subject to any disclaimer, the term of this patent is extended or adjusted under 35 U.S.C. 154(b) by 0 days.

(21) Appl. No.: 15/597,084

(22) Filed: May 16, 2017

(65) Prior Publication Data

US 2017/0335561 A1    Nov. 23, 2017

Related U.S. Application Data

(60) Provisional application No. 62/337,806, filed on May 17, 2016.

(51) Int. Cl.
*E04B 1/34* (2006.01)
*E04H 1/12* (2006.01)
(Continued)

(52) U.S. Cl.
CPC ............... *H02S 20/30* (2014.12); *B60P 3/34* (2013.01); *E04B 1/3445* (2013.01);
(Continued)

(58) Field of Classification Search
CPC .. E04B 1/343; E04B 1/34336; E04B 1/34357; E04B 1/344; E04B 1/3445;
(Continued)

(56) References Cited

U.S. PATENT DOCUMENTS 3,186,754 A * 6/1965 Winstead .................. B60P 3/34
  296/164
3,398,850 A * 8/1968 Kennard ............... E04B 1/3445
  220/6
(Continued)

FOREIGN PATENT DOCUMENTS

CA    2227003 A1 *  7/1999  ........... E04B 1/3445
DE    2305028 A1 *  8/1973  ......... E04B 1/34807
(Continued)

OTHER PUBLICATIONS

Machine Translation DE9100463; http://translationportal.epo.org/emtp/translate/?ACTION=description-retrieval&COUNTRY=DE&ENGINE=google&FORMAT=docdb&KIND=U1&LOCALE=en_EP&NUMBER=9100463&OPS=ops.epo.org/3.2&SRCLANG=de&TRGLANG=en; Dec. 18, 2018 (Year: 2018).*
(Continued)

*Primary Examiner* — Ryan D Kwiecinski
(74) *Attorney, Agent, or Firm* — Winston & Strawn LLP

(57) ABSTRACT

A shelter or camper that provides improved portability and protection. The shelter or camper may include rigid walls to offer greater protection from weather, animals, and theft. The shelter or camper may be transitionable between different configurations for different purposes, including an open and expanded configuration for use as a shelter, camper, or sleeping quarters and a compact, closed case configuration for easy storage and transport. To facilitate this, the walls may be foldable, expandable, or collapsible. When the walls are folded or collapsed, roof and floor sections may be connected to each other and may enclose the folded, collapsed walls and internal components within the collapsed closed case.

26 Claims, 34 Drawing Sheets

(51) Int. Cl.
  *B60P 3/34* (2006.01)
  *H02S 20/30* (2014.01)
  *E04B 1/344* (2006.01)
  *E04B 1/343* (2006.01)

(52) U.S. Cl.
  CPC ...... *E04B 1/34336* (2013.01); *E04B 1/34357* (2013.01); *E04B 1/34363* (2013.01); *E04H 1/1205* (2013.01)

(58) Field of Classification Search
  CPC ..... E04B 1/34363; E04H 1/1205; E04H 1/02; E04H 1/1244; E04H 9/16; B60P 3/32; B60P 3/34
  See application file for complete search history.

(56) References Cited

U.S. PATENT DOCUMENTS

| | | | | |
|---|---|---|---|---|
| 3,560,042 | A * | 2/1971 | McCarthy | B60P 3/34 296/170 |
| 3,575,460 | A * | 4/1971 | Kennedy | B60P 3/38 296/160 |
| 3,768,855 | A * | 10/1973 | Laue | B60P 3/34 296/26.02 |
| 3,796,342 | A * | 3/1974 | Sanders | B65D 11/1826 220/6 |
| 3,849,952 | A * | 11/1974 | Hanaoka | E04B 1/34807 52/79.5 |
| 4,166,343 | A * | 9/1979 | O'Brian | E04B 1/3445 296/173 |
| 5,493,818 | A * | 2/1996 | Wilson | E04B 1/3445 52/71 |
| 9,380,881 | B2 * | 7/2016 | Rasmussen | A47C 19/20 |
| 2010/0025397 | A1 * | 2/2010 | Krohn | B65D 88/522 220/6 |
| 2010/0186309 | A1 * | 7/2010 | Hawkins | E04B 1/3445 52/79.5 |
| 2011/0290291 | A1 * | 12/2011 | Neal | E04H 1/1244 135/96 |
| 2014/0159410 | A1 * | 6/2014 | Rasmussen | A47C 17/34 296/24.33 |
| 2017/0051497 | A1 * | 2/2017 | Kolbe | E04B 1/3445 |

FOREIGN PATENT DOCUMENTS

| | | | | |
|---|---|---|---|---|
| DE | 2454985 | A1 * | 5/1975 | ............... B65D 9/14 |
| DE | 2549938 | A1 * | 5/1977 | ........... E04B 1/3445 |
| DE | 9100463 | U1 * | 5/1992 | ........... E04B 1/3442 |
| DE | 9312714 | U1 * | 10/1993 | ........... B65D 88/524 |
| FR | 1484761 | A * | 6/1967 | ........... E04B 1/3445 |
| FR | 2826385 | A1 * | 12/2002 | ........... E04B 1/3445 |
| FR | 2876126 | A3 * | 4/2006 | ........... E04B 1/3445 |
| WO | WO-8907180 | A1 * | 8/1989 | ........... E04B 1/3445 |
| WO | WO-9005222 | A1 * | 5/1990 | ........... E04B 1/3445 |
| WO | WO-2011120075 | A1 * | 10/2011 | ........... E04B 1/3445 |
| WO | WO-2017103324 | A1 * | 6/2017 | ........... E04B 1/3445 |

OTHER PUBLICATIONS

Machine Translation DE2454985; http://translationportal.epo.org/emtp/translate/?ACTION=description-retrieval&COUNTRY=DE&ENGINE=google&FORMAT=docdb&KIND=A1&LOCALE=en_EP&NUMBER=2454985&OPS=ops.epo.org/3.2&SRCLANG=de&TRGLANG=en; Dec. 18, 2018 (Year: 2018).*
Autohome Rooftop Tents (http://www.autohomeus.com/) (last accessed Sep. 8, 2017).
Better Shelter by Ikea (http://www.bettershelter.org/product/) (last accessed Sep. 8, 2017).
Bigfoot Tents (http://www.bigfoottents.com/?gclid=CjwKEAjwgZrJBRDS38GH1Kv_vGYSJAD8j4Dfc-2UmFQA8AgYiZm5GWU0EKLHbOext1bDfaQRJ38ydBoCsW7w_wcB) (last accessed Sep. 8, 2017).
Brustner Trailer (http://thetinylife.com/burstner-trailer/) (last accessed Sep. 8, 2017).
Bundutec Roof Top Tents (bundutec.com.au) (last accessed Sep. 8, 2017).
CampLite Truck Campers (https://www.livinlite.com/products/camplite-truck-campers/) (last accessed Sep. 8, 2017).
Cascadia Rooftop Tents (https://cascadiatents.com/) (last accessed Sep. 8, 2017).
Cmax Systems (http://www.cmaxsystem.com/) (last accessed Sep. 8, 2017).
Collapsible shelter by Peter Anthony (http://www.portablebuildingstore.com/2013/05/collapsible-lightweight-portable-shelter-could-save-lives-in-disaster-situations/) (last accessed Sep. 8, 2017).
Designnobis Pop-up Disaster Relief Shelter (https://www.dezeen.com/2015/08/23/designnobis-pop-up-temporary-disaster-relief-shelter-earthquakes-tentative/) (last accessed Sep. 8, 2017).
Duffy Shelter (http://inhabitat.com/easy-to-assemble-flat-pack-trailer-can-be-used-as-emergency-shelter-or-for-glamping/) (last accessed Sep. 8, 2017).
EXO Shelter by Reaction Housing (https://www.treehugger.com/modular-design/reaction-housing-stacks-up-against-trailers.html) (last accessed Sep. 8, 2017).
Expedition Cabin (http://www.expedition-cabin.de/en/home.html) (last accessed Sep. 8, 2017).
FEMA trailer (https://en.wikipedia.org/wiki/FEMA_trailer) (last accessed Sep. 8, 2017).
Homie trailers (http://www.widepathcamper.com/) (last accessed Sep. 8, 2017).
Humanihut (http://humanihut.com/) (last accessed Sep. 8, 2017).
James Broud Roof Top Tents (http://www.jamesbaroudusa.com/) (last accessed Sep. 8, 2017).
Karmod Modular Kiosks (http://karmod.com/en/products/modular-kiosks-plans?) (last accessed Sep. 8, 2017).
Katrina Cottages (http://katrinacottagehousing.org/) (last accessed Sep. 8, 2017).
Lightweight caravan by Mads Johansen (http://newatlas.com/wide-path-camper/34644/) (last accessed Sep. 8, 2017).
Mercedes Metris Camper (http://blog.caranddriver.com/well-gladly-live-down-by-a-river-in-one-of-these-mercedes-benz-vans/) (last accessed Sep. 8, 2017).
Metaplate (http://www.coroflot.com/kelvinyong80/03-metaplate) (last accessed Sep. 8, 2017).
MINI Countryman ALL4 Camp (http://newatlas.com/mini-shows-off-latest-concept-camping-gear/28378/) (last accessed Sep. 8, 2017).
Modulartlex (http://newatlas.com/modularflex-folding-disaster-shelter/26418/?li_source=LI&li_medium=default-widget) (last accessed Sep. 8, 2017).
Quickupcamper by Jay Baldwin (http://quickupcamper.com/) (last accessed Sep. 8, 2017).
Roof Top Tents: <http://pangaea-expeditions.com/roof-top-tent-overview-part-1/> (last accessed Sep. 9, 2017).
Shelter Pack Post Disaster Shelter by Harkan Gursu (https://competition.adesignaward.com/design.php?ID=46903) (last accessed Sep. 8, 2017).
Sleep Safe Portable Shelter (http://www.stupidwise.com/portable%20shelters.html) (last accessed Sep. 8, 2017).
SylvanSport Go Camper (https://www.sylvansport.com/) (last accessed Sep. 8, 2017).
Teardrop campers (http://www.tnttt.com/viewtopic.php?t=34396p=622120) (last accessed Sep. 8, 2017).
Tiny Homes (https://www.tumbleweedhouses.com/) (last accessed Sep. 8, 2017).
Uniteam shelters (https://www.copybook.com/companies/uniteam-international/articles/uniteam-quick-shelter-a-portable-general-purpose-unit) (last accessed Sep. 8, 2017).

* cited by examiner

COLLAPSIBLE SHELTER

CROSS-REFERENCE TO RELATED APPLICATIONS

This application claims the benefit of U.S. Provisional Patent Application No. 62/337,806 filed May 17, 2016, and titled "Collapsible Shelter," which is incorporated herein by reference in its entirety.

BACKGROUND

Products or structures designed to provide shelter (e.g., in a particular location or while camping or travelling) can range from ultralight weight and highly portable to larger, heavier, and less portable. Products may differ in portability and performance as a shelter, among other things, and there usually is a trade-off between those features. A more portable shelter may provide less protection, while a product that provides more protection may be significantly less portable. Portability may be desired because it makes the shelter easier to transport to different locations, easier to store, and easier to handle, among other reasons. Performance as a shelter or the ability to provide protection from inclement weather, extreme temperatures, animals, and theft is also desirable for added security, safety, and comfort.

Shelters comprised fully or partially of fabric may be highly portable, but may offer correspondingly limited protection. These highly portable structures generally cannot be insulated and climate controlled like a rigid structure might be. Since most fabric walls can be easily cut, these offer little security and protection. Shelters comprised fully or partially of rigid walls, floors, and roofs may offer more security and protection from the elements, animals, theft, etc., but may have limited portability. Larger, more protective shelters can also be challenging or inconvenient because they may also need to be stored or disconnected when not in use, may take up a significant amount of storage space, and may require special or high-powered vehicles to tow them or may be vehicles themselves. A van or other vehicle might itself be modified to add a protective shelter, but this would be expensive and require permanent modification of the vehicle (e.g., cutting the roof). There are currently no options on the market that offer rigid shelter protection for camping, are portable by any vehicle, capable of remaining attached to the vehicle permanently or long term without limiting normal use of the vehicle, and do not require permanent modification to the vehicle.

There is a need for a portable shelter or camper that is both highly portable (e.g., can be transported using any vehicle or by a human) and capable of excellent shelter protection from weather, animals, theft, etc. For example, it would be beneficial to have a highly protective shelter that is portable by small vehicles, large vehicles, motorcycles, and bicycles. The shelter might be portable using a simple roof rack, tow hitch, truck bed, trailer, etc., without requiring other specialized attachments or permanent modifications. It would also be beneficial for the portable shelter or camper to be easily removed from a transport vehicle and easily stored without taking up much storage space (e.g., about the same or less than a typical mattress and box spring set when stored). A hard-sided, collapsible shelter or camper may be well suited for people living in congested areas where space and vehicle size or type is limited, and may also provide excellent shelter protection, such as may only be available with rigid walls and roofs. It would also be beneficial if the portable shelter or camper allows for easy storage of a standard-size foam or spring mattress, electronics, solar panels, batteries, etc. therein. Being able to include, store, and/or customize components of a kitchen, a bath, seating fixtures or modules, plumbing, and/or other components of various systems without significantly limiting the portability and ease of use would also be highly beneficial. Even if portability is not desired, having a stationary shelter that is collapsible into a smaller, secure shell may be beneficial (e.g., to securely close and lock the shelter when leaving the shelter for a time and for other reasons). Shelters that address these needs and other needs described below, and that combine amenities, excellent shelter protection, compactness, and portability are described herein.

SUMMARY OF THE INVENTION

Embodiments of, and enhancements for, apparatuses, devices, components, assemblies, systems, methods, etc. for portable shelters and campers, are described herein.

In one embodiment, a hard-sided, collapsible shelter or camper provides significant shelter and protection (e.g., much better protection and climate control as compared to a shelter constructed primarily of fabric), while still remaining easily portable by most vehicles, including bicycles. It may be formed as a foldable, rigid enclosure that when open can provide enough room to sleep (e.g., in a shorter or more compact version) or enough room to sleep and stand (e.g., in a taller/larger version). The shelter or camper may have three to eight sides (e.g., four or six sides), a roof, and a floor. In one embodiment, the sides, panels, the roof, and/or the floor may be comprised of an insulated inner core and an outer skin made of composite material such as fiberglass, carbon fiber or any other composite material. When in an open/expanded configuration, the shelter or camper may provide a fully hard-sided, lockable enclosure that offers excellent protection from weather, animals or theft. When transitioning between open/expanded and closed/collapsed configurations, some of the shelter/camper's walls or panels (e.g., front and rear wall panels) may fold up toward the roof or down toward the floor, and/or walls or panels may fold (e.g., in half, or into multiple sections) at points within or along the walls/panels. All portions may collapse, fold, or otherwise come together to form a weather-tight and lockable case when in the closed/collapsed configuration.

The shelter/camper may be designed to be attached to a vehicle's roof rack while stored and not in use or while camping. When in the closed/collapsed configuration, the shelter/camper may have a low profile similar to a cargo box, allowing it to remain attached to the roof rack while in transit or stored, and may be compact enough that removal of the shelter/camper from the roof rack may not be necessary during normal, every-day use of the vehicle. In one embodiment, the camper can also be stored and used inside a pickup truck bed. In one embodiment, the shelter/camper has a compact size and light enough weight that it can be attached to a utility trailer, or attached directly to wheels (e.g., wheels may be quickly attached or detached, similar to bicycle wheels) and towed by most vehicles including motorcycles and bicycles. When in use, the shelter/camper may be designed to offer a comfortable and protected sleeping enclosure or a fully functional camper in a properly equipped tall version. In one embodiment, the portable shelter/camper may have a movable bed platform that can accommodate cooking, bathroom and seating fixtures below the bed. The bed may be moved upward toward the roof to allow standing height below when not in use. When in use, the bed may be lowered for sleep without removing or folding any of the fixtures or modules below it. In one embodiment the portable shelter/camper may have enough interior height that a bed platform may be raised to a high position and remain in that position, allowing enough room for sleeping above while simultaneously allowing for standing height below it. The shelter/camper may be designed to be folded and unfolded very quickly either by powered means or manually. In both opened/expanded and closed/collapsed configurations, some or all joints may be sealed with weather stripping, gaskets, or other insulation. In one embodiment, the portable shelter/camper may be equipped with climate control, electronics, and/or plumbing. One or more heating and/or cooling products designed for small enclosures may also be used; in embodiments where the camper is hard-sided and insulated, these products can effectively cool or heat the enclosure. Wiring for lighting, refrigeration and electronics can be run through the hard walls, panels, floor and roof. The hard roof may accommodate solar panels and the hard floor may accommodate batteries and or a small generator. Plumbing may be added to allow for fresh water, waste water, and solid waste storage.

In one embodiment, a shelter (e.g., a portable shelter or camper) may comprise any of the features or components described in the written description herein, including: a roof section; side wall panels (e.g., bi-fold wall panels or multi-fold wall panels); a front wall panel; a rear wall panel; and a floor section. Any or all of these sections or panels may be rigid or formed from strong, rigid materials. The shelter may be transitionable between an expanded configuration in which the side wall panels (e.g., two bi-fold side wall panels), the front wall panel, and the rear wall panel are vertical and perpendicular (e.g., with their largest area surfaces perpendicular) to a bottom surface of the floor section and/or to the top surface of the roof section and a collapsed configuration in which the side wall panels (e.g., two bi-fold side wall panels) are folded and enclosed in an interior of the shelter. When folded and enclosed in the collapsed configuration, the side wall panels may be parallel (e.g., with their largest area surfaces parallel) to the bottom surface of the floor section and/or top surface of the roof section. In the collapsed configuration, the shelter may be less than 50" tall (e.g., if enclosing many or large fixtures or components, it may be 40-48" tall), less than 30" tall, less than 24" tall, less than 12" tall, or less than 10" tall. In the expanded configuration, the shelter may be within the range of 2 feet to 8 feet tall, 3 feet to 6 feet tall, greater than 3 feet tall, or greater than 6 feet tall.

The side wall panels may be two upper bi-fold side wall panels, and the shelter may further comprise two lower bi-fold side wall panels (e.g., for a total of four side wall panels). Each of the side wall panels or each section of the side wall panels may contain a window that is openable or fixed. The front wall panel may include a door, and the door may include a window, knob, latch, lock, etc. The roof section may include solar panels (e.g., on a top outer surface thereof). The solar panels may be used to generate and/or store electricity from the sun and may be coupled to a battery or batteries for storage of electricity/electrical energy.

The shelter may be fully lockable such that a person may not enter the shelter when locked without a key. The shelter may also be lockable such that a person may not transition the shelter from the collapsed configuration to the expanded configuration when locked in the collapsed configuration, if the person does not have a key. The shelter may be sufficiently compact and lightweight in the collapsed configuration that it may be transported using a bicycle (or a motorcycle, car, or other vehicle) by pulling the shelter on a trailer attached to the bicycle (or motorcycle, car, or other vehicle), or by a person without the use of any vehicle. The shelter may also be sufficiently compact and lightweight in the collapsed configuration that it may be moved by one or more person(s) pulling, pushing, or lifting it.

The shelter may also comprise a bed system, and the bed system may include a mattress, a mattress platform, a raising or lowering system, a positioning system, notches or grooves or tracks in which the platform may be received at different positions, and/or other components. The bed system may be configured such that it can be raised or lowered to different positions within the shelter in the expanded configuration. The shelter may also comprise an internal kitchenette with cooking or food-related equipment or fixtures (e.g., a stove, oven, refrigerator, dining table, chairs/seats, a sink, etc.). The shelter may comprise an internal bathroom with bathroom-related equipment or fixtures (e.g., a sink, a toilet, a shower, a drain, etc.).

In one embodiment, a method (e.g., a method of camping, a method of using a shelter, etc.) may comprise: obtaining a shelter (e.g., a portable shelter or camper). The shelter may comprise any of the features described in the written description herein, including: a roof section; side wall panels (e.g., two bi-fold side wall panels); a front wall panel; a rear wall panel; and a floor section. Any of the shelter walls, panels, or sections may be rigid or formed of rigid materials. The shelter may be transitionable between an expanded configuration and a collapsed configuration in which the side wall panels (e.g., two bi-fold side wall panels) are folded. The method may also include transporting the shelter, while in the collapsed configuration, to a desired location for overnight sleeping within the shelter; and transitioning the shelter from the collapsed configuration to the expanded configuration, wherein transitioning the shelter includes unfolding the side wall panels (e.g., the two bi-fold side wall panels) such that they are perpendicular to the bottom surface of the floor section. The side wall panels may be two upper bi-fold side wall panels, and the shelter may also include two lower bi-fold side wall panels (e.g., for a total of four side wall panels or bi-fold side wall panels). In the collapsed configuration, the two upper bi-fold side wall panels and the two lower bi-fold side wall panels may be folded and oriented parallel to the bottom of the floor section, and transitioning the shelter may include unfolding the two upper bi-fold side wall panels such that two upper bi-fold side wall panels are perpendicular to the bottom surface of the floor section and positioned between the floor section and the roof section. Optionally, transitioning the shelter may further comprise unfolding the two lower bi-fold side wall panels such that the two lower bi-fold side wall panels are perpendicular to the bottom surface of the floor section and positioned between the floor section and the two upper bi-fold wall panels. The method may further comprise transitioning the shelter from the expanded configuration to the collapsed configuration, and transitioning the shelter may include folding the side wall panels (e.g., two bi-fold side wall panels) such that they are parallel to the bottom surface of the floor section and are enclosed within the shelter in the collapsed configuration. Other steps described elsewhere here may also be used in any order or sequence.

BRIEF DESCRIPTION OF THE DRAWINGS

The disclosed devices, components, assemblies, systems and methods can be better understood with reference to the description taken in conjunction with the following drawings, in which like reference numerals identify like elements. The components in the drawings are not necessarily to scale.

Figure 1:
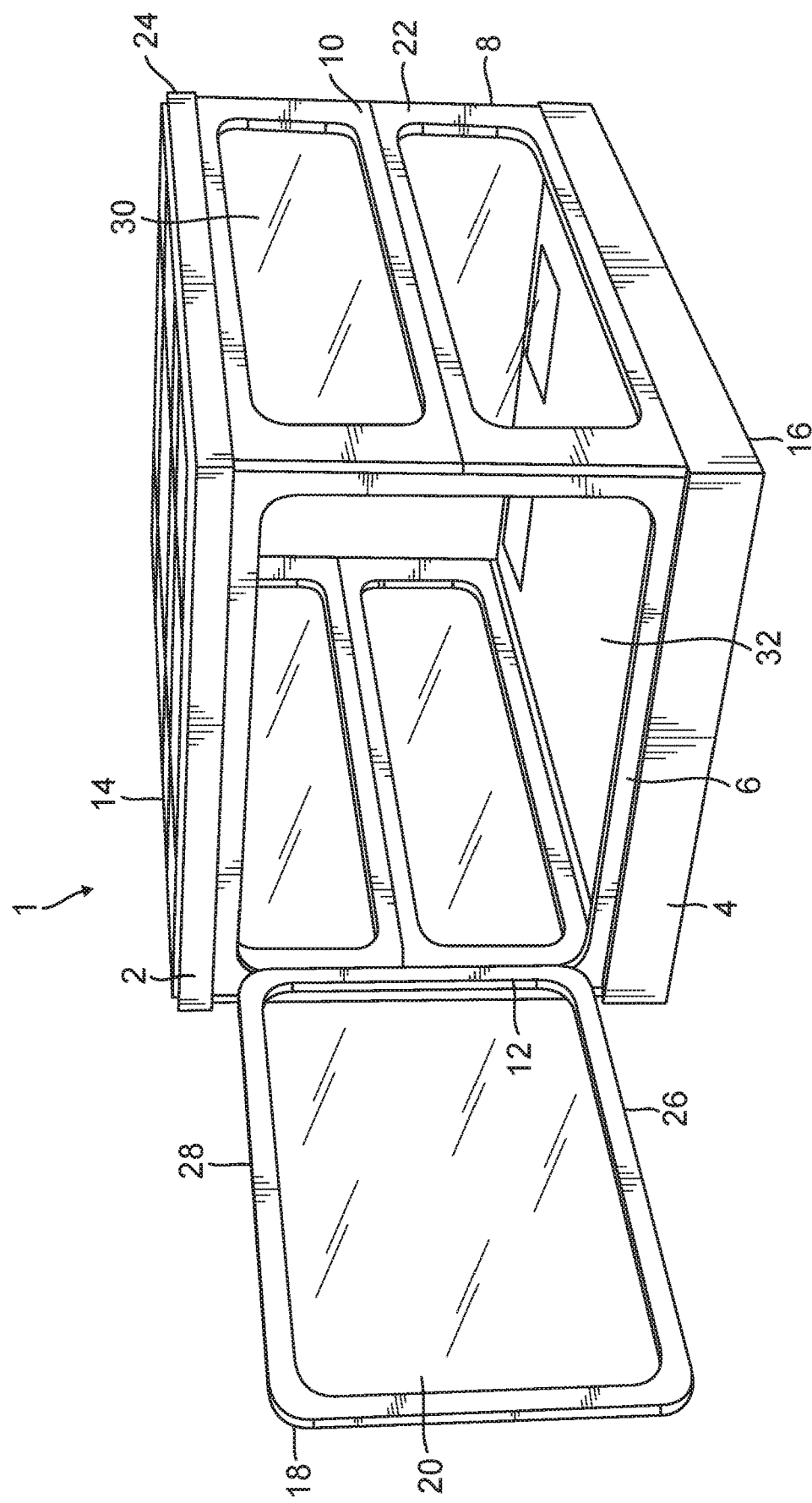
FIG. 1 shows a front perspective view of an exemplary shelter configured as a collapsible camper in an open or expanded configuration.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Described herein are devices, components, assemblies, systems, methods, etc. for shelters and campers. The description and accompanying figures, which describe and show certain embodiments, are made to demonstrate, in a non-limiting manner, several possible configurations of shelters, campers, apparatuses, components, assemblies, systems, etc. and various methods of using them according to various aspects and features of the present disclosure. Accordingly, the disclosure is not limited to the specific embodiments described. Rather, the inventive principles associated with the embodiments described herein, including with respect to the apparatuses, devices, components, assemblies, systems, methods, etc. described herein, may be applied in a variety of ways, including to other types of apparatuses, devices, components, assemblies, systems, methods, etc. General and specific apparatuses, devices, components, assemblies, systems, methods, etc. are described herein sufficiently to enable one to develop a variety of implementations/applications without undue experimentation. In the development of particular applications, numerous implementation-specific decisions will be made to achieve the design-specific goals, which will vary from one implementation/application to another. It will be appreciated that, having access to this disclosure and reading this disclosure, such a development effort would be a routine undertaking for persons of ordinary skill in the art.

This document does not intend to distinguish between components that differ in name but not function. In the following discussion and in the claims, the terms "including," "includes," "comprising," "have," and "has" are used in an open-ended fashion, and thus should be interpreted to mean "including, but not limited to." The word "or" is used in the inclusive sense (i.e., "and/or") unless a specific use to the contrary is explicitly stated.

Figure 5:
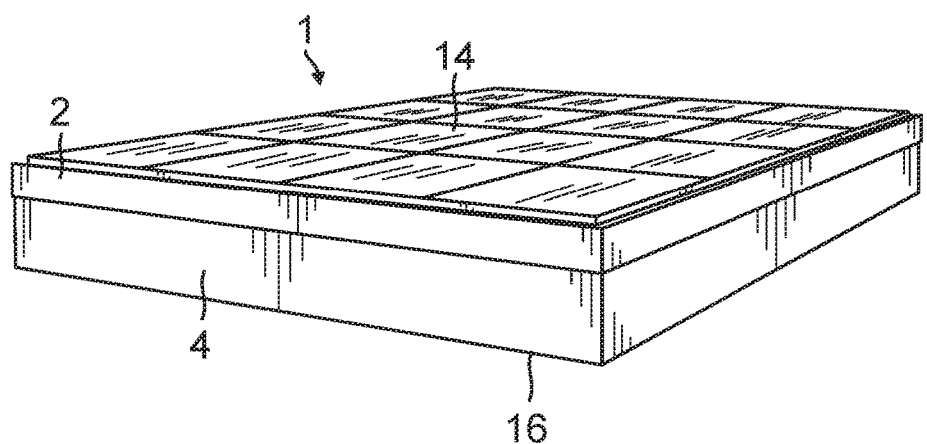
FIG. 5 shows a perspective view of the shelter of FIG. 1 in a closed or collapsed configuration.

FIG. 1 shows a front perspective view of an exemplary shelter configured as a collapsible camper or portable shelter 1 in an open or expanded configuration. Camper 1 may be formed/configured as a hard-sided, collapsible camping unit. Camper 1 may be fully enclosed, weather tight, and lockable. Camper 1 may be used as a private sleeping structure or shelter while in an open or expanded configuration. When in a closed or collapsed configuration as shown in FIG. 5, camper 1 may be an easily portable, enclosure (e.g., a hard-case enclosure) configured for easy transportation. In one embodiment, camper 1 may be configured as a stationary or non-portable shelter with similar features to those described herein, but configured to remain in a permanent or semi-permanent location.

Camper 1 may comprise walls, panels, a floor, and a ceiling/roof. The walls, panels, floor, and/or ceiling/roof may be rigid, partially rigid, or flexible. In one embodiment, the walls, floor, and/or ceiling/roof may be rigid (e.g., formed of hard siding, rigid panels, or other rigid materials) and may combine to form a rigid structure. The structure of camper 1 may, in both opened/expanded and closed/collapsed configurations, allow camper 1 to contain a mattress 32 or 200 and/or various fixtures (e.g., televisions, lighting, electrical outlets, solar panels, batteries, heating and cooling appliances), and any other system or convenience components that may be permanently or temporarily attached to the shelter/camper. When formed as a rigid structure, camper 1 may also provide protection and safety, e.g., from the elements by forming a weather tight enclosure that may be heated or cooled with optional equipment. The rigid structure design may also allow for the use of insulation in the walls, floor, and/or ceiling (e.g., in panels forming the walls, floor, and/or ceiling) to provide improved interior climate control performance of camper 1. The rigid structure may also offer improved security providing a hard exterior that is impenetrable or resists penetration by animals or potential thieves. In one embodiment, camper 1 may be locked while in the opened/expanded and/or in the closed/collapsed configurations. While open/expanded, camper 1 may be sized and configured to provide enough space for one or more users (e.g., 1, 2, 3, 4, 5, 6, or more users) to sleep, sit and crawl about the interior of the enclosure. When closed, camper 1 is collapsed into a low-profile enclosure or hard case that may be mounted to a vehicle roof rack; placed in the bed of a pick-up truck; placed on a trailer and towed behind a car, truck, motorcycle, bicycle or any other tow vehicle; placed in or on a boat. In one embodiment, camper 1 may be configured so that wheels may be permanently or removably mounted to the camper 1 in the closed/collapsed and/or open/expanded configurations, such that camper 1 may act as its own trailer or be pulled/pushed directly by another vehicle or by a walking person(s). Camper 1 may be stored and/or used in a variety of locations (e.g., in use, camper 1 may be placed anywhere there is a sufficient foundation or surface below and sufficient height above while open). Camper 1 may be designed to be easily and quickly opened/expanded for sleeping and easily closed/collapsed when in transit or in storage.

Figure 2:
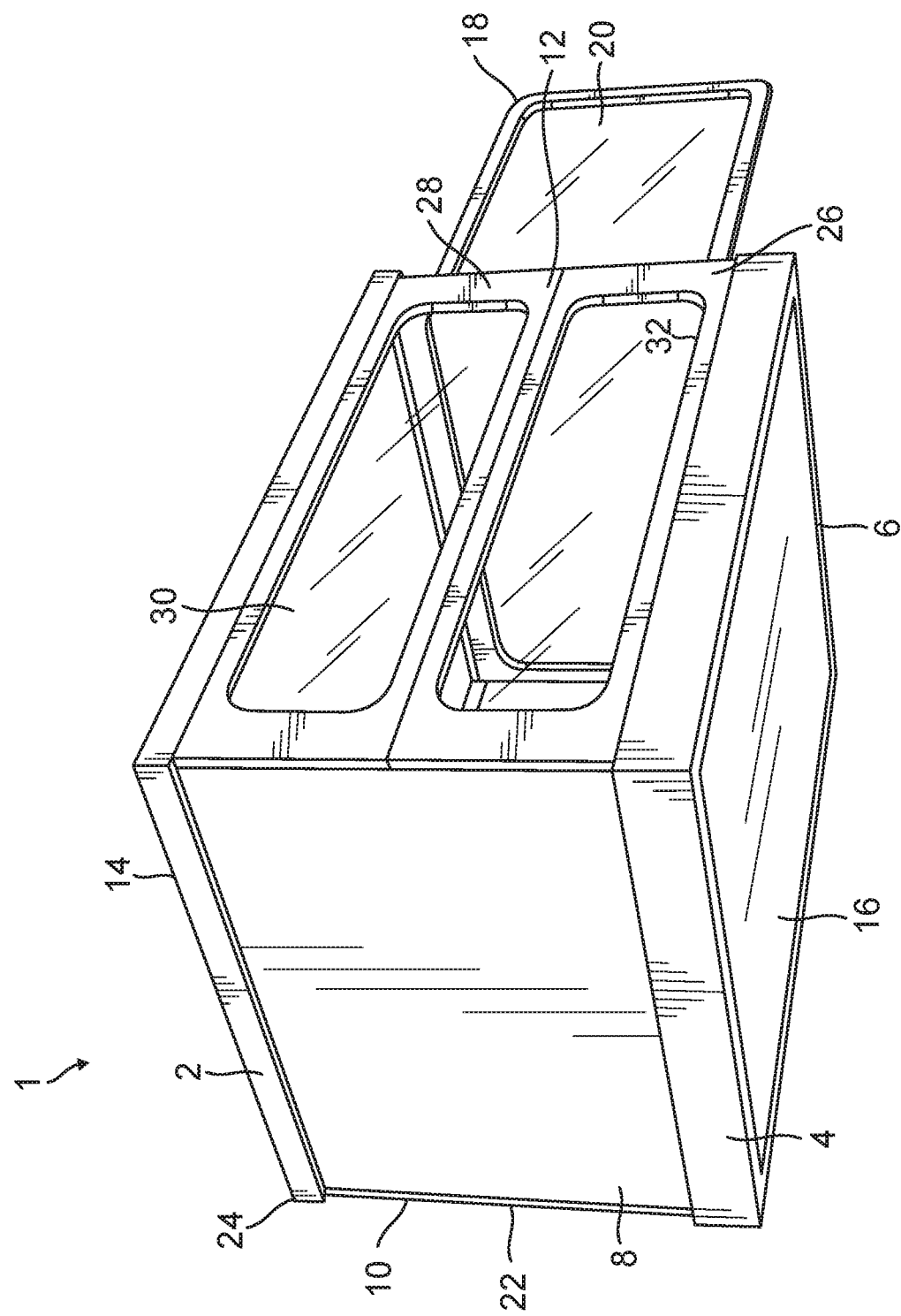
FIG. 2 shows a rear perspective view of the shelter of FIG. 1 in an open or expanded configuration.
Figure 3:
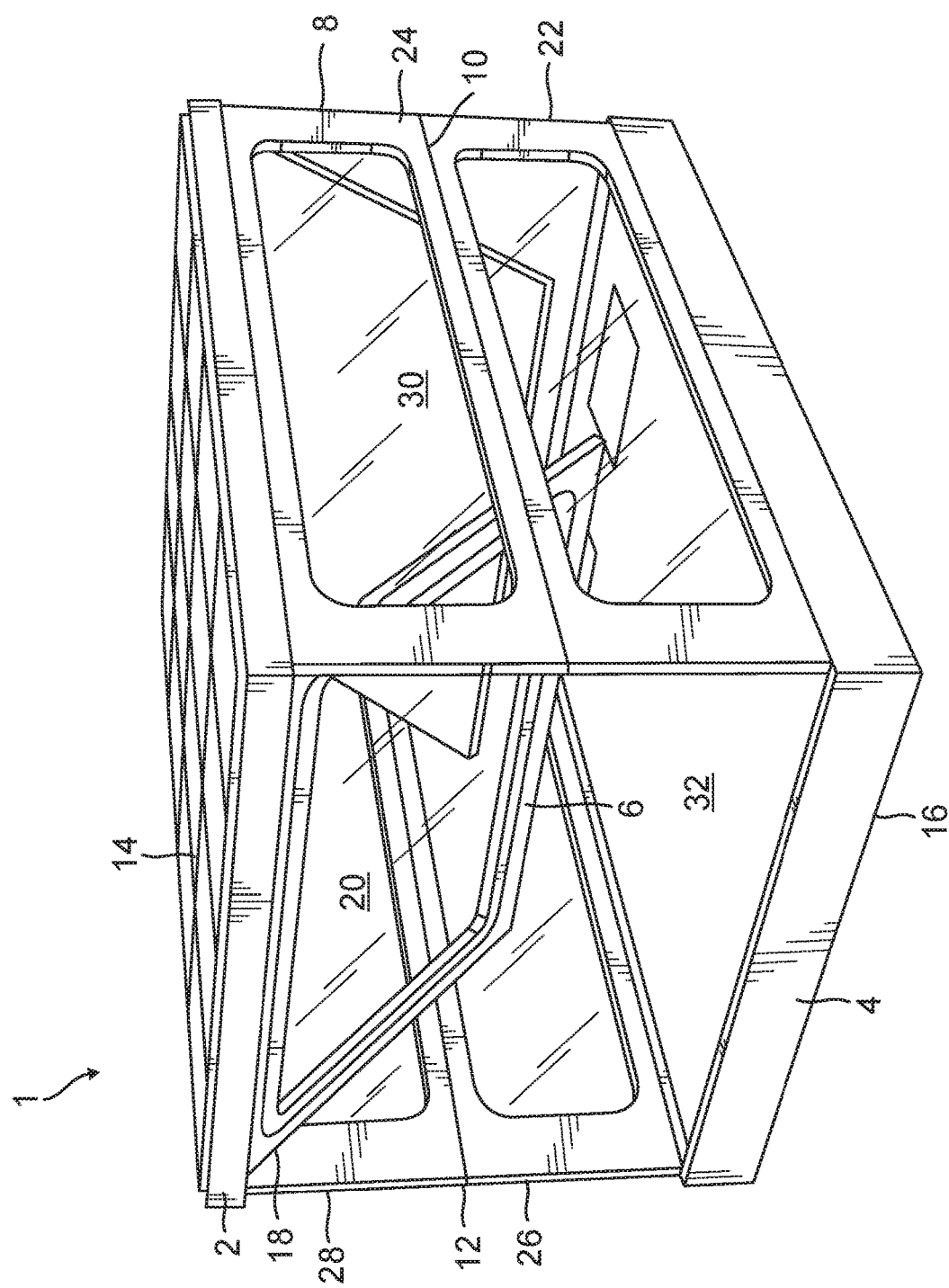
FIG. 3 shows a front perspective view of the shelter of FIG. 1 in a first transition position between an open or expanded configuration and a closed or collapsed configuration.
Figure 4:
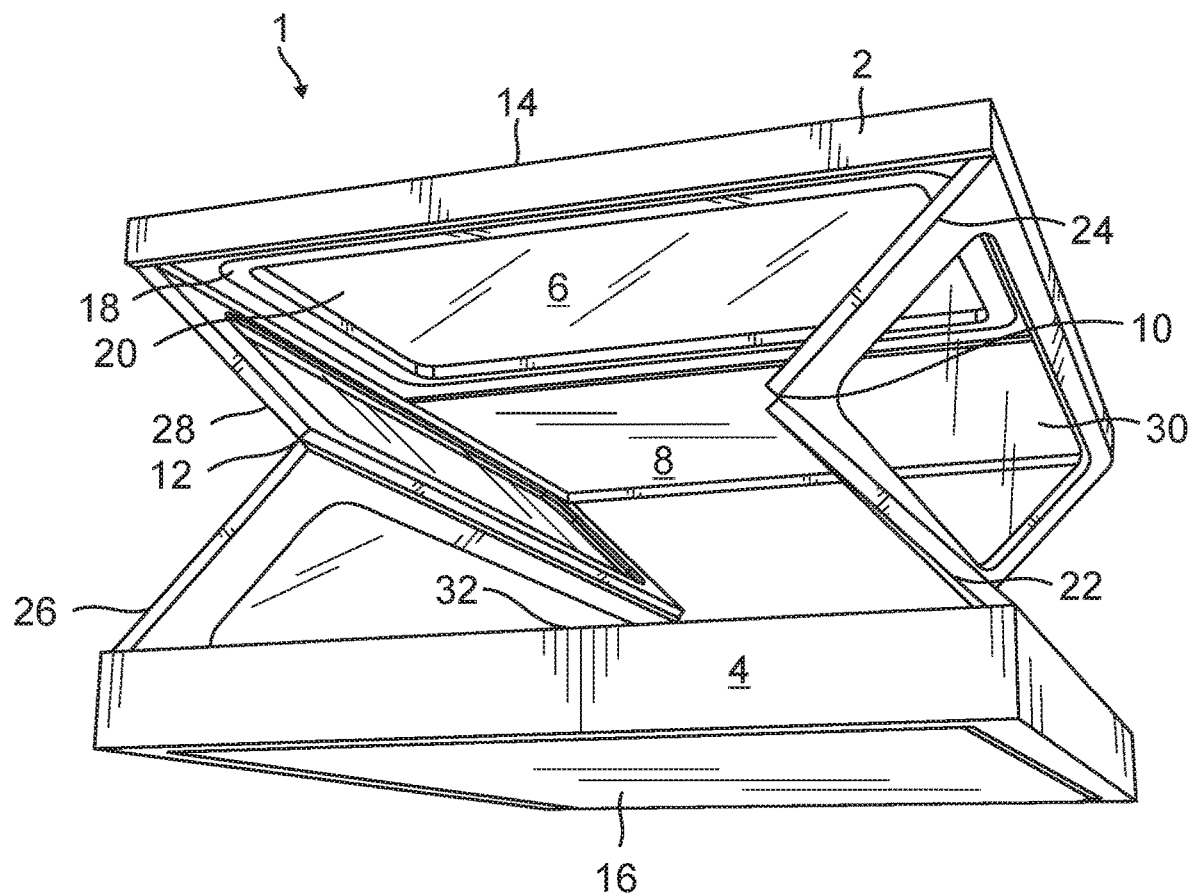
FIG. 4 shows a front perspective view of the shelter of FIG. 1 in a second transition position between an open or expanded configuration and a closed or collapsed configuration.

Camper 1 may be designed to maintain a rigid structure in both opened/expanded (e.g., as shown in FIGS. 1 and 2) and closed/collapsed (e.g., as shown in FIG. 5) configurations by use of rigid walls (e.g. formed of wall panels 6, 8, 10, and 12), a rigid floor (e.g., floor section 4), and/or a rigid ceiling/roof (e.g., roof section 2). The walls may be formed of folding and/or multi-folding (e.g., bi-folding) wall panels 6, 8, 10 and 12. The wall panels 6, 8, 10, and 12 may be hinged and/or latched to roof section 2, floor section 4, or both. FIGS. 3 and 4 show the portable shelter transitioning between an open/expanded configuration and a closed/collapsed configuration. When opening or expanding from the closed/collapsed configuration to the open/expanded configuration, the wall panels 6, 8, 10 and 12 may be extended vertically until they are perpendicular to the roof section 2 and floor section 4. When closing or transitioning from the open/expanded configuration to the closed/collapsed configuration, the wall panels 6, 8, 10 and 12 may be folded (e.g., flat or approximately flat) until they are parallel to the roof section 2 and floor section 4. When fully opened or expanded (e.g., as shown in FIGS. 1 and 2), the portable shelter or camper 1 may provide comfortable sleeping quarters for one or more occupants. When closed or collapsed (e.g., as shown in FIG. 5), the roof section 2 and the floor section 4 may be configured to come together to form a weather tight and portable case (e.g., a portable rigid, hard case), fully enclosing all or some interior components, front wall panel 6, rear wall panel 8, right side wall panel 10, left side wall panel 12, or a combination of some or all of these. Various components that may be included with camper 1 and camper 100 are described in more detail below.

The portable shelters or campers described herein may include various wall types. For example, the walls maybe formed from one or more wall panels (e.g., rigid wall panels, folding wall panels, bi-fold wall panels, tri-fold wall panels, quadri-fold wall panels, multi-fold wall panels, etc.). In one embodiment, e.g., as shown in FIGS. 1-4, the right-side wall panel 10 may be formed as a bi-fold wall panel, i.e., such that the panel can fold once with a section of the panel on either side of the fold. The left side wall panel 12 may also be formed as a bi-fold wall panel, e.g., as can be seen in FIG. 4. Each wall panel and each section of a wall panel may be a variety of sizes, shapes, and dimensions. In one embodiment, each section of wall panels 10 and 12 may be between 6" and 50" tall, between 12" and 40" tall, between 18" tall and 25" tall, or about 18" tall (e.g., ±1"). In one embodiment, each section of a bi-fold wall panel may be equal to or be about one half of the interior width of the camper 1 from side to side. In one embodiment, side wall bi-fold panels with 18" tall sections may, combined with space in the roof section 2, allow for over 3' of interior height above a mattress 32

(optionally contained within camper 1), when in the open/ expanded configuration (e.g., as shown in FIGS. 1 and 2). In one embodiment, the panels, walls, sections, etc. may combine with the roof section to allow 1.5 to 9 feet, 2.5 to 7 feet, or about 3 feet (e.g., ±1") above a mattress 32 or a floor section. The side wall panels 10 and 12 may be sized and configured to sit side by side above the mattress, without overlapping each other, when folded in half for closing/ collapsing of camper 1 (e.g., as shown in FIG. 4) or when in the closed/collapsed configuration (e.g., as shown in FIG. 5). Both bi-fold wall panels may be sized such that the camper 1 is sized for a mattress, to be slightly longer than a mattress, or even longer. For example, in one embodiment, a shelter/ camper with a Twin or Full mattress that is about 75" long (±2") may have bi-fold wall panel sections that are 75" to 95" long, 75" to 80" long, or about 77" (e.g., ±1"). In one embodiment (e.g., as shown in FIG. 1), one or more sections of the wall panels may be 18" tall×77" long. In one embodiment, the wall panel sections may extend 0.25" to 5", 0.5 to 2", about 1 in, about the thickness of the front and/or rear wall panels, or more beyond each end of the mattress.

The camper 1 may be sized and configured such that the edges of front wall panel 6 and rear wall panel 8 may sit flush with the side wall panel edges when the shelter/camper is in an open/expanded configuration. Weather stripping or gaskets may be used to create a weather tight corner joint between side walls and front and rear walls. Latches, hooks, locks, or other connectors/attachments may also be used at the corners or joints between the walls, panels, sections, etc. (e.g., between side walls and front and rear walls) to help securely hold the walls, panels, sections, etc. together and in position when in the open/expanded configuration. In one embodiment, the front wall panel 6 and/or the rear wall panel 8 may be positioned between the side wall panels 10 and 12 when in the open configuration, such that the front wall panel 6 and/or the rear wall panel 8 prevent the side wall panels from folding inward (i.e., the side wall panels cannot fold inward because the inner surface of the side wall panels contact the sides of the front wall panel 6 and/or the rear wall panel 8).

The various wall panels and sections of wall panels may be connected to each other in a variety of ways, including by hinges, connection strips, screws, nails, fasteners, clamps, latches, slide latches, adhesive, hook and loop fasteners, or a combination of some or all of these. In one embodiment, lower sections 22 and 26 of the side wall panels 10 and 12 may be hinged on the bottom to an edge (e.g., a raised edge) of the floor section 4 (e.g., on the right and left sides of the camper 1), and upper sections 24 and 28 of the side wall panels 10 and 12 may be hinged on the top to an edge (e.g., a dropped/hanging edge) of the roof section 2 (e.g., on the right and left sides of the shelter/camper). Weather stripping or gaskets along each of the long edges of each section of the bi-fold wall panels may be used to form weather tight joints between the side walls and the roof and floor and between sections of wall panels (e.g., between the upper and lower sections of a bi-fold wall panel). Latches, hooks, locks, weather stripping, or other connectors/attachments may optionally be used at the corners or joints between the walls, panels, sections, etc. (e.g., between side walls and front and rear walls) to help securely hold the walls, panels, sections, etc. together and in position when in the open/expanded configuration. Camper 1 may also include slide latches (or other latches or locks) that can slide or be positioned between the walls, wall panels, or sections of the wall panels (e.g. to prevent folding or other undesired movement). For example, wall panel slide latches may be used between upper wall sections 24 and 28 and lower wall sections 22 and 26 of the wall panels 10 and 12 to further prevent the walls/wall panels from folding inward when in an open/ expanded configuration. When in closed/collapsed configuration, all wall panels may sit entirely inside the closed case formed by the roof and floor sections (e.g., inside the closed case shown in FIG. 5).

Each wall, wall panel, or wall panel section may contain a window or multiple windows (Component 30). The windows may be fixed or may be capable of being opened. The windows may also include or be fitted with screens and/or blinds. The wall panels may also include fixtures such as light switches, electrical outlets, wall-mounted televisions, storage pockets, storage hooks, venting fans, electrical connections and attachments for mounting heating/cooling equipment. The wall panels may be opened manually or automatically. The wall panels may include a mechanical system or components of a mechanical system for opening/ expanding and closing/collapsing of the camper. The mechanical system may include a crank, pump, lever, pulley, springs, piston(s), hinges, spring-loaded hinges, motorized hinges, motor, other opening/closing mechanisms or components, and/or any combination of one or more of the foregoing as appropriate for the size and weight of the shelter/camper.

In one embodiment, the front wall panel 6 and the rear wall panel 8 may be fixed length, flat panels hinged to edges (e.g., dropped, interior edges) of the roof section 2 in the front and rear of the shelter/camper. The front wall panel 6 and the rear wall panel 8 may be the same width as a mattress 32 contained within the shelter/camper or wider (e.g., 0.25" to 24" wider). The front wall panel 6 and the rear wall panel 8 may be long enough to extend between the edge (e.g., dropped interior edge) of the roof or ceiling and an edge (e.g., a raised interior edge) of the floor section 4. In one embodiment, the front panel 6 and rear panel 8 are only ½ of the total interior length of the shelter/camper or less. This may allow the front and rear wall panels to sit end to end above the side wall panels 10 and 12, without overlapping, when the walls are folded for closing/collapsing of the shelter/camper (e.g. as shown in FIGS. 3 and 4). As one example, a shelter/camper containing a Full mattress (e.g., 54"×75" give or take a couple of inches) may have front and rear wall panels that are at least 54" wide by at least as tall as the distance between an edge of the roof section 2 and an edge of the floor section 4 in the open/expanded configuration (e.g., 38" tall assuming 18" tall bi-fold side wall panel sections and roof and floor interior edges that are 1" shorter than their exterior edges as described in more detail below and shown in FIG. 1). When opening/expanding the portable shelter or camper (e.g., as shown in FIG. 3), the unattached (unhinged) ends of the front wall panel 6 and the rear wall panel 8 may be lowered until they connect or latch to an edge (e.g., a raised, interior edge) of the floor section 4 in the front and rear of the shelter/camper, which may be sized, configured, and positioned to form a continuous and weather tight front and rear wall connecting between the roof and floor. Optionally, the front wall panel 6 and the rear wall panel 8 may be hinged to an edge (e.g., a raised, interior edge) of the floor section 4 and raised to latch to an edge (e.g., a lowered interior edge) of the roof section 2.

When the shelter/camper is open/expanded (e.g., as shown in FIGS. 1 and 2) and the walls/wall panels completely unfolded, the edges of the front wall panel 6 and the rear wall panel 8 may sit flush with the side wall edges, forming a weather tight corner joint. When in the closed/ collapsed configuration, all wall panels may sit entirely inside the closed case formed by the roof and floor sections (e.g., inside the closed case shown in FIG. 5). The front and rear wall panels may each contain a window 20, 30 or multiple windows. The windows may be fixed or capable of being opened. The windows may also include or be fitted with screens and/or blinds. The front and rear wall panels may also include fixtures such as light switches, electrical outlets, wall-mounted televisions, venting fans, storage pockets, storage hooks, electrical connections and attachments for mounting heating/cooling equipment. The front wall panel 6 and/or the rear wall panel 8 may include a door 18, and the door 18 may contain a window 20, lock, latch, hinge, knob, handle, and/or other components of a door. The door 18 may include weather stripping or gaskets, creating a weather tight seal between the door and the rest of the front wall panel 6, when the door is closed. The front and rear wall panels may include a mechanical system or components of a mechanical system for opening/expanding and closing/collapsing of the camper. The mechanical system may include a crank, pump, lever, pulley, spring(s), piston(s), hinges, spring-loaded hinges, motorized hinges, motor, other opening/closing mechanisms or components, and/or any combination of one or more of the foregoing as appropriate for the size and weight of the shelter/camper.

Figure 6:
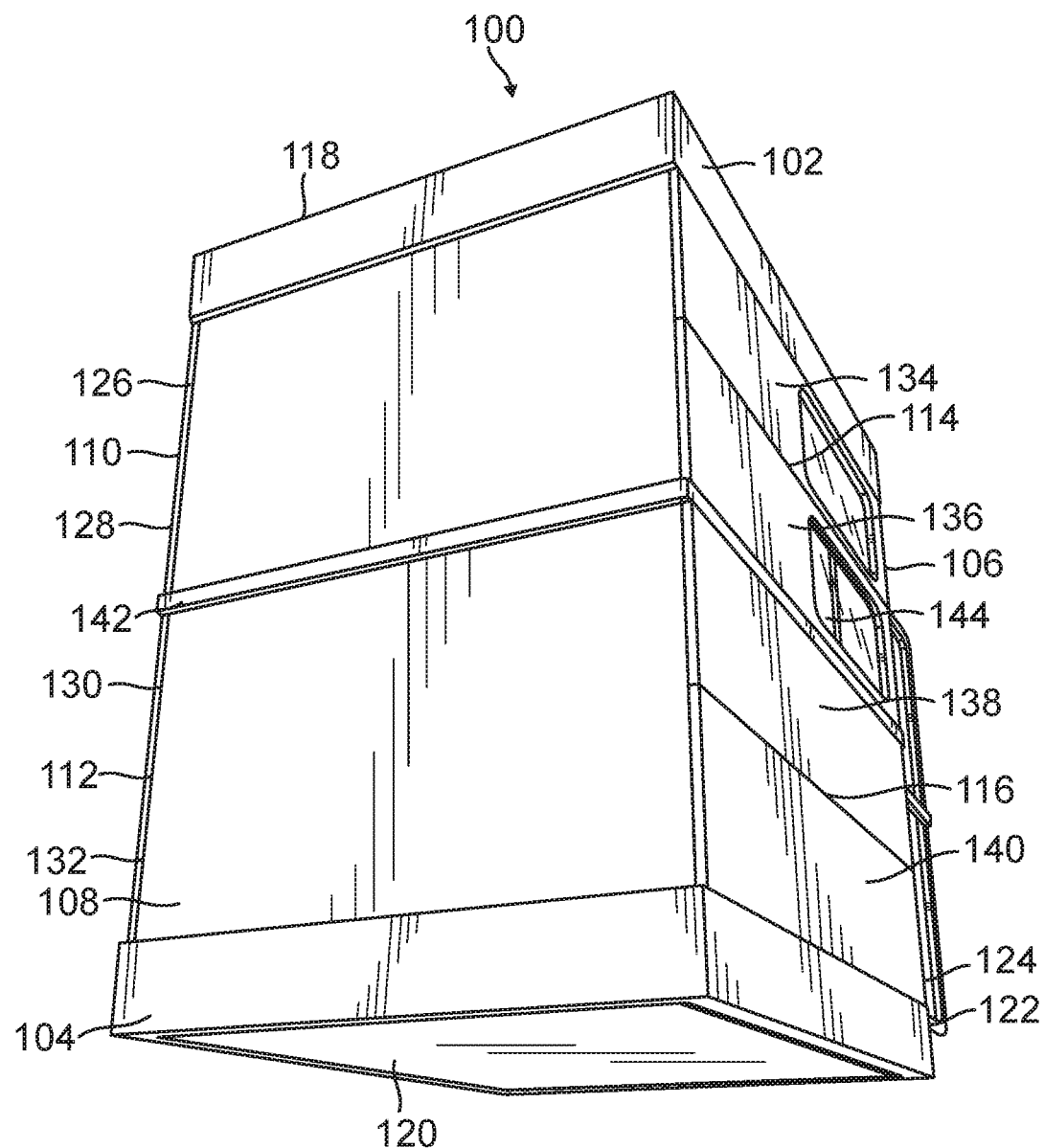
FIG. 6 shows a rear perspective view of another embodiment of an exemplary shelter configured as a collapsible camper in an open or expanded configuration.
Figure 7:
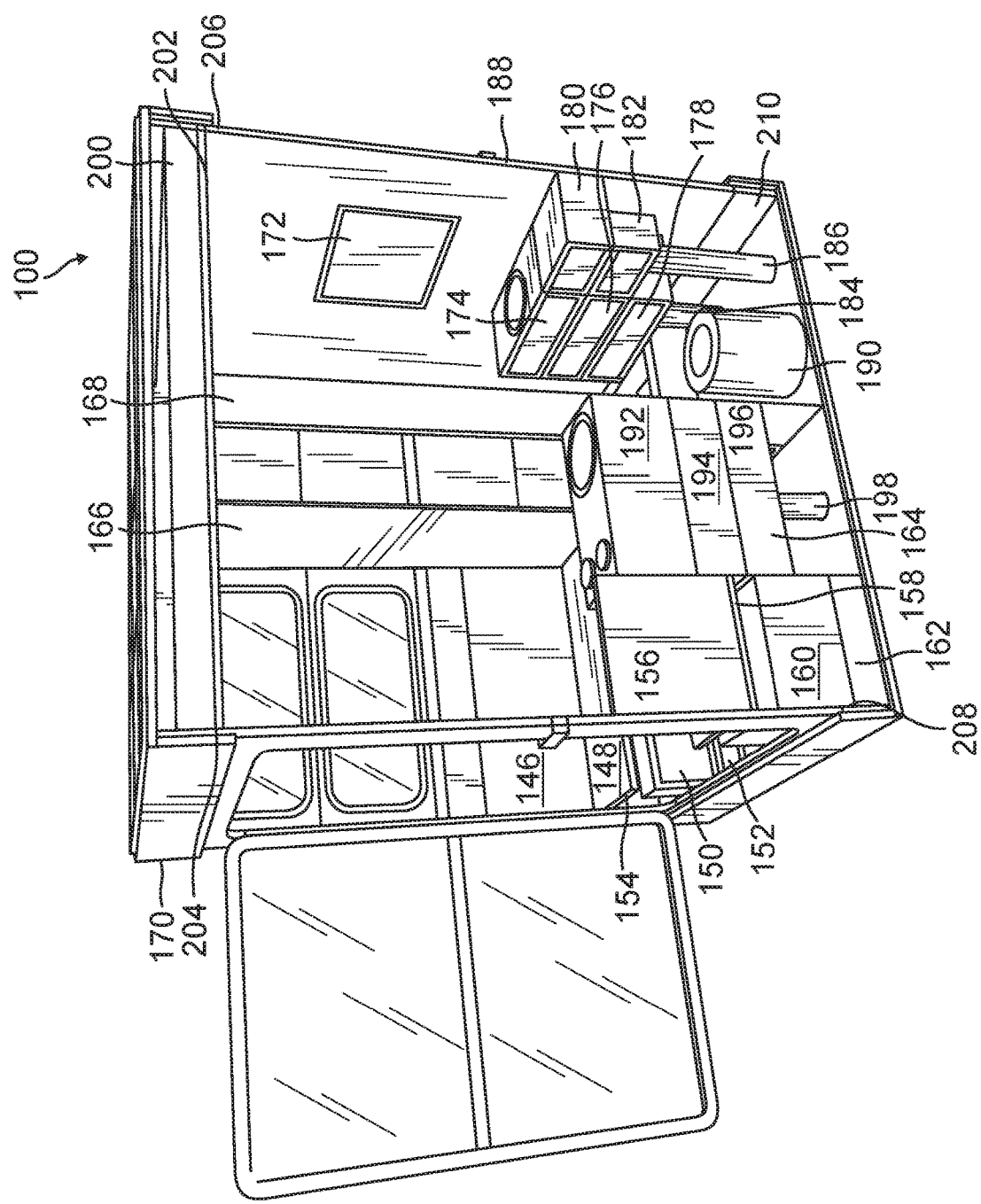
FIG. 7 shows a right perspective interior view of the shelter of FIG. 6 in an open or expanded configuration, with one wall removed for ease of view.
Figure 8:
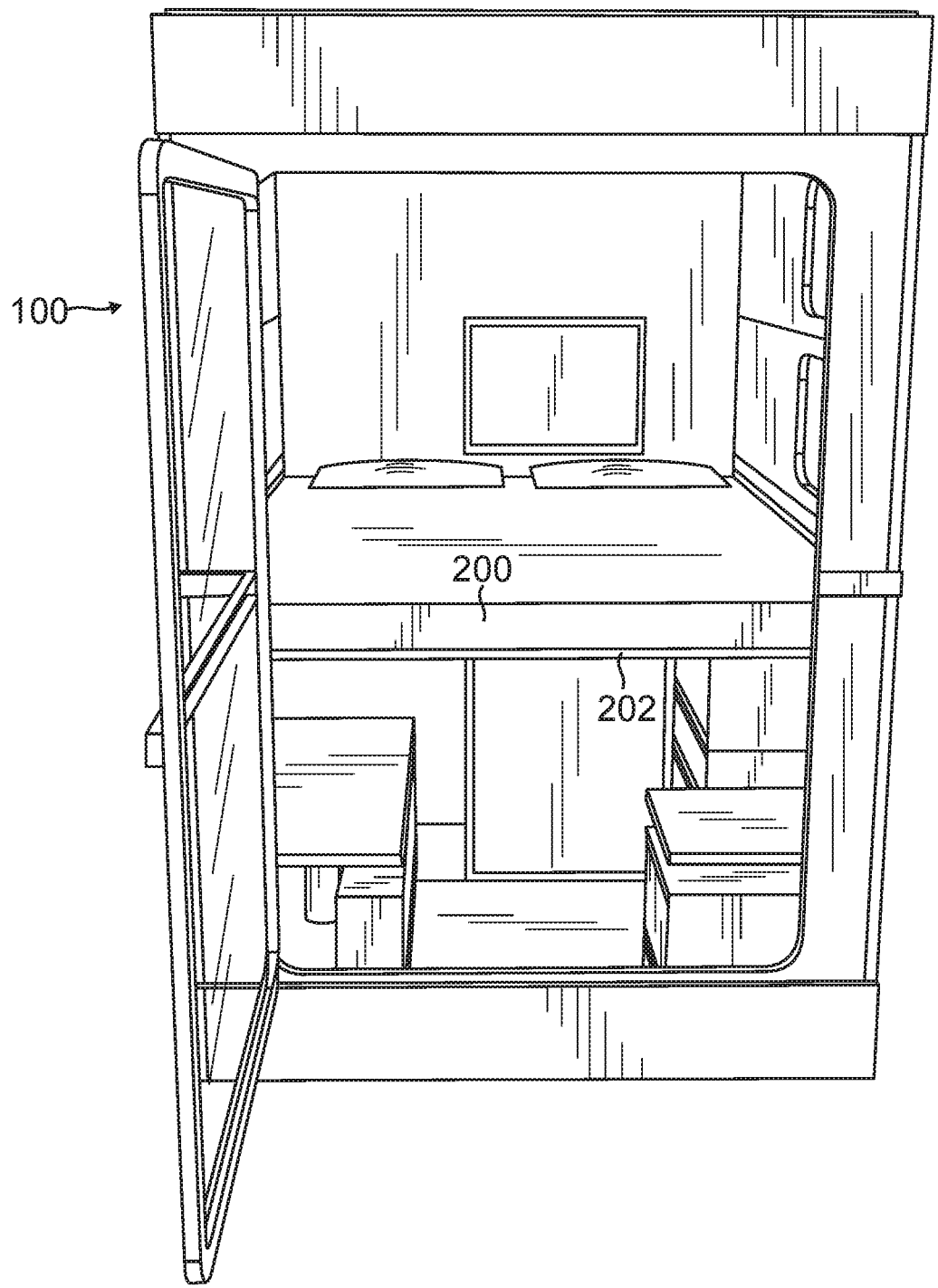
FIG. 8 shows a front interior view of the shelter of FIG. 6 in an open or expanded configuration, the interior arranged in a sleep configuration.

The roof section 2 may be of various shapes and sizes. For example, the roof section 2 may be flat across the entire length and width of the shelter/camper. Optionally, the roof section 2 (as well as other walls/sections of the shelter) may be curved, be contoured, include ridges, and/or include other aerodynamic features, e.g. to make the section more aerodynamic. The roof section 2 may have a dropped edge along some or all of the perimeter of the shelter/camper. The dropped edge may be tall enough to completely contain the front wall panel 6, rear wall panel 8, and sections (e.g., upper sections 24 and 28) of the side wall panels inside the roof when the shelter/camper is closed/collapsed (e.g., as shown in FIG. 5) and the wall panels are folded flat. The roof may include an interior edge in the front and rear of the shelter/camper that is slightly shorter than the exterior edge so that the joint between it and the front and rear wall panels hinged to it can remain inside the roof section, providing a better hinge point and water tightness when the shelter/camper is open/expanded. When arranged like this, the front and rear wall panels may be long enough to stretch between the interior edge of the roof and the interior edge of the floor. If the front and rear wall panels are hinged to the floor section 4, then the dropped edge of the roof may be sized to contain only the upper sections 24 and 28 of the wall panel, when in the closed/collapsed configuration. The roof section 2 may have a length and width matching or equivalent to the floor section 4. The width of the roof section 2 may be about the same as, slightly greater than, or wider than that of a mattress 32 contained within the shelter/camper, and the length of the roof section 2 may be about the same as, slightly greater than, or longer than the length of the side wall panels 10 and 12. The roof section 2 and floor section 4 may be sized and configured to ensure that the mattress sits completely within the 4 wall panels that are attached to the roof section when in the open/expanded configuration, and the mattress and walls sit entirely inside the shelter/camper when in the closed/collapsed configuration. For example as shown in FIGS. 7 and 8, a shelter/camper containing a Full mattress (e.g., 54"×75" give or take a couple of inches) and having 1" thick panels, may have a roof section that is 56" wide by 79" long (e.g., slightly longer than the side wall panels, which may be 77" long). A dropped edge (e.g., a continuous dropped edge) of the roof section 2 may include weather stripping or gaskets that may form a weather tight seal between it and any wall panels (e.g., wall panels 6, 8, 10 and 12) connected to it. The weather stripping or gasket may also form a weather tight seal with an edge (e.g., a raised edge) of the floor section 4 when the shelter/camper is in a closed/collapsed configuration as shown in FIG. 6.

The top of the roof section 2 may include one or more solar panels 14 (e.g., one to thirty solar panels), roof rack attachments, trailer attachments, and/or antennae for radio, television and/or internet transmissions. The interior of the roof section 2 (i.e., the ceiling of the shelter/camper) may include light fixtures and lights. Roof section 2 may also include other fixtures such as light fixtures, light switches, electrical outlets, ceiling-mounted televisions, venting fans, storage pockets, storage hooks, electrical connections and attachments for mounting heating/cooling equipment. The roof section may include a mechanical system or components of a mechanical system for opening/expanding and closing/collapsing of the camper. The mechanical system may include a crank, pump, lever, pulley, spring(s), piston(s), hinges, spring-loaded hinges, motorized hinges, motor, other opening/closing mechanisms or components, and/or any combination of one or more of the foregoing as appropriate for the size and weight of the shelter/camper. The roof section may also include connection, lock, and/or latch components to latch/connect it to the floor section 4 to keep the shelter/camper closed tightly when in the closed/collapsed configuration. The roof section 2 may also include handles (e.g., in the front and rear of the shelter/camper and/or on the sides of the shelter/camper) for manual lifting or lowering of the roof section for opening/expanding or closing/collapsing of the shelter/camper, respectively, or for carrying the shelter/camper when closed/collapsed. The roof section 2 may include lights or light fixtures internally and/or externally. Internally, lights or light fixtures may provide light for the occupant. Externally, the lights may act as car lights (e.g., tail lights, brake lights, head lights, etc.) and may connect with the lights or other electronics of the vehicle towing the shelter/camper such that the lights of each are similarly controlled (e.g., brake lights on each are coordinated).

The floor section 4 may be of various shapes and sizes. The floor section 4 may be flat across the entire length and width of the shelter/camper. Optionally, the floor section 4 (as well as other walls/sections of the shelter) may be curved, be contoured, include ridges, and/or include other aerodynamic features, e.g. to make the section more aerodynamic. The floor section 4 may have a raised edge along some or all of the perimeter of the shelter/camper. The raised edge may be tall enough to completely contain a mattress 32 and sections of the wall panels (e.g., sections 22 and 26) inside the floor when the shelter/camper is in a closed/collapsed configuration as shown in FIG. 5 and the wall panels are folded flat. The floor section 4 may include an interior edge in the front and rear of the shelter/camper that is slightly shorter than the exterior edge, such that a joint between it and the front and rear wall panels 6 and 8 latched/connected to it can remain inside the floor section, which may provide a better hinge point and water tightness when the shelter/camper is in an open/expanded configuration. If the front and rear wall panels are hinged to the floor section, then the raised edge of the floor may be tall enough to accommodate those panels as well, when in the closed/collapsed configuration.

The floor section 4 may have a length and width matching or equivalent to the roof section 2. The width may be the about same as, slightly greater than, or wider than that of a mattress 32 contained within the shelter/camper, and the length may be the about same as, slightly greater than, or longer than the length of the side wall panels. The floor section may be sized and configured to ensure that the mattress sits completely within the wall panels that are attached to the floor section when in the open/expanded configuration, and that the mattress and the wall panels sit entirely inside the shelter/camper when in the closed/collapsed configuration. For example (as in FIGS. 1 and 5), a shelter/camper containing a Full mattress (e.g., 54"×75" give or take a couple of inches) and having 1" thick panels, may have a floor section that is 56" wide×79" long (slightly longer than the side wall panels, which may be 77" long). The raised edge (e.g., a continuous raised edge) of the floor section 4 may include weather stripping or gaskets that may form a weather tight seal between it and the wall panels 6, 8, 10 and 12 connected to it. The weather stripping or gasket may also form a weather tight seal with an edge (e.g., a dropped edge) of the roof section 2 when the shelter/camper is in a closed/collapsed configuration as shown in FIG. 5.

The bottom of the floor section 4 may include an access panel 16, allowing access to batteries and/or other system components. The floor section may also include other fixtures such as lighting, light switches, electrical outlets, venting fans, storage pockets, electrical connections and attachments for mounting heating/cooling equipment. The floor section may also include attachments to allow mounting to vehicle roof racks, utility trailers or pick-up truck beds or secure attachment to any surface below it. The floor section may include a mechanical system or components of a mechanical system for opening/expanding and closing/collapsing of the camper. The mechanical system may include a crank, pump, lever, pulley, spring(s), piston(s), hinges, spring-loaded hinges, motorized hinges, motor, other opening/closing mechanisms or components, and/or any combination of one or more of the foregoing as appropriate for the size and weight of the shelter/camper. The floor section 4 may also include connection, lock, and/or latch components to latch/connect it to the roof section 2 to keep the shelter/camper closed tightly when in the closed/collapsed configuration. The exterior of the floor section 4 may also include wheels removably or permanently attached thereto for transportation of the shelter/camper when closed/collapsed (e.g., over short distances like that to and from a vehicle). The floor section may also include fixed height or adjustable feet removably or permanently attached thereto (e.g., to one or more exterior portions of the floor section). The floor section 4 may include lights or light fixtures internally and/or externally. Internally, lights or light fixtures may provide light for the occupant. Externally, the lights may act as car lights (e.g., tail lights, brake lights, head lights, etc.) and may connect with the lights or other electronics of the vehicle towing the shelter/camper such that the lights of each are similarly controlled (e.g., brake lights on each are coordinated).

When the shelter/camper is in an open/expanded configuration (e.g., as shown in FIGS. 1 and 2), all wall panels (e.g., panels 6, 8, 10 and 12) may be extended vertically until they are perpendicular to the roof section 2 and floor section 4, forming a complete enclosure that is suitable for occupants. The front wall panel 6 and rear wall panel 8 may sit flush against the right side wall panel 10 and left side wall panel 12, preventing the wall panels from folding inward. Slide latches, as described above, may also be used to further prevent the bi-fold wall panels from folding inward when in an open/expanded configuration. Weather stripping or gaskets may ensure a weather tight seal between all joints. The door 18 may allow entry to and exit from the shelter/camper and may be locked (from the inside and/or outside), securing occupants and/or belongings inside the shelter/camper. The windows 30 may also be openable or fixed closed. In one embodiment, in the open/expanded configuration, the shelter/camper may have an interior height between the ceiling and the mattress 32 comfortable enough to sit, crawl and sleep. Use of optional heating and cooling equipment inside the portable shelter/camper may help maintain a comfortable interior environment in the open/expanded configuration. Components such as televisions and other electrical equipment may also be used when the shelter/camper is open/expanded. Optional solar panels 14 and batteries can continue to operate in the open/expanded configuration. The shelter/camper may remain open/expanded in place on a vehicle roof rack, in a pick-up truck bed, on a trailer, or on any surface that can support its weight and the weight of its occupants.

When the shelter/camper is in closed/collapsed configuration (e.g., as shown in FIG. 5), all wall panels (e.g., wall panels 6, 8, 10 and 12) may sit entirely inside a closed case formed by joining the roof section 2 and the floor section 4. The closed case may contain mattress 32, the folded side wall panels (e.g., above mattress 32), and the folded front and rear wall panels (e.g., above the folded side wall panels). In one embodiment, if the front and rear wall panels 6 and 8 are hinged to an edge of the floor section, the front and rear wall panels may sit just above the mattress 32, and the folded side panels may sit above the front and rear wall panels. The roof section 2 and the floor section 4 may have weather stripping or gaskets in between, forming a weather tight enclosure when closed. Connections, attachments, locks, latches, and/or other components connecting the roof section 2 and the floor section 4 together may ensure that the case remains tightly closed while in transit or not used. Optional solar panels 14 and batteries can continue to operate in closed/collapsed configuration.

The shelter/camper may be simple and easy to transition between configurations without any tools/specialized tools or, optionally, with additional tools that aid transitioning. In one embodiment, to open/expand the shelter/camper or transition the shelter/camper from the closed/collapsed configuration to the open/expanded configuration, the connections/latches/locks connecting the roof section 2 to the floor section 4 may first be unlocked and opened. Then, manually or using some manner of mechanical assistance (e.g., mechanical systems like those described above or lifting/lowering mechanisms that are either powered or manually operated, such as pulleys, levers, motorized hinges, pistons, etc.), the roof section 2 and the side wall panels 10 and 12 may be raised (e.g., as illustrated in FIG. 4) until the bi-fold wall panels are completely vertical (e.g., as illustrated in FIG. 3). If included, slide latches between the upper wall panel sections 24 and 28 and the lower wall panel sections 22 and 26 can be latched to prevent the side wall panels 10 and 12 from folding inward. In the fully raised position, the free ends of the front wall panel 6 and rear wall panel 8 may be lowered (by gravity, manually, and/or mechanically) (e.g., as illustrated in FIG. 3) until they latch with the front and rear edges (e.g., front and rear raised interior edges) of the floor section 4. As shown in FIGS. 1 and 2, once fully lowered, the front and rear wall panels 6 and 8 may sit flush with the edges of the side wall panels 10 and 12, further preventing the bi-fold wall panels from folding inward. If the front and rear wall panels are hinged to the floor section instead of to the roof section, the free ends of the front and rear wall panels may then be raised (manually or mechanically) until they latch with the front and rear edges (e.g., front and rear dropped interior edges) of the roof section.

To close the shelter/camper or transition it from an open/expanded configuration to a closed/collapsed configuration, the free ends of the front wall panel and rear wall panel 6 and 8 may be unlatched from the edge (e.g., raised edge) of the floor section and the panels may be raised (manually or mechanically) (e.g., as shown in transition in FIG. 3) toward the roof section and latched flat against the roof (e.g., as shown in FIG. 4). Then, if included, the slide latches in the side wall panels can be opened, so that the side wall panels can begin to fold inward and the roof section can begin to lower (e.g., as shown in transition in FIG. 4). The lowering of the roof and side wall panels may be done manually or may be mechanically assisted by mechanical systems like those described above or lifting/lowering mechanisms that are either powered or manually operated, such as pulleys, levers, motorized hinges, pistons, etc. that are appropriate for the size and weight of the shelter/camper. If the front and rear wall panels are hinged to the floor section 4 instead of the roof section 2, the free ends of the of the front wall panel 6 and rear wall panel 8 may be unlatched from the edge (e.g., dropped edge) of the roof section 2 so that the panels can be lowered (manually or mechanically) until they rest flat against the mattress 32. Once the wall panels are fully lowered, the roof section 2 and floor section 4 can be connected, fastened, latched, and/or locked together, creating a tightly closed, secure case (e.g., as shown in FIG. 5).

The shelter/camper walls, wall panels, floor, roof, etc. (e.g., wall panels 6, 8, 10 and 12; roof section 2; and/or floor section 4) may be constructed of a variety of materials. In one embodiment, the walls, wall panels, floor, roof, etc. are constructed of a composite material such as fiberglass, carbon fiber, or any other composite material. Alternatively, the panels may be constructed with wood or aluminum framing and sided with wood, aluminum, laminate, fiberglass or any other siding material. The panels may have a solid or hollow core. The panels may be insulated with polystyrene, fiberglass or any other insulating material and/ or vapor barrier, for example, one or more of these may be used inside the panels or on a surface thereof. Interior surfaces may be painted, left unfinished or finished with any appropriate material, such as plastic, wood, fiberglass paneling, or other material. In one embodiment, the walls, wall panels, floor, roof, etc. may include an insulated inner core and an outer skin made of composite material.

A mattress 32 or mattress 200 (described below) may be contained within the shelter/camper, and may be any standard size mattress (Twin, Twin XL, Full, Full XL, Queen, King, California King) or any custom size mattress. The mattress may be foam, inner-spring, or any type of mattress commonly available. In one embodiment, the mattress 32 or 200 may sit within raised edges of the floor section 4.

The shelter/camper may be constructed with a variety of dimensions and shapes. The shelter/camper is depicted in the figures as rectangular, but could be formed in a square, triangular, pentagonal, hexagonal, polygonal, etc. shape. The dimensions can be constructed to accommodate or contain a variety of mattresses and fixtures and to have a variety of heights for a user to sleep, crawl, sit, stand up, etc.

In one embodiment (e.g., as shown in FIGS. 1 and 5), the exterior dimensions of a shelter/camper that contains a 4" thick Full mattress (e.g., 54"×75" give or take a couple of inches), 1" thick front and rear wall panels hinged to the roof may be 56" W×79" L×45" H in an open/expanded configuration and 56" W×79" L×9" H in a closed/collapsed configuration. This example has 18" H×77" L bi-fold side panel sections 22, 24, 26 and 28. It has a 6" tall floor section 4, which has a floor thickness of 1", plus 4" of space to accommodate the mattress 32, plus 1" of space to accommodate the 1" thick lower sections 22 and 26 of the side wall panels 10 and 12 when closed. It may have a 3" tall roof section 2 with a ceiling thickness of 1", plus 1" of space to accommodate the 1" thick upper sections 24 and 28 of the side wall panels 10 and 12, plus 1" of space to accommodate the 1" thick front wall panel 6 and rear wall panel 8 when in the closed/collapsed configuration. In this example, the front wall panel 6 and the rear wall panel 8 may each be 54" W×38" H. In this example, the roof section 2 and the floor section 4 may have interior edges that are 1" shorter than their exterior edges, to provide better hinge and latch points and water tightness as described above. With the shelter/camper fully opened/expanded, the distance between the exterior edges of the roof section 2 and the floor section 4 may be 36", and the distance between the interior edges of the roof section 2 and the floor section 4 in the front and rear of the shelter/camper may be 38". The front and rear wall panels may then be 38" tall to extend between the interior edges of the roof section 2 and the floor section 4. The distance between the ceiling and the mattress may be 39", resulting in over 3' of interior height. These example dimensions are for a shelter/camper with a Full mattress. Dimensions of components may vary depending on the size of the mattress the shelter/camper contains and other features or desired dimensions. For example, the widths, lengths, and heights described in this paragraph may vary by plus or minus 15", plus or minus 12", plus or minus 6", plus or minus 3", or more or less than these.

FIGS. 6-11 illustrate another exemplary embodiment of a shelter or camper. Camper 100 depicted in FIGS. 6-11 may include features the same as or similar to those described above with respect to camper 1 (and camper 1 may include features the same as or similar to those of camper 100). In one embodiment, camper 100 may be configured as a hard-sided, collapsible camping unit that is a fully enclosed, weather tight, lockable and private living structure while in an open/expanded configuration and is an easily portable, hard case for transportation while in a closed/collapsed configuration. While camper 100 is in an open/expanded configuration, occupants may be able to sleep, sit, eat or use the bathroom in a properly equipped unit. The walls, wall panels, floor, roof, etc. may be constructed of rigid material or of materials similar to those described above with respect to camper 1. In one embodiment, camper 100 may be configured as a stationary or non-portable shelter with similar features to those described herein, but configured to remain in a permanent or semi-permanent location.

In one embodiment, the structure (e.g., a rigid structure) of the shelter/camper 100 in both opened/expanded and closed/collapsed configurations may allow the shelter/camper to contain a mattress, seating, kitchen and bathroom fixtures, as well as televisions, lighting, electrical outlets, solar panels, batteries, heating and cooling appliances and any other system or convenience components that may be permanently or temporarily attached to or included in the shelter/camper. A rigid structure may also provide protection from the elements by forming a secure, weather-tight enclosure that may be heated or cooled with optional equipment. A rigid structure design may also allow the use of insulation in the structure's panels, further improving its interior climate control performance. The rigid structure (e.g., including hard-siding) may offer security by being lockable in both opened/expanded and closed/collapsed configurations.

While in the open/expanded configuration, the shelter/camper 100 can provide a comfortable interior standing height with the bed system fully raised and stored (e.g., with the mattress 200 stored at the top of the camper 100 as shown in FIG. 1), or can provide a comfortable height for siting, sleeping and crawling when the bed system is lowered to a sleeping position (e.g., with mattress 200 in a low or middle position as shown, for example, in FIG. 8). The mattress 200 may be positioned in different locations (e.g., at different heights) in the camper 100 for different purposes/uses. When the camper 100 is closed, it may be collapsed into a low-profile, case (e.g., a hard case) that may be mounted to a vehicle roof rack; placed in the bed of a pick-up truck; placed on a trailer and towed behind a car, truck, motorcycle, bicycle or any other tow vehicle; placed in or on a boat; and/or placed anywhere there is a sufficient foundation or surface below and sufficient height above while open/expanded. The shelter/camper may be designed and configured to be easily and quickly opened/expanded in place for occupancy and closed/collapsed when in transit or in storage.

Figure 10:
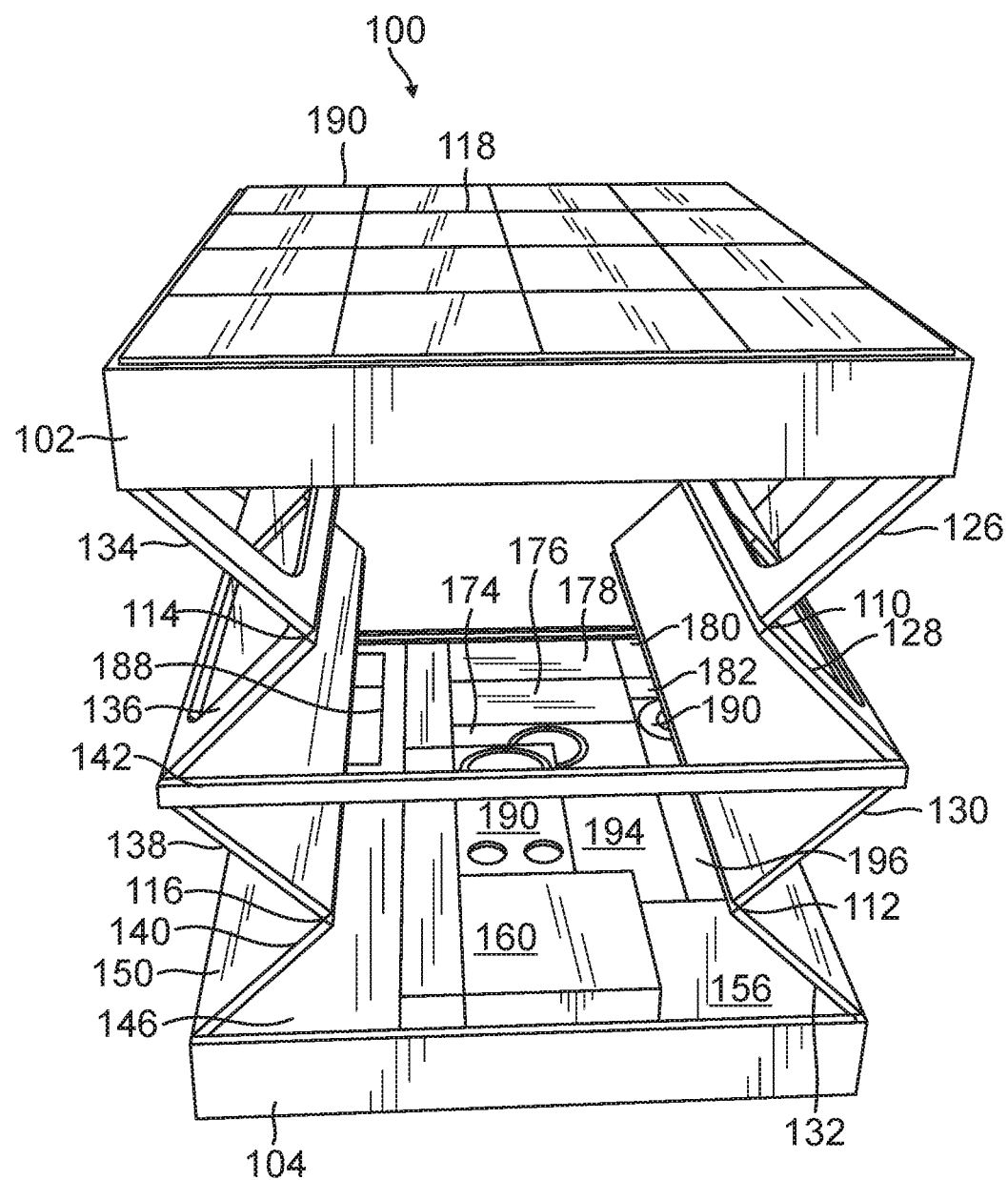
FIG. 10 shows a top, front perspective view of the shelter of FIG. 6 in a second transition position between an open or expanded configuration and a closed or collapsed configuration.
Figure 11:
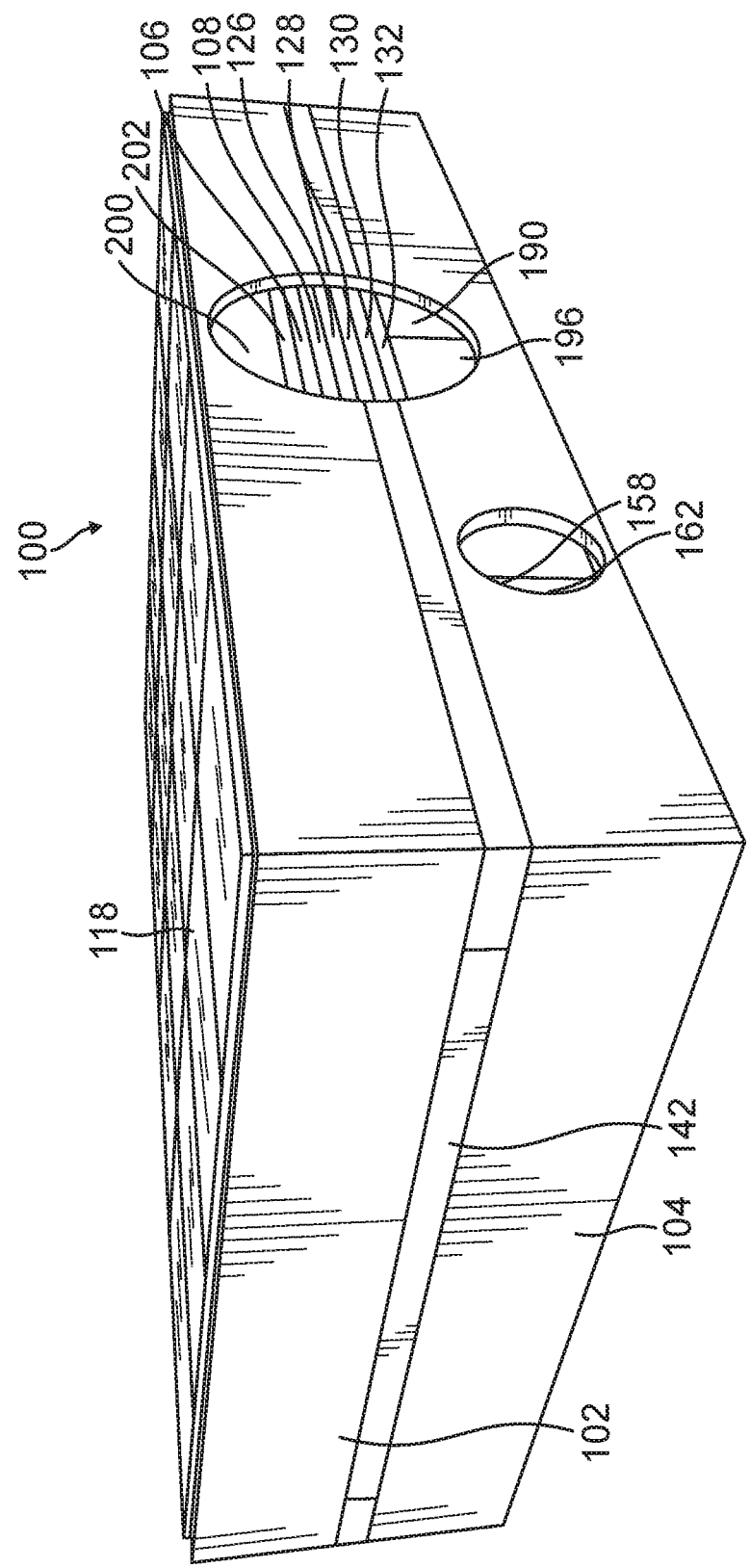
FIG. 11 shows a perspective view of the shelter of FIG. 6 in a closed or collapsed configuration.

Camper 100 may include wall panels 106, 108, 110, 112, 114 and 116, which may be rigid, folding, bi-folding, tri-folding, quadri-folding, multi-folding, or may be similar to other panels described herein. In one embodiment, camper 100 may maintain a rigid structure in both opened/expanded (FIGS. 6-8) and closed/collapsed (FIG. 11) configurations by use of rigid wall panels 106, 108, 110, 112, 114 and 116 (e.g., folding and bi-folding wall panels, or panels similar to those described with respect to camper 1). The wall panels 106, 108, 110, 112, 114 and 116 may be hinged and/or latched to a rigid roof section 102, a mid-section connector 142, and/or a rigid floor section 104. When opening/expanding (e.g., as shown in transition in FIGS. 9 AND 10), the wall panels 106, 108, 110, 112, 114 and 116 may be extended vertically until they are perpendicular to the roof section 102 and floor section 104. When closing/collapsing the camper 100 (e.g., as shown in transition in FIGS. 13-16), the wall panels 106, 108, 110, 112, 114 and 116 may be folded flat or until they are parallel to the roof section 102 and floor section 104. When fully opened/expanded (e.g., as shown in FIGS. 6-8), the shelter/camper 100 may provide comfortable living quarters for occupants. When closed/collapsed (e.g., as shown in FIG. 11), the roof section 102, floor section 104, and mid-section connector 142 (if used), may come together to form a weather tight and portable case, fully enclosing all interior fixtures that may remain in the shelter/camper and front, rear and side wall panels. Components of the shelter/camper 100 may be the same as or similar to components of shelter/camper 1 described above; additional components/features are also described in detail below.

Figure 9:
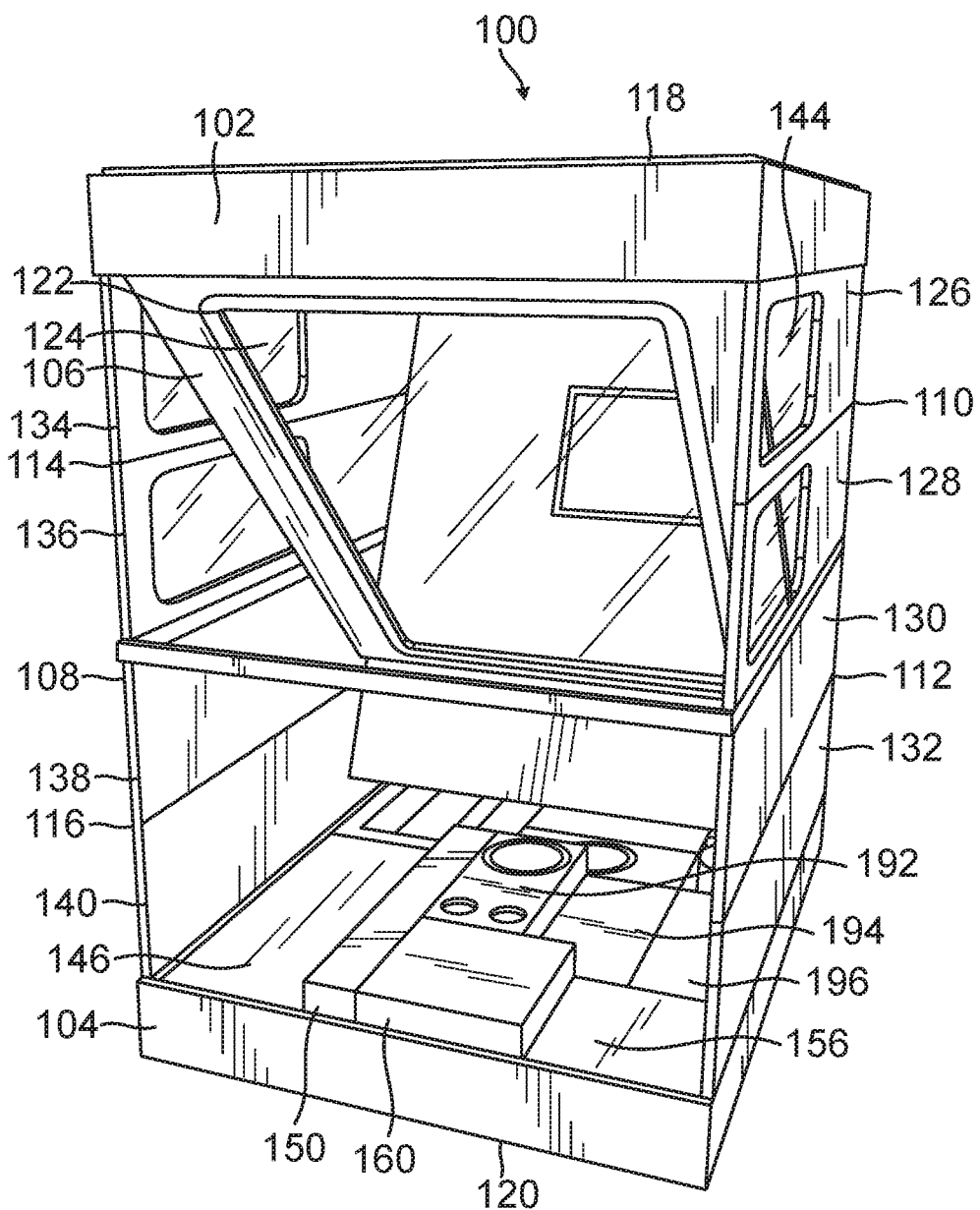
FIG. 9 shows a front perspective view of the shelter of FIG. 6 in a first transition position between an open or expanded configuration and a closed or collapsed configuration.

Shelter/camper 100 may have one or more wall panels the same as or similar to the wall panels of camper 1 described above. The wall panels may be rigid, folding, bi-folding, tri-folding, quadri-folding, multi-folding, etc. Optionally, the side wall panels may be a combination of two or more bi-fold panels, may be a quadri-fold panel, or may be another type of panel or combination of panels. In one embodiment, as shown in FIGS. 6-10, the shelter/camper 100 may have two pairs of right side bi-fold wall panels 110 and 112 and two pairs of left side bi-fold wall panels 114 and 116. Each wall panel and/or section of the wall panels may be of similar size/dimensions as the wall panels and sections of wall panels described above with respect to camper 1. In one embodiment, the height of the sections of the wall panels may be between 18" to ½ of the interior width of the shelter/camper. Combined with space provided by the roof section 102, a mid-section connector 142, and the floor section 104, this may allow for well over 6' of interior height (e.g., as shown in FIG. 7) between the floor and bed system (including mattress 200 and platform 202) when the shelter/camper is in the open/expanded configuration (e.g., as shown in FIGS. 6 and 7), and when the bed system is fully raised and stored (e.g., as shown in FIG. 7). The right side wall panels may sit side by side with the left side wall panels, without overlapping, when folded for closing/collapsing of the shelter/camper or in the closed/collapsed configuration (e.g., as shown in FIGS. 10 and 11).

In an embodiment with four pairs of bi-fold wall panels, all four pairs of bi-fold wall panels may be slightly longer than the mattress 200 contained within the shelter/camper or longer. For example, a shelter/camper with an adult mattress about 80" long may have bi-fold wall panel sections that are roughly 18"×82" or longer, extending roughly 1" (or the equivalent thickness of the front or rear wall panels) or more beyond each end of the mattress. This configuration may allow the front wall panel 106 and rear wall panel 108 edges to sit flush with the side wall panel edges when the shelter/camper is in an open/expanded configuration; with weather stripping or gaskets, this can create a weather tight corner joint between side walls and front and rear walls. Arranging/positioning the front wall panel 106 and rear wall panel 108 between the side wall panels may also allow the front and rear wall panels to prevent the side wall panels from folding inward when the shelter/camper is in the open/expanded configuration. In one embodiment, the right and left side walls may each have a set of upper bi-fold wall panels 110 and 114 and a set of lower bi-fold wall panels 112 and 116. The upper panel sections 126 and 134 of the upper wall panels 110 and 114 may be hinged on the top to an edge (e.g., a dropped edge) of the roof section 102, and the lower panel sections 128 and 136 of the same set of upper wall panels may be hinged on the bottom to the top of an optional mid-section connector 142 or other panel. The bottom of the mid-section connector 142 may be hinged to the tops of upper panel sections 130 and 138 of the lower set of wall panels 112 and 116, and the lower panel sections 132 and 140 of the same set of lower wall panels 112 and 116 may be hinged on the bottom to the raised edge of the floor section 104. Weather stripping or gaskets along some or all of the edges of each section of the wall panels may form weather tight joints between the side walls and the roof, mid-section connector and floor and in between the upper and lower wall sections of the wall panels. Latches, hooks, locks, or other connectors/attachments may also be used at the corners or joints between the walls, panels, connector(s), sections, etc. (e.g., between side walls and front and rear walls) to help securely hold the walls, panels, connector(s), sections, etc. together and in position when in the open/expanded configuration.

Shelter/camper 100 may also include slide latches (or other latches or locks) that can slide or be positioned between the walls, wall panels, or sections of the wall panels (e.g. to prevent folding or other undesired movement). For example, wall panel slide latches may be included that can slide or be positioned between the upper sections 126, 130, 134, and 138 and the lower sections 128, 132, 136 and 140 to further prevent the wall panels from folding inward and to help maintain the open/expanded configuration. When in a closed/collapsed configuration, all wall panels may sit entirely inside the closed case formed by the roof section, mid-section connector, floor section, and/or any combination of these. Each section of each of the upper wall panels 110 and 114 may also contain a window or multiple windows 144. The windows may be fixed or capable of being opened. The windows may also include or be fitted with screens and blinds. Any or all wall panels may also include fixtures such as light switches, electrical outlets, wall-mounted televisions, storage pockets, storage hooks, venting fans, electrical connections, plumbing connections and attachments for mounting heating/cooling equipment. The wall panels may include a mechanical system or components of a mechanical system for opening/expanding and closing/collapsing of the shelter/camper. The mechanical system may include a crank, pump, lever, pulley, spring(s), piston(s), hinges, spring-loaded hinges, motorized hinges, motor, other opening/closing mechanisms or components, and/or any combination of one or more of the foregoing as appropriate for the size and weight of the shelter/camper. The wall panels may also include fixtures such as mirrors, tables, or seat back rests embedded in their interior surfaces. The wall panels may also include components of a track or pulley system for raising and lowering of the bed system (e.g., including a mattress 200 and a platform 202).

In one embodiment, shelters/campers may have a width greater than or equal to 72", e.g., to contain a King (e.g., 76"×80" give or take a couple of inches) or California King (e.g., 72"×84" give or take a couple of inches) mattresses, which may achieve an interior height sufficient for standing with only one set of wall panels per side, e.g., similar to the side wall design of camper 1 above. For example, use of one pair of bi-fold wall panels with panel sections that are 36" tall (rather than 18" tall) per side may result in a standard interior height of over 6', combined with the heights of the floor and roof sections, when the shelter/camper is in an open/expanded configuration. In this case, no mid-section connector may be necessary and the bi-fold wall panels may be hinged in a similar manner as with camper 1.

The front wall panel 106 and rear wall panel 108 may be the same as or similar to the front wall panel 6 and the rear wall panel 8 of camper 1. The front wall panel 106 and rear wall panel 108 may have a fixed length, or may be bi-fold or multi-fold panels hinged to edges (e.g., dropped, interior edges 204 and 206 as shown in FIG. 7) of the roof section 102 in the front and rear of the shelter/camper. The front and rear wall panels may be at least the same width as, slightly wider than, or wider than a mattress 200 contained within the shelter/camper. As can be seen in FIG. 7, the front and rear wall panels 106 and 108 may be long enough to extend between an edge (e.g., a dropped interior edge 204 and 206) of the ceiling/roof and an edge (e.g., a raised interior edge 208 and 210) of the floor section. In one embodiment with fixed length front and rear panels, the panels have a length less than the interior length of the shelter/camper. The front wall panel 106 may be hinged at least 1" (or an equivalent thickness of the wall panels) higher than the rear wall panel 108. In other words, the hinge points on the edges (e.g., on interior dropped edges 204 and 206) in the front and rear of the roof section 102 may be staggered for the front and rear wall panels. This may allow the front wall panel 106 to sit above the rear wall panel 108 when the walls are folded for closing/collapsing of the shelter/camper. The hinge points may be staggered to allow the rear wall panel to sit above the front wall panel when the shelter/camper is closed/collapsed.

When opening/expanding the shelter/camper (e.g., as shown in transition in FIG. 9), the unattached (free or unhinged) ends of these wall panels may be lowered until they latch, connect, or otherwise attach to an edge (e.g., raised, interior edges 208 and 210) of the floor section 104 in the front and rear of the shelter/camper, forming a continuous and weather tight front and rear wall connecting the roof and floor. Alternatively, the front and rear wall panels may be hinged to edges (e.g., raised, interior edges 208 and 210) of the floor section 104 and raised to latch, connect, or otherwise attach to edges (e.g., lowered interior edges 204 and 206) of the roof section 102. When the shelter/camper is in an open/expanded configuration as shown in FIG. 6, the walls may be completely unfolded. The front and rear wall edges may sit flush with the side wall edges, forming a weather tight corner joint as described above. Latches, hooks, locks, weather stripping, or other connectors/attachments may optionally be used at the corners or joints between the walls, panels, connector(s), sections, etc. (e.g., between side walls and front and rear walls) to help securely hold the walls, panels, connector(s), sections, etc. together and in position when in the open/expanded configuration. The front and rear wall panels, if hinged to the roof section 102, may sit between the mattress platform 202 and the upper sections 126 and 134 of the upper pairs of wall panels 110 and 114 when closed/collapsed. If the front and rear wall panels are hinged to the floor section 104, the front and rear wall panels may sit between the lower sections 132 and 140 of the lower pairs of wall panels 112 and 116 and any fixtures included in the floor section. When in closed/collapsed configuration, all wall panels may sit entirely inside the closed case formed by the roof section, mid-section connector, floor section, and/or a combination of these (e.g., as shown in FIG. 11). Optionally, the front and rear wall panels may also be bi-fold (e.g., folding in half) or multi-fold panels. The panels or sections of the panels may include a door or large window in one or more sections or halves of the front or rear wall panels.

If the side walls are constructed of multiple side panels (e.g., an upper and lower pair of bi-fold wall panels), this configuration may allow portions of the shelter/camper to be opened/expanded while others are closed/collapsed to create a variable height or variable size shelter/camper. For example, in one embodiment, upper bi-fold wall pairs 110 and 114 may be fully opened while lower bi-fold wall pairs 112 and 116 remain closed. Then only the upper half of the bi-fold front and rear panels can be latched to the mid-section connector, forming a full enclosure in just the upper half of the shelter/camper to allow sleeping. The front wall panel 106 may include a door 122, and the door may contain a window 124 or multiple windows. The doors and/or windows may include locks, latches, etc. Any door 122 or window 124 may include weather stripping or gaskets, creating a weather tight seal between the door and the rest of the front wall panel, when the door is closed.

The front wall panel may also latch to a portion of the mid-section connector in the front of the shelter/camper, allowing that portion of the mid-section connector to swing open and closed with the door, or alternatively that portion of the mid-section connecter can simply be left open and swung away to allow free operation of the door, when the shelter/camper is open/expanded. The front and rear wall panels may each contain a window 144 or multiple windows. The windows may be fixed or capable of being opened. The windows may also include or be fitted with screens and/or blinds. The front and rear wall panels may also include fixtures such as light switches, electrical outlets, wall-mounted televisions, venting fans, storage pockets, storage hooks, electrical connections, plumbing connections and attachments for mounting heating/cooling equipment. The front and rear wall panels may include a mechanical system or components of a mechanical system for opening/ expanding and closing/collapsing of the camper. The mechanical system may include a crank, pump, lever, pulley, spring(s), piston(s), hinges, spring-loaded hinges, motorized hinges, motor, other opening/closing mechanisms or components, and/or any combination of one or more of the foregoing as appropriate for the size and weight of the shelter/camper. The front and rear wall panels may also include components of a track or pulley system for raising and lowering of the bed system (e.g., mattress 200 and platform 202) or the bed system may be removed and reinserted in a variety of slots at different heights (e.g., similar to adjustable levels in an oven).

The roof section 102 of camper 100 may be the same as or similar to roof section 2 of camper 1. For example, the roof section 102, in one embodiment, may be flat across the entire length and width of the shelter/camper and may have a continuous dropped edge along the perimeter of the shelter/camper. Optionally, the roof section 102 may be curved, contoured, ridged, or include other aerodynamic features as discussed above with respect to camper 1. The dropped edge may be tall enough to completely contain the bed system (e.g., mattress 200 and platform 202), the front wall panel 106, rear wall panel 108, and the side wall panels or sections of the side wall panels (e.g., upper sections 126 and 134 of the upper pairs of side wall panels 110 and 114) inside the roof section 102 when the shelter/camper is in the closed/collapsed configuration (e.g., as shown in FIG. 11). The bed system may be fully raised and the wall panels may be folded flat in the closed/collapsed configuration.

In one embodiment, the roof section 102 may include an interior front and rear edge that is shorter than the exterior edge so that the joint between it and the front and rear wall panels hinged to it can remain inside the roof section, providing a better hinge point and water tightness when the shelter/camper is open/expanded. The front interior edge may also be a different height than the rear interior edge of the roof section to allow the front and rear wall panel hinge points to be staggered, allowing one wall panel to rest above the other when the shelter/camper is folded. In one embodiment, the front and rear wall panels may each be long enough to extend between the interior edges of the roof and the interior edges of the floor. If the front and rear wall panels are hinged to the floor section, then the dropped edge of the roof may be tall enough to only contain the bed system, and/or upper sections of the upper wall panels, when in a closed/collapsed configuration. The roof section 102 may have a length and width equivalent to the floor. The width may be about the same as, slightly greater than, or greater than that of a mattress 200 contained within the shelter/camper, and the length may be about the same as, slightly greater than, or greater than the length of the side wall panels. Having the width and length at least slightly greater than the mattress may ensure that the mattress sits completely within the 4 walls that are attached to the roof section and the mattress and walls sit entirely inside the shelter/camper when closed/collapsed. For example, a shelter/camper containing a Queen mattress (e.g., 60"×80" give or take a couple of inches) and having 1" thick panels, may have a roof section that is about 62" wide×84" long (or slightly longer than the side walls, which may be 82" long in this case). The edge(s) (e.g., a continuous dropped edge) of the roof section 102 may include weather stripping or gaskets that may form a weather tight seal between it and the walls or wall panels connected to it. The weather stripping or gasket may also form a weather tight seal with the mid-section connector 142 when the shelter/camper is in a closed/collapsed configuration (e.g., as shown in FIG. 11).

The top of the roof section 102 may include solar panels 118, roof rack attachments and/or antennae for radio, television and/or internet transmissions. The interior of the roof section 102 (i.e., the ceiling of the shelter/camper) may include light fixtures and/or other fixtures such as light switches, electrical outlets, ceiling-mounted televisions, venting fans, storage pockets, storage hooks, electrical connections, plumbing connections and attachments for mounting heating/cooling equipment. The roof section 102 may include a mechanical system or components of a mechanical system for opening/expanding and closing/collapsing of the camper. The mechanical system may include a crank, pump, lever, pulley, spring(s), piston(s), hinges, spring-loaded hinges, motorized hinges, motor, other opening/closing mechanisms or components, and/or any combination of one or more of the foregoing as appropriate for the size and weight of the shelter/camper. The roof may also include components of a track or pulley system for raising or lowering of the bed system (e.g., mattress 200 and platform 202). The roof section 102 may also include lock and latch components or other connection components to latch it to the mid-section connector and/or floor section to keep the shelter/camper closed tightly. The roof section 102 may also include handles (e.g., in the front and rear and/or on the sides of the shelter/camper) for manual lifting or lowering of the roof section 102 for opening/expanding or closing/collapsing of the shelter/camper, respectively, or for carrying the shelter/camper when closed/collapsed. The roof section 102 may include lights or light fixtures internally and/or externally. Internally, lights or light fixtures may provide light for the occupant. Externally, the lights may act as car lights (e.g., tail lights, brake lights, head lights, etc.) and may connect with the lights or other electronics of the vehicle towing the shelter/camper such that the lights of each are similarly controlled (e.g., brake lights on each are coordinated).

Figure 17:
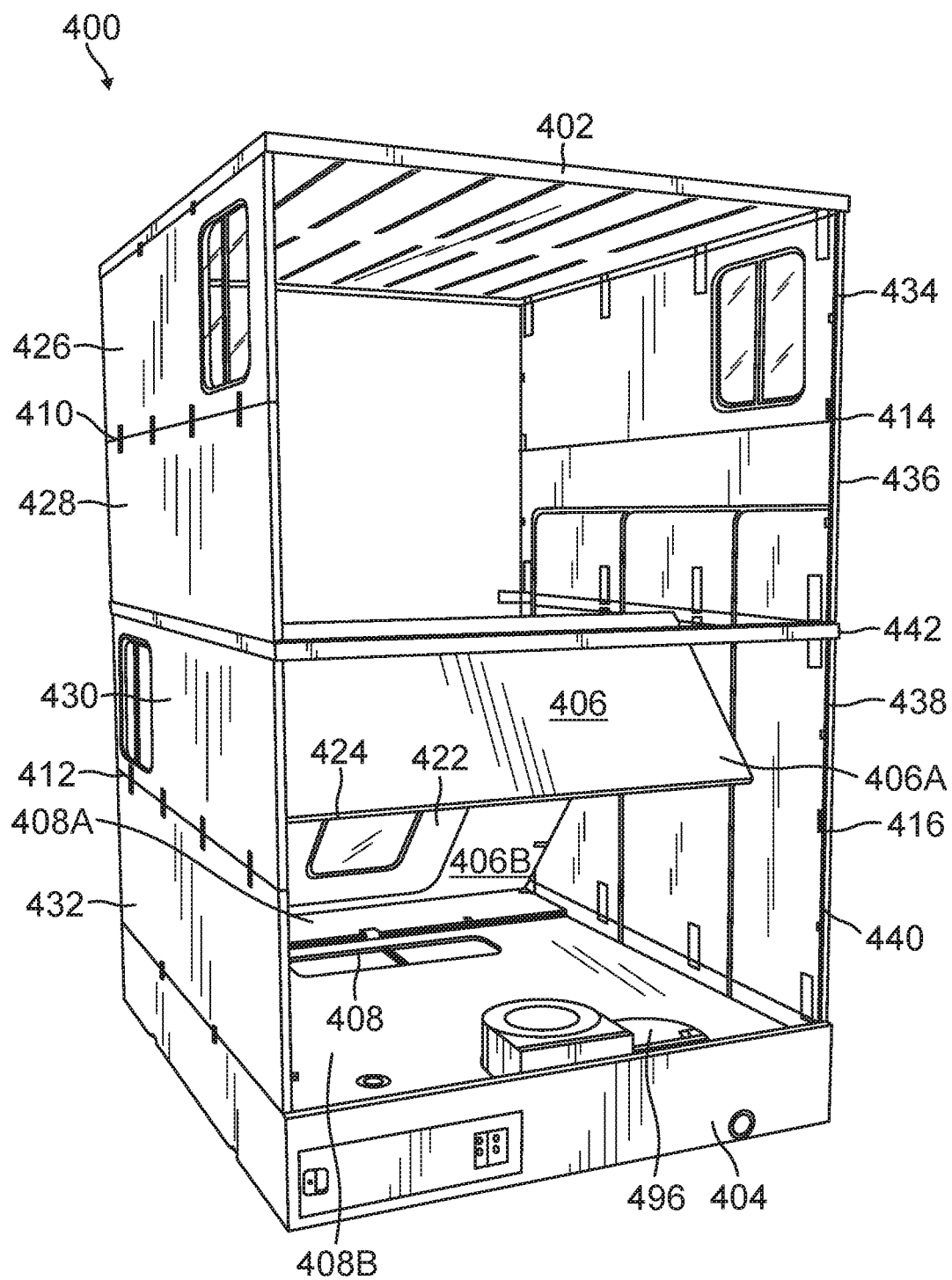
FIG. 17 shows a rear perspective view of the shelter of FIG. 12 in a transition position between an open or expanded configuration and a closed or collapsed configuration.

The shelter/camper 100 may include one or more connectors or connector components/sections (e.g., the same as or similar to connector 142). In one embodiment, connector 142 may be a mid-section connector. Connector 142 may be a continuous, structural ring around the perimeter of the shelter/camper (e.g., for shelter/campers that have two or more pairs of wall panels per side). The connector 142 may connect the upper pairs of wall panels (e.g., wall panels 110 and 114) to the lower pairs of wall panels (e.g., wall panels 112 and 116). The connector 142 may be tall enough to allow the lower sections 128 and 136 of the upper pairs of wall panels and the upper sections 130 and 138 of the lower pairs of wall panels to sit completely or partially within the connector 142 when the shelter/camper is in a closed/collapsed configuration, and all wall panels are folded flat. Assuming 1" thick panels, this may result in at least a 2" tall mid-section connector, but the connector 142 may be a variety of sizes, including 1" to 24" tall, 2" to 12" tall, or 2" to 6" tall. The connector 142 may give structural rigidity to the shelter/camper during the opening/expanding and closing/collapsing processes or transitions (e.g., as may be seen in FIGS. 9 and 10). The connector 142 may include weather stripping or gaskets that may form a weather tight seal between it and the walls or wall panels connected to it. The weather stripping or gasket may also form a weather tight seal with the roof section 102 and/or the floor section 104 when the shelter/camper is in a closed/collapsed configuration (e.g., as shown in FIG. 17).

The connector 142 may include a portion/segment (e.g., a front end portion/segment) that may be hinged and/or latched on one or both sides of an end or portion of the shelter/camper (e.g., at a portion of a mid-section connector across the front door 122) allowing the door 122 to open and close freely when the shelter/camper is in an open/expanded configuration. This hinged/latched portion may be unlatched from the rest of the connector 142 allowing the hinged/latched portion to swing open and closed with the door 122, if attached to the door. Optionally, the hinged/latched portion may be unlatched and swung away to the side or completely removed to allow free movement of the door 122. During opening/expanding, closing/collapsing, and in closed/collapsed configuration, this hinged/latched portion of the connector 142 may be latched to the rest of the connector 142, forming a continuous structural ring around the perimeter of the shelter/camper. If only a portion of the shelter/camper is to be opened/expanded (e.g., if only the top half is opened/expanded), the bottom ends of the upper panel sections of the front and rear wall panels may latch to the connector 142, and the connector may remain in a locked position. A window or half door in the upper section of a front wall panel may allow entry to and exit from the shelter/camper, if just the upper half of the shelter/camper is opened/expanded for sleeping. For shelter/campers with bi-fold front and rear wall panels, both halves of the door in the front bi-fold wall panel may latch to the connector 142 and operate as one whole door when the shelter/camper is fully open/expanded. The connector 142 may include components of a lock, latch and/or hinge system. The connector 142 may also include handles (e.g., in the front and rear and/or on the sides of the shelter/camper) for manual lifting or lowering of a portion/section (e.g., the mid-section) of the shelter/camper during opening/expanding or closing/collapsing of the shelter/camper, respectively, or for carrying the shelter/camper when closed/collapsed.

The floor section 104 may be the same as or similar to the floor section 4 of camper 1 above. In one embodiment, the floor section 104 may be flat across the entire length and width of the shelter/camper and may have an edge (e.g., a continuous raised edge) along all or a portion of the perimeter of the shelter/camper. Optionally, the floor section 104 may be curved, contoured, ridged, and/or include other aerodynamic features as discussed previously. A raised edge may be tall enough to completely contain various fixtures or components (e.g., an optional dinette, kitchenette, bath and interior accordion wall fixtures) (see e.g., components 146-170, 174-198 in FIG. 7). The raised edge may be tall enough also to contain wall panels or sections of wall panels (e.g., the lower sections 132 and 140 of the lower pairs of wall panels 112 and 116 inside the floor when the shelter/camper is closed/collapsed (e.g., as shown in FIG. 11). In one embodiment, the interior fixtures may be folded, minimized, or rearranged to reduce size in the closed/collapsed configuration. The floor section 104 may include an interior edge 208 in the front and an interior edge 210 in the rear of the shelter/camper that are slightly shorter than adjacent exterior edges so that the joint between it and the front and rear wall panels latched to it can remain inside the floor section 104, which may also provide a better hinge point and water tightness when the shelter/camper is open/expanded. If the front and rear wall panels are hinged to the floor section, then a raised edge of the floor may be tall enough to accommodate those panels as well, when in the closed/collapsed configuration.

The floor section 104 may have a length and width that matches or is equivalent to the roof section 102 or floor section 4. The width may be about the same as, slightly greater than, or greater than that of a mattress 200 contained within the shelter/camper or wider, and the length may be about the same as, slightly greater than, or greater than the length of the side wall panels or longer. Having the width and length at least slightly greater than the mattress may ensure that the mattress sits completely within the walls or wall panels that are attached to the floor section 104. The dimensions may be such that the mattress 200, walls/wall panels, interior fixtures, etc. sit entirely inside the shelter/camper when closed/collapsed. For example, a shelter/camper containing a Queen mattress (e.g., 60"×80" give or take a couple of inches) and having 1" thick panels, may have a floor section that is 62" wide×84" long (slightly longer than the bi-fold side walls, which may be 82" long). The edge(s) (e.g., a continuous raised edge) of the floor section 104 may include weather stripping or gaskets that may form a weather tight seal between it and the walls/wall panels connected to it. The weather stripping or gasket may also form a weather tight seal with the connector 142 when the shelter/camper is in the closed/collapsed configuration.

The bottom of the floor section 104 may include an access panel 120, allowing access to batteries and/or other system components (e.g., any components or features discussed with respect to floor section 4). The bottom or sides of the floor section (internally or externally) may also include access panels or ports, allowing access to plumbing or electrical connections for fresh water supply, waste and waste water drainage, fuel supply (e.g., propane) or electrical supply (e.g., external generator). The floor section 104 may include fixtures such as lighting, light switches, electrical outlets, venting fans, storage pockets, electrical connections, plumbing connections and attachments for mounting heating/cooling equipment. The floor section 104 may include a dinette with storage (e.g., a left side back rest 146, a left side seat 148, under left seat cabinets 150 and 152, a piston lift 154 to raise the left side seat height, a right side back rest 156, a right side seat 158, under right seat cabinets 160 and 162, and/or a piston lift 164 to raise the right side seat height); kitchenette (e.g., a kitchenette section 192 with a sink, faucet and/or burners, kitchenette sections 194 and 196 with storage, refrigeration, and/or plumbing components and a piston lift 198 to raise the kitchenette height); bathroom (e.g., a vanity section 174 with a sink and faucet, vanity sections 176, 178, 180 and 182 with storage and/or plumbing components, piston lifts 184 and 186 to raise the vanity height, a shower 188, and/or a toilet 190); and/or interior accordion wall fixtures (e.g., a left side accordion wall 166, a right side accordion wall 168, and/or an accordion door 170); and other associated components. The floor section 104 may also include attachments to allow mounting to vehicle roof racks, utility trailers or pick-up truck beds or secure attachment to any surface below it. The floor section 104 may include a mechanical system or components of a mechanical system for opening/expanding and closing/collapsing of the camper. The mechanical system may include a crank, pump, lever, pulley, spring(s), piston(s), hinges, spring-loaded hinges, motorized hinges, motor, other opening/closing mechanisms or components, and/or any combination of one or more of the foregoing as appropriate for the size and weight of the shelter/camper. The floor section may also include connection, lock, and/or latch components to latch it to a connector 142 and/or the roof section 102 to keep the shelter/camper closed tightly. The exterior of the floor section 104 may also include small wheels for transportation or direct towing/pulling (e.g., transportation over short distances like that to and from a vehicle). The floor section may also include fixed height or adjustable feet removably or permanently attached thereto (e.g., to one or more exterior portions of the floor section). The Floor section 104 may include lights or light fixtures internally and/or externally. Internally, lights or light fixtures may provide light for the occupant. Externally, the lights may act as car lights (e.g., tail lights, brake lights, head lights, etc.) and may connect with the lights or other electronics of the vehicle towing the shelter/camper such that the lights of each are similarly controlled (e.g., brake lights on each are coordinated).

The bed system may comprise or consist of a mattress 200, a mattress platform 202, components of a system for raising and lowering of the bed, and/or other components. The bed system may be stored in or near the roof section 102 (e.g., as shown in FIG. 7) when the shelter/camper is in an open/expanded configuration, and when maximum standing height below the bed is preferred, or when the shelter/camper is closed (e.g., as shown in FIG. 11). As shown in FIG. 8, the bed system may be lowered or positioned at a variety of heights, including to a position about half of the interior height of the shelter/camper (or any comfortable height between the ceiling of the shelter/camper and any fixtures below the bed platform) to allow entry to the sleeping area while still allowing any dinette, kitchenette, bathroom or any other fixtures below it to remain in either collapsed or stacked/extended configurations. The bed system may be positioned at any height between the ceiling of the shelter/camper and any fixtures below the bed platform to allow comfortable access to either the sleeping area, the area below the bed or both areas simultaneously. The bed system may be raised or lowered manually or mechanically using a track system; slots, ledges, a cable system, a pulley system, a hook system; and/or using a combination of components (e.g., a combination of track and pulley systems); or using some other system capable of easily and quickly raising and lowering the bed system. A mechanical system for raising or lowering the bed system may be powered or operated manually.

The bottom surface of the bed platform may serve as a ceiling for the areas below the bed, when the shelter/camper is in the open/expanded configuration and the bed system is raised or located in or near the top of the shelter/camper; therefore the bed system or bed platform 202 may include light fixtures, components to attach one or more accordion walls 166 and 168, curtains, dividers, an accordion door 170, a shower curtain, and/or any combination of these. As the bed system rises or lowers, any accordion walls, curtains, dividers, accordion door, and/or shower curtain may rise and lower with the bed system, without detachment from it. This may allow the shelter/camper to quickly convert between sleep and standing height positions. If the shelter/camper is wide and long enough to just contain the mattress, then movement from the sleeping area to the living, kitchen and bathroom areas, and vice versa, with the bed in sleep position (FIG. 8), may be accomplished by exit and reentry through the door 122. If however, the shelter/camper is sufficiently wider or longer than the mattress contained in the shelter/camper, then movement between the sleep area and the other areas may be possible without exiting and reentering the shelter/camper. Movement between the sleep area and other areas may also be possible via a hatch in the bed platform, and a movable or removable section of the mattress.

In one embodiment, the shelter/camper may include bi-fold front and rear wall panels and may be capable of opening/expanding only the upper half of the shelter/camper for sleeping while allowing the lower half to remain closed/collapsed. The bed may then be lowered to rest above the horizontal, lower sections of the front and rear bi-fold wall panels below it, to allow enough room for sleeping. The bed platform 202 may also include other fixtures such as light switches, electrical outlets, ceiling-mounted televisions, storage pockets, storage hooks, removable tables, electrical connections and plumbing connections. The mattress 200 contained within the shelter/camper may be any standard size mattress (Twin, Twin XL, Full, Full XL, Queen, King, California King) or any custom size mattress. The mattress 200 may be foam, inner-spring, or any type of mattress commonly available.

The shelters/campers (e.g., camper 1 or camper 100) described herein may include a variety of interior fixtures or components for convenience (see e.g., fixtures/components 146-198) and related system components. Depending on the size of the shelter/camper, several combinations of seating, cooking and bathroom fixtures may be possible. The fixtures or other components described herein may be designed to remain in the shelter/camper when in the closed/collapsed configuration or may be designed to be removed when closing/collapsing the shelter/camper and reinstalled when opening/expanding the shelter/camper. If the interior fixtures are to remain inside the shelter/camper when it is closed/collapsed, the fixture dimensions, especially the heights, may be limited by the available space in the shelter/camper when it is in the closed/collapsed configuration. For example, the dimensions may be limited by the size or depth of the floor section 104 under the wall panels or by the space between wall panels, when all panels are folded flat for closing, or by any space available in the roof section. The floor section 104 may be any depth necessary to accommodate interior fixtures. If desired to reduce the overall height of the shelter/camper when closed/collapsed to allow for easier transportation (e.g., on a roof rack), the height of the floor section may need be kept to a minimum, and interior components may need to be collapsible or removable for closing/collapsing of the shelter/camper.

In one embodiment, as shown in FIGS. 7 and 11, only 7" H×18" W×80" L on each side of the floor section plus 11" H×24 in W×80" L in the center of the floor section may be available for interior components that may remain in the shelter/camper when closed/collapsed. Accordingly, in this and similar situations of other dimensions, interior seat, storage, kitchenette and bathroom components may have to be collapsible into a small area (e.g., no more than 7" or 11" tall sections in the example above), depending on where they will rest in the closed/collapsed shelter/camper. This can be accomplished by use of sectional components that are either connected (e.g., by sliding hinges or some other connectors) or completely detached, which may enable the sections to lay flat for closing/collapsing of the shelter/camper (see FIGS. 9-11) or stacked for use while the shelter/camper is open/expanded (see FIG. 7). For example, seat benches with storage (see e.g., components 146-152 and 156-162), a bath vanity (see e.g., components 174-182) or a kitchenette (see e.g., components 192-196) may be laid flat for closing/collapsing of the shelter/camper or stacked for opening/expanding of the shelter/camper, and possibly even raised to a more comfortable user height by use of lifts, piston lifts (see e.g., components 154, 164, 184, 186 and 198), or other lifting mechanism appropriate for the size and weight of the component. Some components such as the shower basin 188 may be short enough to fit in the space of the floor section without the need to be collapsed or removed, and associated shower components such as a flexible shower head, shower curtain and/or other shower components may fit inside the shower basin. Some components such as a sink faucet and/or drain may either be folded into the sink without detachment, or detached and stored in the available space in the sink or vanity cabinets. The toilet 190 may be a fixed height component that can be removed for closing, may be sectional, or may be a collapsible camp style toilet.

A wall divider may be used between various areas within the shelter/camper (e.g., between the seating/cooking areas and the bathroom area). For example, use of one or more collapsible, accordion-type walls 166-168 with an accordion door 170 may be attachable to the bottom of the bed platform 202, while the shelter/camper is in an open/expanded configuration, whether in a sleep position as shown in FIG. 8 or in a standing height position as shown in FIG. 7. The accordion wall(s) and accordion door may be detachable and compressible into the floor area below the folded wall panels while the shelter/camper is in a closed/collapsed configuration. Similarly, a shower curtain can be attached to the bed platform 202 while the shelter/camper is open/expanded and detached while the shelter/camper is closed/collapsed. In one embodiment, plumbing lines for the kitchenette and bathroom fixtures can be tubes, pipes, flexible tubing, etc. attached to the sectional components themselves, embedded in the panels of the roof, floor, walls or bed platform, or detached and stored when the shelter/camper is closed/collapsed and reattached when the shelter/camper is open/expanded. Fresh water tanks and fuel tanks may be (1) included external to the shelter/camper and attached with piping, tubing, flexible tubing, etc.; (2) placed inside when the shelter/camper is open/expanded and removed when the shelter/camper is closed/collapsed, (3) fitted into any available space inside storage cabinets or in lieu of other components; or (4) otherwise associated and/or connected to the shelter/camper. Other fixtures, such as one or more mirrors 172, wall/ceiling mounted televisions, storage pockets and hooks and other components may be embedded in the panels of the roof, floor, walls or bed platform.

In one embodiment, where the exterior height of the closed/collapsed shelter/camper is not limited or may be greater, e.g., as in shelters/campers designed for attachment to a utility trailer, the depth of the floor section (or height of the raised edge of the floor) may be tall enough to accommodate seating, kitchenette fixtures, bathroom fixtures, and other fixtures or components that do not need to be collapsed when the shelter/camper is closed/collapsed. For example, a floor section 104 with a height of 30-36" or more may accommodate fixtures such as seating, cooking, bath fixtures, etc. that may be permanently installed, do not need to be collapsed and may remain inside the shelter/camper when the shelter/camper is closed/collapsed.

When the shelter/camper 100 is in an open/expanded configuration, all wall panels 106, 108, 110, 112, 114 and 116 may be extended vertically until they are perpendicular to the roof section 102 and floor section 104, forming a complete enclosure that is suitable for sleeping and living, in properly equipped shelter/campers. The front wall panel 106 and rear wall panel 108 may sit flush against the right side wall panels 110 and 112, left side wall panels 114 and 116 and connector/mid-section connector 142. Positioned between the side wall panels, the front and rear wall panels may help prevent the side wall panels from folding inward. Slide latches or other components, as mentioned above, may also be used to help prevent wall panels from folding inward when in an open/expanded configuration. Weather stripping or gaskets may ensure a weather tight seal between all joints. The door 122 may allow entry to and exit from the shelter/camper and may be locked, securing occupants and/or belongings inside the shelter/camper. The door may allow occupants to move between the sleeping area and the areas below the bed system (e.g., mattress 200 and platform 202) in shelter/campers that are just wide and long enough to contain mattress 200. The windows 144 may also be opened or closed.

In open/expanded, standing-height configuration (e.g., as shown in FIG. 7), the shelter/camper may have an interior height between the floor and the mattress platform 202 comfortable enough for most occupants to stand. In an open/expanded, sleeping configuration (e.g., as shown in FIG. 8), the interior height between the mattress and the ceiling may be enough to sit, crawl, sleep and in some cases even stand. In an open/expanded configuration, interior fixtures 146-170 and 174-198 may be stacked and/or extended for use or collapsed for closing/collapsing of the shelter/camper. If the shelter/camper (e.g., in the floor section 104) is tall enough to accommodate interior fixtures that do not need to be collapsed or removed for closure of the shelter/camper, the fixtures can remain in place while the shelter/camper is in open/expanded configuration or in the closed/collapsed configuration. In an open/expanded configuration, the bed system (e.g., mattress 200 and platform 202) may be raised for full standing height (e.g., as shown in FIG. 7), or sleeping position (e.g., as shown in FIG. 8) or any height in between the ceiling and the fixtures (e.g., fixtures 146-170 and 174-198) below the bed system.

If the front and rear wall panels are also bi-fold wall panels and each side wall has an upper and lower pair of bi-fold wall panels, the upper half only may be opened/expanded while the lower half remains closed/collapsed. In this case, with the bed system lowered, just the sleeping area may be accessible. The upper half of the front panel can be latched to the mid-section connector 142 in the front of the shelter/camper, and an openable window or half door in the door may provide entry to the sleeping area, if just the upper half is open/expanded. Water and fuel tanks may be placed externally or internally and connected to interior components as described previously. Use of optional heating and cooling equipment can maintain a comfortable interior environment in an open/expanded configuration. Components such as televisions and other electrical equipment may also be used when the shelter/camper is open/expanded. Optional solar panels 118 and batteries can continue to operate in the open/expanded configuration or in the closed/collapsed configuration. The shelter/camper 100 may remain open/expanded in place on a vehicle roof rack, in a pick-up truck bed, on a trailer, or on any surface that can support its weight and the weight of its occupants.

When the shelter/camper is in closed/collapsed configuration (e.g., as shown in FIG. 11), the bed system (e.g., mattress 200 and platform 202), all wall panels (e.g., wall panels 106, 108, 110, 112, 114 and 116) and all interior components/fixtures that remain in the closed/collapsed shelter/camper (e.g., fixtures/components 146-198) may sit entirely inside a closed case formed by joining the roof section 102, one or more connectors 142 (if used), and/or the floor section 104. In one embodiment, the closed case may contain components in the following order, from top to bottom (e.g., as shown in FIG. 11): Mattress 200, mattress platform 202; front wall panel 106; rear wall panel 108; upper panel sections 126 and 134 of the upper pairs of wall panels 110 and 114; lower panel sections 128 and 136 of the upper pairs of wall panels 110 and 114; upper panel sections 130 and 138 of the lower pairs of wall panels 112 and 116; lower panel sections 132 and 140 of the lower pairs of wall panels 112 and 116; and all interior components/fixtures attached to the floor (e.g., fixtures/components 146-170 and 174-198) (portions of components 158, 162, 190 and 196 are shown in FIG. 11). If the front and rear wall panels are hinged to the floor section instead of the roof section, the order of the front and rear wall panels may be switched or the front and rear wall panels may sit between lower panel sections of the lower pair of bi-fold wall panels and any interior components/fixtures attached to the floor. In embodiments where the front and rear wall panels are also bi-fold wall panels and each side wall has an upper and lower pair of bi-fold wall panels, the lower half of the shelter/camper 100 may be closed and locked while the upper half of the shelter/camper 100 remains open/expanded. The roof section 102, one or more connectors 142, the floor section 104, or various combinations of these may have weather stripping or gaskets in between, forming a weather tight enclosure when in the closed/collapsed configuration. Locks, latches, connectors, etc. connecting the roof section, mid-section connector and the floor section may ensure the case remains tightly closed while in transit or not used. Optional solar panels 118 and batteries can continue to operate in closed/collapsed configuration.

The shelter/camper may be simple and easy to transition between configurations without any tools/specialized tools or, optionally, with additional tools that aid transitioning. In one embodiment, to open/expand the shelter/camper 100, the locks, latches, or other connectors connecting the roof section 102, one or more connectors 142, the floor section 104, or various combinations of these may first be unlocked, unlatched, unconnected, etc. and opened. Then the roof section 102 and the side wall panels 110 and 114 may be raised (e.g., as shown in transition in FIG. 10) until the wall panels 110 and 114 are completely vertical (e.g., as shown in FIG. 9). The raising/opening of the roof section 102 and side wall panels may be done either manually or using some manner of mechanical assistance or mechanical system (e.g., lifting/lowering mechanisms that are either powered or manually operated, such as motorized hinges, pistons, other systems/components described elsewhere herein, etc.) that is appropriate for the size and weight of the shelter/camper. Slide latches or other components may be used between sections of the wall panels (e.g., between upper sections 126 and 134 and lower wall panel sections 128 and 136 of the upper pairs of wall panels 110 and 114) to prevent the bi-fold wall panels from folding inward. This process may open/expand the upper half of the shelter/camper. The same or a similar process may open/expand the lower half. The side wall panels 112 and 116 may be raised/opened simultaneously with the other side wall panels 110 and 114, may be raised/opened successively, or may be left closed/collapsed if only the top half of the shelter/camper is to be opened/expanded. Opening processes may be performed simultaneously or in succession in any order. FIG. 9 show the shelter/camper 100 in the fully raised position with the side wall panels 110, 112, 114, and 116 all expanded and vertical.

With the shelter/camper in fully raised position, the front wall panel 106 and rear wall panel 108 free or unhinged ends can be lowered (by gravity or mechanically) until they latch or otherwise connect with the front and rear edges (e.g., raised interior edges) of the floor section 104. FIG. 9 show the front and rear wall panels 106 and 108 in the process of being lowered. Once fully lowered, the front and rear wall panels may sit flush with the edges of the side wall panels, further preventing the wall panels (e.g., bi-fold wall panels) from folding inward. Once the shelter/camper is fully opened/expanded, the interior fixtures 146-170 and 174-198 may be extended, stacked, raised, and/or otherwise situated for use. The bed system may be raised or lowered as desired for use. External tanks, plumbing components, and/or other equipment may be connected and/or attached for operation. If the front and rear wall panels are hinged to the floor section instead of the roof section, the free ends of the front and rear wall panels may then be raised (manually or mechanically) until they latch with the front and rear edges (e.g., dropped interior edges) of the roof section.

To close/collapse the shelter/camper, the interior fixtures 146-170 and 174-198 may be collapsed or removed for storage, if necessary, the bed system may be raised to its highest position, and external tanks, plumbing components, and/or other equipment may be disconnected, detached or removed, if necessary. Then the free ends of the front wall panel and rear wall panel may be unlatched or otherwise disconnected from the edge of the floor section and the panels may be raised (manually or mechanically) (e.g., as shown in transition in FIG. 9) toward the roof section and latched or otherwise connected/attached flat against the bottom of the mattress platform 202 (e.g., as shown in FIG. 10). Then any slide latches or other components holding the side wall panels open can be unlatched or adjusted, so that the side wall panels (e.g., bi-fold side wall panels) can begin to fold inward and the roof section 102 and any connector(s) 142 can begin to lower (e.g., as shown in transition in FIG. 10). The upper and lower halves of the shelter/camper may be lowered simultaneously or in succession, in any order. The lowering of the roof section, any connector(s), and the side wall panels (e.g., four pairs of bi-fold side wall panels as shown in FIG. 10) may be mechanically assisted by lifting/lowering mechanisms or other mechanical systems described herein that are either powered or manually operated, such as motorized hinges, pistons, etc. that are appropriate for the size and weight of the shelter/camper. If the front and rear wall panels are hinged to the floor section instead of the roof section, the free ends of the of the front wall panel and rear wall panel may be unlatched or otherwise disconnected from the dropped edge of the roof section so that the panels may be lowered (manually or mechanically) until they rest flat against the tops of the interior components/fixtures 146-170 and 174-198 contained in the floor section. Once the wall panels are fully lowered, the roof section 102, any connector(s) 142, and the floor section 104 may be latched, connected, and/or locked together, creating a tightly closed, secure case (e.g., as shown in FIG. 11).

Where the front and rear wall panels are also bi-fold wall panels and each side wall has an upper and lower pair of bi-fold wall panels, the upper half of the shelter/camper only may be opened/expanded and used while the lower half remains closed/collapsed as mentioned above. In this case, to open/expand just the upper half, the lock and latches or other connectors between the roof section 102, a connector 142, and/or floor section 104 may be unlocked and opened, while the latches between a connector 142 and the floor section 104 remain closed/collapsed and locked. The opening/expanding process can proceed as described above for the upper pairs of side wall panels. With the roof section fully raised and the upper pairs of side wall panels completely vertical and slide latches engaged to prevent the upper pairs of wall panels from folding inward, the front and rear wall panels (e.g., bi-fold wall panels) can be lowered so that the upper sections of both front and rear wall panels are completely vertical and latched to the inside of the locked connector 142. The lower sections of front and rear wall panels (e.g., bi-fold wall panels) may remain horizontal and rest above the folded lower pairs of side wall panels below them. To use the bed system it may then be lowered to rest above the horizontal lower sections of the front and rear bi-fold wall panels. Exit from and entry to the shelter/camper can be done via an opening window or half door in the upper section of the front wall panel. The closing/collapsing process of just the upper half of the shelter/camper is similar to the closing/collapsing process of the shelter/camper described above. For example, the bed system may be raised to its highest position in the roof section for storage, and any other components or equipment may be disconnected, detached and/or removed, if necessary. Then the bottom ends of the upper section of the front and rear bi-fold wall panels can be detached from the connector 142, and the entire front and rear bi-fold wall panels can be raised to latch or otherwise attach to the bottom of the mattress platform. Then any slide latches or other components keeping the upper pairs of bi-fold side wall panels from folding inward can be opened/adjusted to allow the wall panels to fold flat as the roof section lowers. Once all wall panels are folded flat and the roof section is fully lowered, the roof section 102 can be latched, locked, and/or otherwise connected to the connector 142 and/or the floor section 104 for secure closure of the shelter/camper.

The enclosure walls 106, 108, 110, 112, 114, and 116, roof section 102, connector(s) 142, and floor section 104 may be constructed of composite material such as fiberglass, carbon fiber, or any other composite material. Alternatively, the panels may be constructed with wood or aluminum framing and sided with wood, aluminum, laminate, fiberglass or any other siding material. The panels may have a solid, honey-combed, sectioned, or hollow core. The panels may be insulated with polystyrene, fiberglass, any other insulating material, and/or any other vapor barrier material (e.g., one or more of these may be used inside the panels). Interior surfaces may be painted, left unfinished or finished with any appropriate material, such as plastic, wood or fiberglass paneling, or may be upholstered. Interior fixtures 146-198, 202 may be constructed of any appropriate material such as plastic, wood, laminate, fiberglass, glass, stainless steel, or other metal or fabric.

Figure 18:
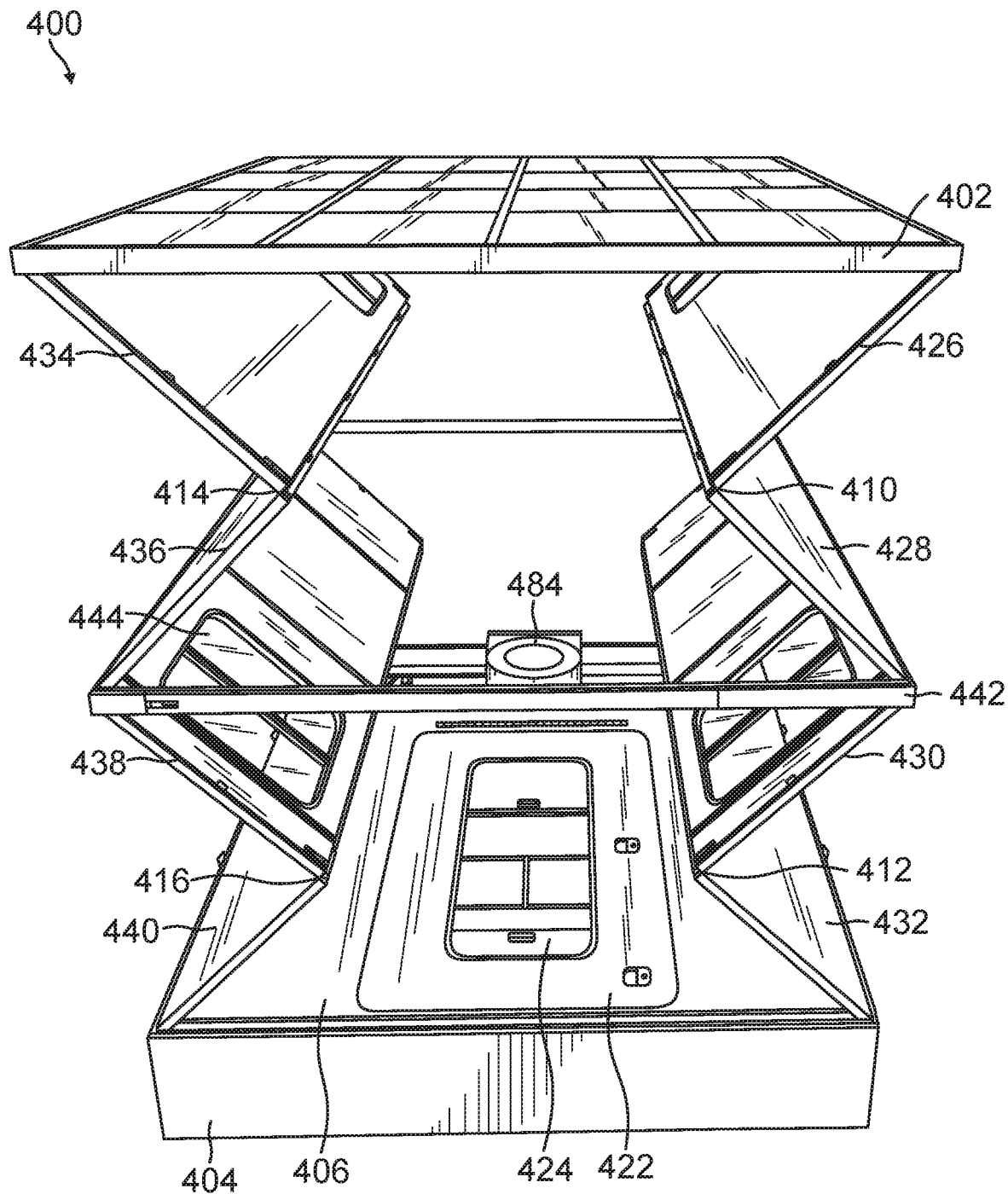
FIG. 18 shows a top, front perspective view of the shelter of FIG. 12 in a second transition position between an open or expanded configuration and a closed or collapsed configuration.
Figure 19:
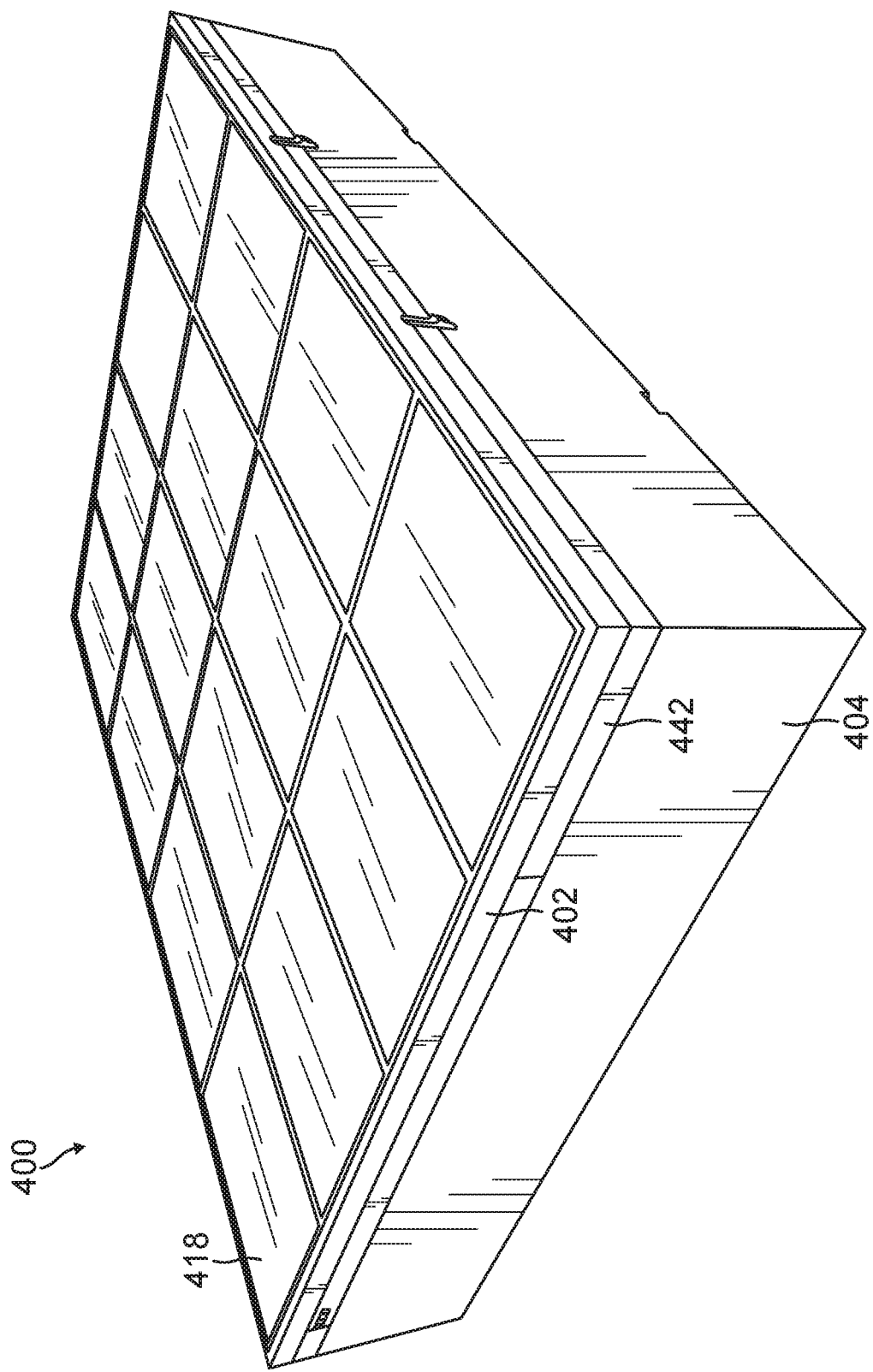
FIG. 19 shows a perspective view of the shelter of FIG. 12 in a closed or collapsed configuration.
Figure 20:
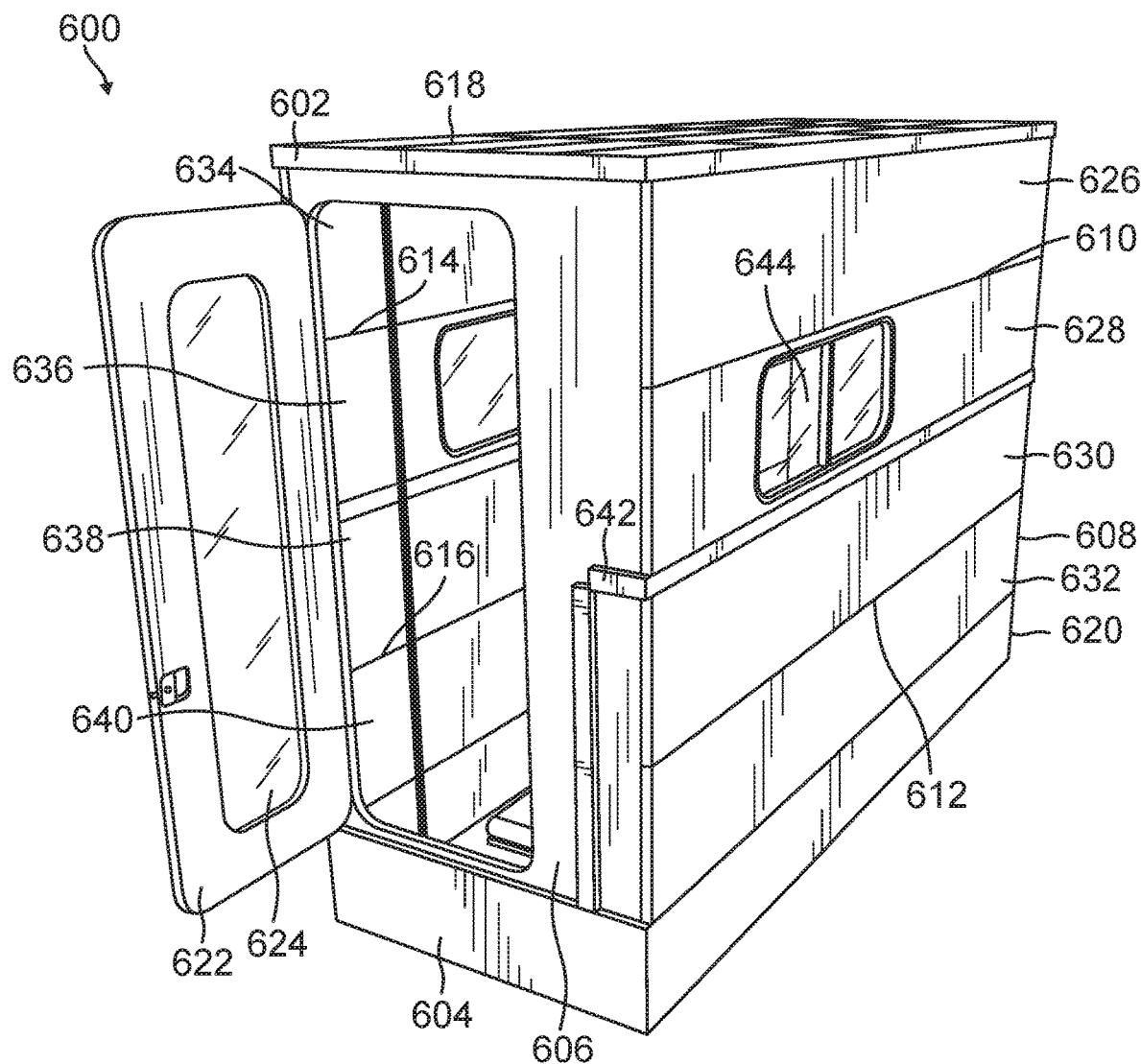
FIG. 20 shows a front perspective view of another embodiment of an exemplary shelter configured as a collapsible camper in an open or expanded configuration

In one exemplary embodiment, as shown in FIGS. 18-20, the exterior dimensions of shelter/camper 100 that contains a 4" thick Queen mattress (e.g., 60"×80" give or take a couple of inches), 1" thick panels and has front and rear wall panels hinged to the roof may be 62" W×84" L×92" H in an open/expanded configuration and 62" W×84" L×20" H in a closed/collapsed configuration. This embodiment has 18" H×82" L bi-fold side panel sections 126, 128, 130, 132, 134, 136, 138 and 140. This embodiment also has a 9" tall floor section 104, which has a floor thickness of 1", plus 7" of height to accommodate the interior fixtures 146-170 and 174-198, plus 1" of height to accommodate the 1" thick lower sections 132 and 140 of the lower pairs of bi-fold side wall panels 112 and 116 when in a closed/collapsed configuration. This embodiment may have a 2" tall mid-section connector 142 that may provide 2" of height for the 1" thick upper sections 130 and 138 of the lower pairs of bi-fold side wall panels 112 and 116 and the 1" thick lower sections 128 and 136 of the upper pairs of bi-fold side wall panels 110 and 114. This embodiment may have a 9" tall roof section 102 with a ceiling thickness of 1", plus 4" of height to accommodate the mattress 200, plus 1" of height to accommodate the mattress platform 202, plus 1" of height to accommodate the 1" thick upper sections 126 and 134 of the upper pairs of bi-fold side wall panels 110 and 114, plus 2" of space to accommodate the 1" thick front wall panel 106 and 1" thick rear wall panel 108 when closed/collapsed.

In the embodiment shown in FIGS. 7 and 11, the front wall panel 106 may be 60" W×78" H or have a total combined length of 78" for both or all sections of a bi-fold or multi-fold front wall panel, if present. The rear wall panel 108 may be 60" W×77" H or have a total combined length of 77" for both or all sections of a bi-fold or multi-fold panel, if present. The roof section 102 may have a dropped interior front edge 204 that is 5" H and a dropped interior rear edge 206 that is 6" H. The floor section 104 may have raised interior edges 208 and 210 that are 7" H. With the shelter/camper fully opened/expanded, the distance between the roof and floor exterior edges may be 74". With the bed system (e.g., mattress 200 and platform 202) in fully raised position, the distance between the mattress platform and the floor is 85", resulting in over 7' of interior standing height. In this embodiment, the available space for interior fixtures may be 7" H×18" W×80" L along each side of the floor, under the folded side wall panels; and 11" H×24" W×80" L in the center, in the gap between the 2 pairs of folded bi-fold wall panels on each side. This embodiment employs a configuration that accommodates the following: 18" W×44" L left seat bench with 2 cabinets below; 18" W×18" L right bench with 2 cabinets below; 12" W×26" L kitchenette in 3 sections; shower basin that is 7" H×24" W×36" L; a 12" deep bath vanity in 5 sections, 3 of which are 24" W and 2 of which are 12" W; space for a collapsible camp toilet. Depending on the thickness of the accordion wall and door, a small amount of space between fixtures on either side of the wall may be needed, so those fixture dimensions may be reduced slightly. The benches, kitchenette and bath vanity sections may collapse to sections that have a total combined height of about 7" for the sections that occupy the 7" H×18" W space under the bi-fold side wall panels on either side of the shelter/camper or no more than 11" for the sections that occupy the 11"×24 in W space in the center of the shelter/camper extending into the gap between the bi-fold side wall panels. These example dimensions are for a shelter/camper with a Queen mattress. The dimensions and/or configurations of components and interior fixtures may vary depending on the size of the mattress the shelter/camper contains and other factors. For example, in one embodiment, the dimensions cited above may vary within plus or minus 15", 12", 6", 3", or other amounts. In one embodiment, the dimensions may be sized to leave room in the collapsed/closed configuration for interior fixtures that could be 36" tall or taller and/or to allow for shelters where the floor is tall enough to accommodate fixtures such that they do not need to be collapsed. In one embodiment, the dimensions affecting the height of the shelter may be increased by an amount between 2" and 40", between 10" and 30", and/or between 12" and 24".

The shelters/campers and components thereof described herein may be customizable by the end user. For example, an end user may wish to configure the interior with certain fixtures and components in a particular arrangement at one time, but configure the interior with other fixtures and components in a different arrangement at a different time and/or for a different purpose. The fixtures and components may have one or more standardized attachment mechanisms (e.g., posts, rails, screws, bolts, latches, slots, clamps, holes, receptacles, etc.) that may match corresponding connection points or attachment mechanisms (e.g., posts, rails, screws, bolts, latches, slots, clamps, holes, receptacles, etc.) in the floor section, roof section, and/or panels. This may allow different fixtures and components to be interchangeably attached to different connection points or areas in the shelter. For example, a bench and a table may include similarly shaped and designed attachments that correspond to receptacles in the floor section such that either the bench or the table may be placed in a particular location as desired, and then later removed and/or rearranged. Methods of customizing the shelter/camper may include (1) addition, deletion, rearrangement or modification of fixtures or components; (2) addition, deletion, rearrangement or modification of 3rd party or aftermarket fixtures or components; (3) addition of end-user constructed fixtures or components.

The apparatuses, devices, systems, fixtures, components, etc. described herein may be manufactured in a variety of ways, including using a mold or cast, injection molding, 3D printing, welding, carving, other methods, and/or a combination of these. All or some materials used to make the apparatuses, devices, systems, fixtures, components, etc. discussed above may be "green" friendly, e.g., made from recycled materials or as recyclable materials.

While generally described herein in terms of portable shelters or campers, the principles and design features of campers 1 and 100 may also be used with a permanent or stationary shelter that is not moved or not moved often, but may still provide comfortable and safe shelter and may be collapsible and expandable or transitionable between different configurations for different purposes.

The shelters/campers and components thereof described herein may be used in a variety of methods. Methods of using the shelter/camper or any of its components may include any of the steps discussed herein, including steps of opening/expanding, closing/collapsing, assembling, arranging, etc. the shelter/camper or components thereof in a desired way (e.g., including any of the steps required to assemble/arrange variations of the shelter/camper or components as discussed or shown herein). Methods of using the shelters/campers described herein may also include (1) providing or obtaining a shelter/camper having any of the components or features described herein; (2) transporting/moving the shelter/camper in an open/expanded or closed/collapsed configuration; (3) opening/expanding the shelter/camper from the closed/collapsed configuration to the open/expanded configuration; (4) opening/expanding/positioning the walls or wall panels as desired; (5) latching portions of the walls or wall panels; (6) connecting fixtures, components, and/or plumbing or tubing; (7) opening or closing windows or doors; (8) raising, lowering, or otherwise positioning a bed system (e.g., a mattress, platform, and/or other components); (9) assembling or using fixtures; (10) connecting propane or other energy source to kitchenette, stove, and/or oven; (11) closing/collapsing the shelter/camper to a closed/collapsed configuration from the open/expanded configuration. These and other steps (including specifics for how the shelter/camper and its panels and components are transitioned between configurations) described herein may be performed in the order disclosed or in a different sequence, and steps may be omitted or added.

The shelter (e.g., shelter 1 and/or shelter 100 discussed above) or groups of more than one of the shelter may be used in various ways (e.g., in emergency disaster relief as a portable and collapsible shelter that can be easily transported and easily and quickly set up for use, for group events, movie crews filming in various locations, chartered vacations, vacation tour groups, construction projects, remote location projects, touring professionals, etc.). Multiple shelters, in collapsed configurations, can be stacked for transportation to remote locations (e.g., by tractor trailer truck, cargo ship, freight train, cargo plane, helicopter or any other method of delivery and/or a combination of delivery methods). The shelters may be easily deployed and set up without the need for specialized tools or personnel (e.g., one or more victims of a natural or man-made disaster may set up a shelter with simple instructions and begin use immediately). In properly equipped shelters, the shelters may capable of producing energy or have energy stores to run its own systems by use of attached solar panels, batteries and/or generators. Multiple shelters may also be connected to a central power supply, fresh water supply and/or waste removal system. For example, electric supply from a commercial generator or other power source may power multiple, linked shelters; fresh water from a central water supply may be delivered to multiple, linked shelters via tubes, hoses and/or pumps; a common drain line may remove waste from multiple, linked shelters. The shelters may optionally be delivered and deployed with some or all necessities included in the collapsed configuration and ready for use in the expanded configuration (e.g., on-board food, water, sanitary supplies and/or energy sources).

FIGS. 12-19 illustrate another exemplary embodiment of a shelter or camper. Camper 400 depicted in FIGS. 12-19 may include features the same as or similar to those described above with respect to camper 1 or camper 100 (and camper 1 or camper 100 may include features the same as or similar to those of camper 400). In one embodiment, camper 400 may be configured as a hard-sided, collapsible camping unit that is a fully enclosed, weather tight, lockable and private living structure while in an open/expanded configuration and is an easily portable, hard case for transportation while in a closed/collapsed configuration. While camper 400 is in an open/expanded configuration, occupants may be able to sleep, sit, eat or use the bathroom in a properly equipped unit. The walls, wall panels, floor, roof, etc. may be constructed of rigid material or of materials similar to those described above with respect to camper 1 and camper 100. In one embodiment, camper 400 may be configured as a stationary or non-portable shelter with similar features to those described herein, but configured to remain in a permanent or semi-permanent location.

Figure 14:
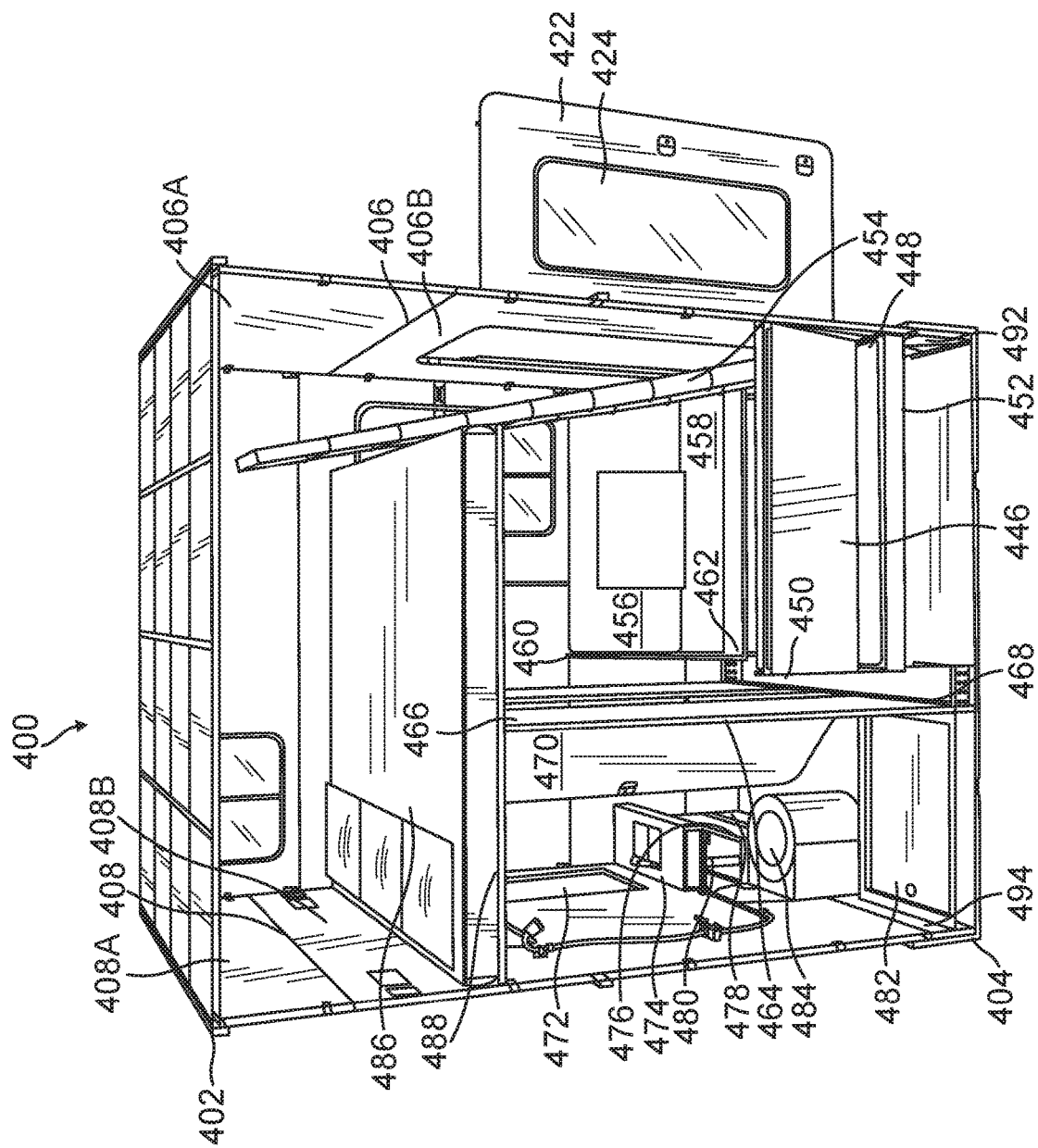
FIG. 14 shows a left perspective interior view of the shelter of FIG. 12 in an open or expanded configuration, with one wall removed for ease of view.

In one embodiment, the structure (e.g., a rigid structure) of the shelter/camper 400 in both opened/expanded and closed/collapsed configurations may allow the shelter/camper to contain a mattress, seating, kitchen and bathroom fixtures, as well as televisions, lighting, electrical outlets, solar panels, batteries, heating and cooling appliances and any other system or convenience components that may be permanently or temporarily attached to or included in the shelter/camper. A rigid structure may also provide protection from the elements by forming a secure, weather-tight enclosure that may be heated or cooled with optional equipment. A rigid structure design may also allow the use of insulation in the structure's panels, further improving its interior climate control performance. The rigid structure (e.g., including hard-siding) may offer security by being lockable in both opened/expanded and closed/collapsed configurations. While in the open/expanded configuration and with the bed system raised (e.g. with the mattress 486 raised toward the top and rear of camper 400, creating a loft, as shown in FIG. 14), the shelter/camper 400 can provide comfortable standing height below the bed system while still providing a comfortable height above the mattress for sitting, sleeping and crawling, without the need to adjust the height of the bed system. When the camper 400 is closed, it may be collapsed into a low-profile, case (e.g., a hard case) that may be mounted to a vehicle roof rack; placed in the bed of a pick-up truck; placed on a trailer and towed behind a car, truck, motorcycle, bicycle or any other tow vehicle; placed in or on a boat; and/or placed anywhere there is a sufficient foundation or surface below and sufficient height above while open/expanded. The shelter/camper may be designed and configured to be easily and quickly opened/expanded in place for occupancy and closed/collapsed when in transit or in storage.

Figure 12:
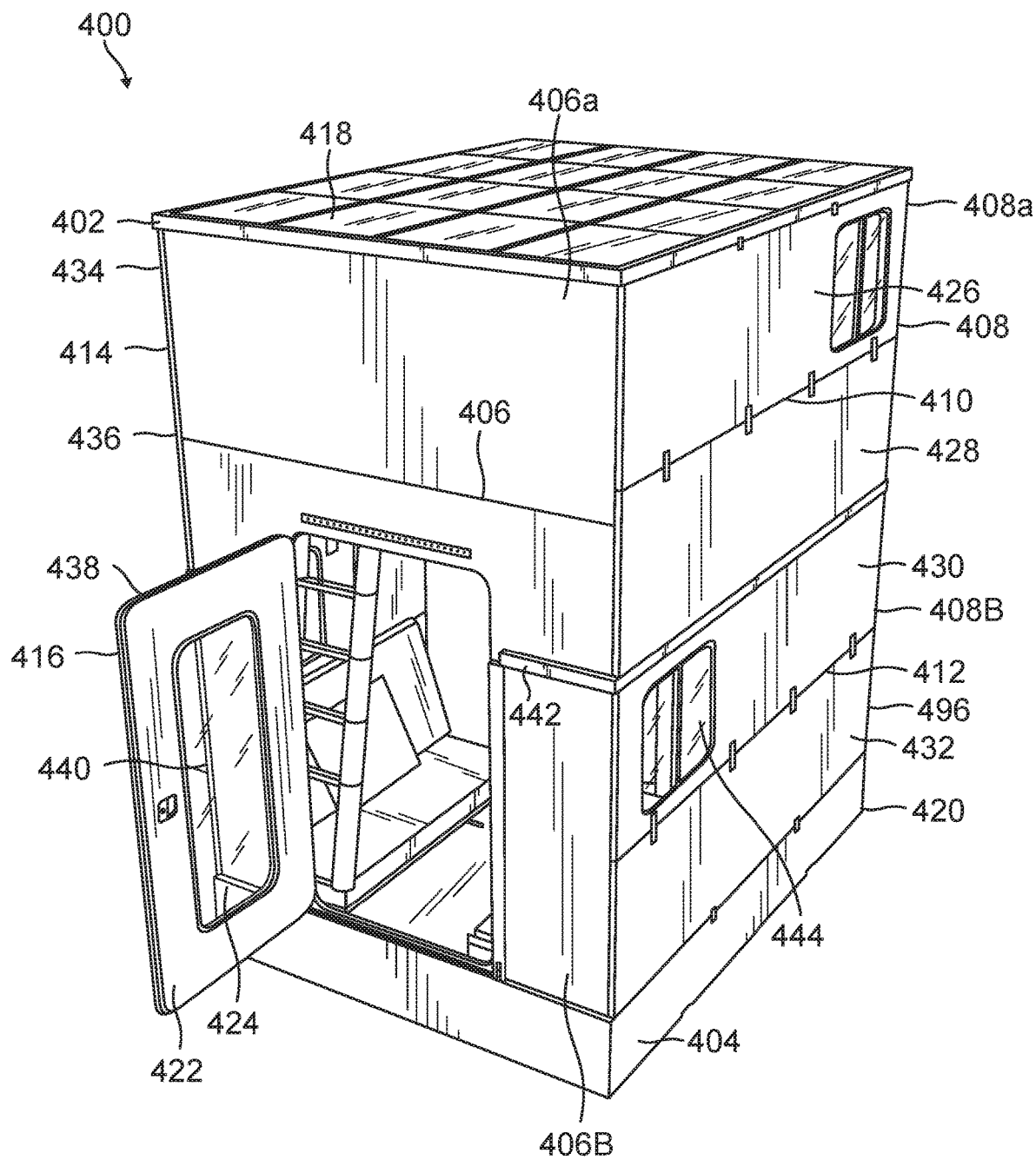
FIG. 12 shows a front perspective view of another embodiment of an exemplary shelter configured as a collapsible camper in an open or expanded configuration.
Figure 13:
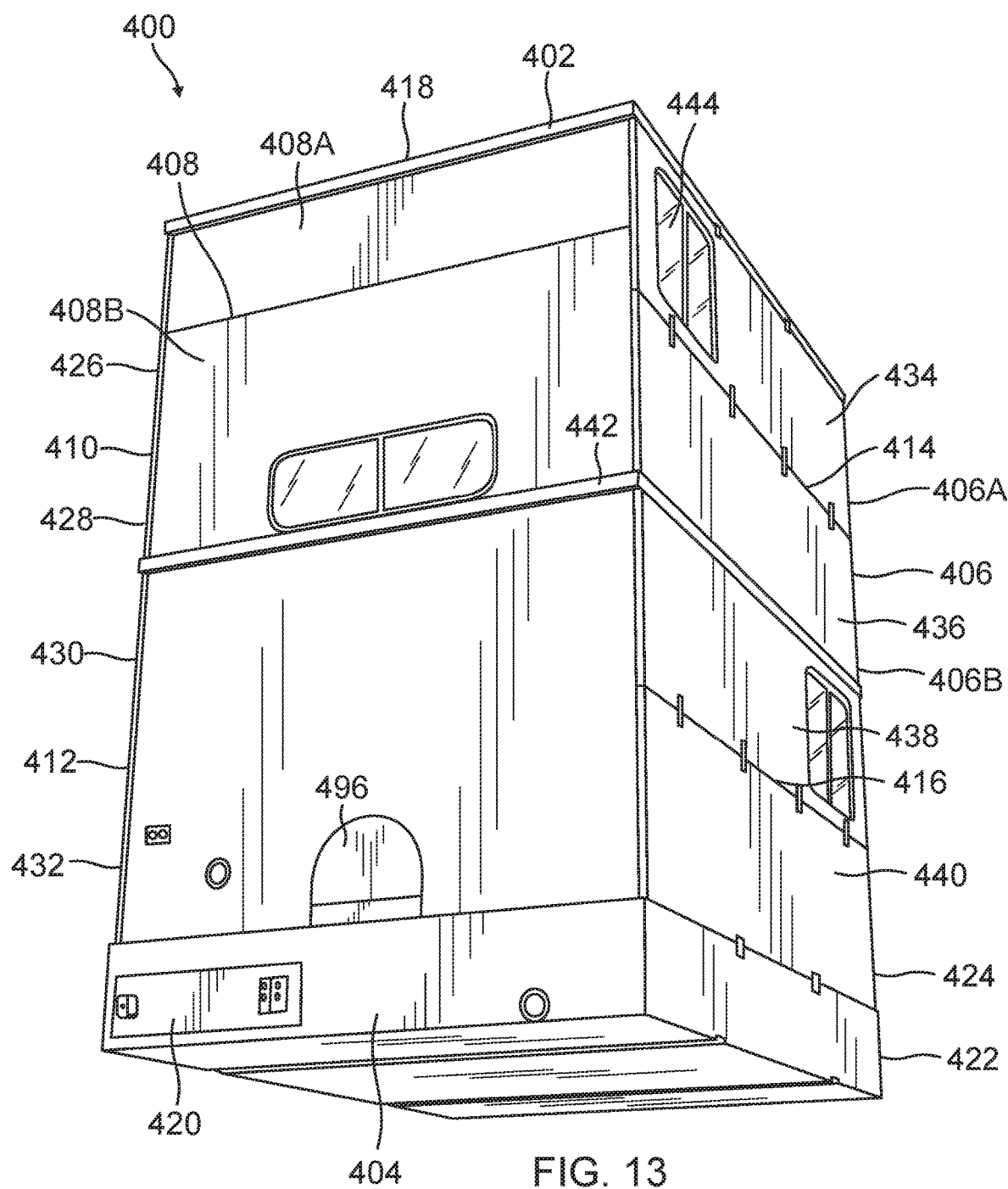
FIG. 13 shows a rear perspective view of the shelter of FIG. 12 in an open or expanded configuration.

Camper 400 may include wall panels 406, 408, 410, 412, 414 and 416, which may be rigid, folding, bi-folding, tri-folding, quadri-folding, multi-folding, or may be similar to other panels described herein. In one embodiment, camper 400 may maintain a rigid structure in both opened/expanded (FIGS. 12-14) and closed/collapsed (FIG. 19) configurations by use of rigid wall panels 406, 408, 410, 412, 414 and 416 (e.g., folding and bi-folding wall panels, or panels similar to those described with respect to camper 1 and camper 100). The wall panels 406, 408, 410, 412, 414 and 416 may be hinged and/or latched to a rigid roof section 402, a mid-section connector 442, and/or a rigid floor section 404. When opening/expanding (e.g., as shown in transition in FIGS. 15-18), the wall panels 406, 408, 410, 412, 414 and 416 may be extended vertically until they are perpendicular to the roof section 402 and floor section 404. When closing/collapsing the camper 400 (e.g., as shown in transition in FIGS. 15-18), the wall panels 406, 408, 410, 412, 414 and 416 may be folded flat or until they are parallel to the roof section 402 and floor section 404. When fully opened/expanded (e.g., as shown in FIGS. 12-14), the shelter/camper 400 may provide comfortable living quarters for occupants. When closed/collapsed (e.g., as shown in FIG. 19), the roof section 402, floor section 404, and mid-section connector 442 (if used), may come together to form a weather tight and portable case, fully enclosing all interior fixtures that may remain in the shelter/camper and front, rear and side wall panels. Components of the shelter/camper 400 may be the same as or similar to components of shelter/camper 1 or camper shelter/camper 100 described above; additional components/features are also described in detail below.

Shelter/camper 400 may have one or more wall panels the same as or similar to the wall panels of camper 1 or camper 100 described above. The wall panels may be rigid, folding, bi-folding, tri-folding, quadri-folding, multi-folding, etc. Optionally, the side wall panels may be a combination of two or more bi-fold panels, may be a quadri-fold panel, or may be another type of panel or combination of panels. In one embodiment, as shown in FIGS. 12-14 and 15-18, the shelter/camper 400 may have two pairs of right side bi-fold wall panels 410 and 412 and two pairs of left side bi-fold wall panels 414 and 416. Each wall panel and/or section of the wall panels may be of similar size/dimensions as the wall panels and sections of wall panels described above with respect to camper 1 or camper 100. In one embodiment, the height of the sections of the wall panels may be between 27" to ½ of the interior width of the shelter/camper. Combined with space provided by the roof section 402, a mid-section connector 442, and the floor section 404, this may allow for well over 10' of interior height (e.g., as shown in FIG. 14) with about 7' between the floor and bed system (including mattress 486 and platform 488) and about 3' between the top of the mattress and the roof when the shelter/camper is in the open/expanded configuration (e.g., as shown in FIGS. 12-14), and when the bed system is fully raised (e.g., as shown in FIG. 14). The right side wall panels may sit side by side with the left side wall panels, without overlapping, when folded for closing/collapsing of the shelter/camper or in the closed/collapsed configuration (e.g., as shown in FIGS. 18-19).

In an embodiment with four pairs of bi-fold wall panels, all four pairs of bi-fold wall panels may be slightly longer than the mattress 486 contained within the shelter/camper or longer. For example, a shelter/camper with an adult mattress about 80" long may have bi-fold wall panel sections that are roughly 27"×100" or longer, extending roughly 1" (or the equivalent thickness of the front or rear wall panels) or more beyond one end of the mattress and 19" or more beyond the other end of the mattress. This configuration may allow the front wall panel 406 and rear wall panel 408 edges to sit flush with the side wall panel edges when the shelter/camper is in an open/expanded configuration; with weather stripping or gaskets, this can create a weather tight corner joint between side walls and front and rear walls. Arranging/positioning the front wall panel 406 and rear wall panel 408 between the side wall panels may also allow the front and rear wall panels to prevent the side wall panels from folding inward when the shelter/camper is in the open/expanded configuration. This configuration may also allow a gap of about 18" between the front wall panel and the mattress, allowing an occupant to move between the bed and the areas below the bed without exiting the shelter/camper, when the shelter/camper is open/expanded and the bed system is fully raised (e.g. as shown in FIG. 14). This configuration may also allow a gap of about 18" between the mattress and the rear of the shelter/camper, allowing some taller interior components, such as a toilet and/or vanity sections, to sit between the mattress and the rear of the shelter/camper, when the mattress is lowered for storage and the shelter/camper is closed/collapsed. In one embodiment, the right and left side walls may each have a set of upper bi-fold wall panels 410 and 414 and a set of lower bi-fold wall panels 412 and 416. The upper panel sections 426 and 434 of the upper wall panels 410 and 414 may be hinged on the top to an edge (e.g., a dropped edge) of the roof section 402, and the lower panel sections 428 and 436 of the same set of upper wall panels may be hinged on the bottom to the top of an optional mid-section connector 442 or other panel. The bottom of the mid-section connector 442 may be hinged to the tops of upper panel sections 430 and 438 of the lower set of wall panels 412 and 416, and the lower panel sections 432 and 440 of the same set of lower wall panels 412 and 416 may be hinged on the bottom to the raised edge of the floor section 404. Weather stripping or gaskets along some or all of the edges of each section of the wall panels may form weather tight joints between the side walls and the roof, mid-section connector and floor and in between the upper and lower wall sections of the wall panels. Latches, hooks, locks, or other connectors/attachments may also be used at the corners or joints between the walls, panels, connector(s), sections, etc. (e.g., between side walls and front and rear walls) to help securely hold the walls, panels, connector(s), sections, etc. together and in position when in the open/expanded configuration.

Shelter/camper 400 may also include slide latches (or other latches or locks) that can slide or be positioned between the walls, wall panels, or sections of the wall panels (e.g. to prevent folding or other undesired movement). For example, wall panel slide latches may be included that can slide or be positioned between the upper sections 426, 430, 434, and 438 and the lower sections 428, 432, 436 and 440 to further prevent the wall panels from folding inward and to help maintain the open/expanded configuration. When in a closed/collapsed configuration, all wall panels may sit entirely inside the closed case formed by the roof section, mid-section connector, floor section, and/or any combination of these. Each section of the wall panels 410, 412, 414 and 416 may also contain a window or multiple windows 444. The windows may be fixed or capable of being opened. The windows may also include or be fitted with screens and blinds. Any or all wall panels may also include fixtures such as light switches, electrical outlets, wall-mounted televisions, storage pockets, storage hooks, venting fans, electrical connections, plumbing connections and attachments for mounting heating/cooling equipment. The wall panels may include a mechanical system or components of a mechanical system for opening/expanding and closing/collapsing of the shelter/camper. The mechanical system may include a crank, pump, lever, pulley, spring(s), piston(s), hinges, spring-loaded hinges, motorized hinges, motor, other opening/closing mechanisms or components, and/or any combination of one or more of the foregoing as appropriate for the size and weight of the shelter/camper. The wall panels may also include fixtures such as mirrors, tables, or seat back rests embedded in their interior surfaces. The wall panels may also include components of a track or pulley system for raising and lowering of the bed system (e.g., including a mattress 486 and a platform 488).

In one embodiment, shelters/campers may be wide enough to achieve an interior height sufficient for standing below the bed system and sleeping above with only one set of wall panels per side, e.g., similar to the side wall design of camper 1 above. For example, use of one pair of bi-fold wall panels with panel sections that are 54" tall (rather than 27" tall) per side may result in a standard interior height of over 10', combined with the heights of the floor and roof sections, when the shelter/camper is in an open/expanded configuration. In this case, no mid-section connector may be necessary and the bi-fold wall panels may be hinged in a similar manner as with camper 1.

Shelter/Camper 400 may have one or more front and rear wall panels the same as or similar to the wall panels of camper 1 and camper 100 described above. The wall panels may be rigid, folding, bi-folding, tri-folding, quadri-folding, multi-folding, etc. Optionally the front and rear wall panels may be a folding panel, may be a bi-fold panel, or may be another type of panel or combination of panels. In one embodiment, as shown in FIGS. 12-14 and 16-17, the shelter/camper 400 may have a folding front wall panel 406 and a folding rear wall panel 408. Each wall panel and/or section of the wall panels may be of similar size/dimensions as the wall panels and sections of wall panels described above with respect to camper 1 and camper 100. In one embodiment, the height of the upper wall panel section 406A of the folding front wall panel may be 33" and the lower wall panel section 406B may be 80". As can be seen in FIG. 14, this may allow the folding front wall panel to extend between a raised interior edge (e.g., raised interior edge 492) of the floor section and a bottom surface, or ceiling, of the roof section when the shelter/camper is in open/expanded configuration. In one embodiment, the height of the upper wall panel section 408A of the folding rear wall may be 18" and the lower wall panel section 408B may be 97". As can be seen in FIG. 14, this configuration may allow the folding rear wall panel to extend between a raised interior edge (e.g., raised interior edge 494) of the floor section and a bottom surface, or ceiling, of the roof section. The upper panel section of the front wall may sit end to end with the upper panel section of the rear wall, or both upper panel sections may sit at the same level, without overlapping; and the larger, lower panel sections of the front and rear wall may sit above and below the upper sections, respectively, when folded for closing/collapsing of the shelter/camper or in the closed/collapsed configuration (e.g., as shown in FIGS. 16-19).

In an embodiment with folding front and rear wall panels, all panel sections of the front and rear wall panels may be at least the same width as, slightly wider than, or wider than a mattress 486 contained within the shelter/camper. In one embodiment, the lower panel sections 406B and 408B of the front and rear folding wall panels 406 and 408 may be hinged to raised interior edges 492 and 494 of the floor section 404. The lower panel 406B of the front wall 406 may be hinged at least 2" (or the equivalent thickness of two wall panel sections stacked on top of each other) higher than the lower panel 408B of the rear wall 408. In other words, the hinge points on the edges (e.g., on interior raised edges 492 and 494) in the front and rear of the floor section 404 may be staggered for the lower panel sections of the front and rear wall panels. This may allow the lower panel section 406B of the folding front wall 406 to sit above both of the folded, upper panel sections 406A and 408A of the front and rear wall panels 406 and 408 and may allow those, in turn, to sit above the lower panel section 408B of the folding rear wall 408 when the walls are folded for closing/collapsing of the shelter/camper. Alternatively, if the lower panel of the rear wall is hinged higher than the lower panel of the front wall this may allow the lower panel section 408B of the folding rear wall 408 to sit above both of the folded, upper panel sections 406A and 408A of the front and rear wall panels 406 and 408 and may allow those, in turn, to sit above the lower panel section 406B of the folding front wall 406 when the walls are folded for closing/collapsing of the shelter/camper.

In an embodiment with folding front and rear walls, if one section of each folding wall panel is shorter than the other section and the shorter section has one hinged end (e.g., an end that is hinged to the larger panel section) and one unattached (free/unhinged) end (e.g., an end that can be latched to a roof or floor section), as described above, then the shorter panels may occupy the same level in a closed/collapsed shelter/camper, between the two larger panel sections, as previously described. This configuration may minimize the combined height folded front and rear wall panels may take up in a closed/collapsed camper, if the camper is not long enough to contain front and rear panels without the need to fold them or not long enough to contain a folded front panel that may sit side by side with a folded rear panel (e.g., similar to how the folded pairs of left and right side panels sit in a closed/collapsed camper). The panel sections may be any height necessary to contain components such as doors and/or windows and/or any other components while still being capable of folding or collapsing in the manner mentioned above.

When opening/expanding the shelter/camper (e.g., as shown in transition in FIGS. 16 and 17), the unattached (free or unhinged) ends of these wall panels may be raised until they latch, connect, or otherwise attach to an edge (e.g., an interior surface of the dropped, interior edge) of the roof section 402 in the front and rear of the shelter/camper, or directly to the bottom surface of the roof section (e.g., the ceiling of shelter/camper), forming a continuous and weather tight front and rear wall connecting the roof and floor. Alternatively, the front and rear wall panels may be hinged to edges (e.g., dropped, interior edges) of the roof section 402 and lowered to latch, connect, or otherwise attach to edges (e.g., raised, interior edges 492 and 494) of the floor section 404. When the shelter/camper is in an open/expanded configuration as shown in FIGS. 12 and 13, the walls may be completely unfolded. The front and rear wall edges may sit flush with the side wall edges, forming a weather tight corner joint as described above. Latches, hooks, locks, weather stripping, or other connectors/attachments may optionally be used at the corners or joints between the walls, panels, connector(s), sections, etc. (e.g., between side walls and front and rear walls) to help securely hold the walls, panels, connector(s), sections, etc. together and in position when in the open/expanded configuration. The front and rear wall panels, if hinged to the floor section 404, may sit between the mattress 486 as well as any fixtures or components included in the floor section that are in that portion of the floor section not covered by the mattress (e.g., a portion of the shower basin 482, toilet 484 and the lower two vanity sections 476 and 478) and the lower sections 432 and 440 of the lower pairs of wall panels 412 and 416 when closed/collapsed. If the front and rear wall panels are hinged to the roof section 402, the front and rear wall panels may sit between the upper sections 426 and 434 of the upper pairs of wall panels 410 and 414 and the roof section. When in closed/collapsed configuration, all wall panels may sit entirely inside the closed case formed by the roof section, mid-section connector, floor section, and/or a combination of these (e.g., as shown in FIG. 19). Optionally, the front and rear wall panels may also be bi-fold (e.g., folding in half) or multi-fold panels. The panels or sections of the panels may include a door or large window in one or more sections or halves of the front or rear wall panels.

The front wall panel 406 may include a door 422, and the door may contain a window 424 or multiple windows. The rear wall panel 408 may also include a small door 496. The doors and/or windows may include locks, latches, etc. Any doors 422 and 496 or window 424 may include weather stripping or gaskets, creating a weather tight seal between the door and the rest of the front or rear wall panel, when the door or window is closed.

The front wall panel may also latch to a portion of the mid-section connector in the front of the shelter/camper, allowing that portion of the mid-section connector to swing open and closed with the door, or alternatively that portion of the mid-section connecter can simply be left open and swung away to allow free operation of the door, when the shelter/camper is open/expanded. The front and rear wall panels may each contain a window 444 or multiple windows. The windows may be fixed or capable of being opened. The windows may also include or be fitted with screens and/or blinds. The front and rear wall panels may also include fixtures such as light switches, electrical outlets, wall-mounted televisions, venting fans, storage pockets, storage hooks, electrical connections, plumbing connections and attachments for mounting heating/cooling equipment. The front and rear wall panels may include a mechanical system or components of a mechanical system for opening/expanding and closing/collapsing of the camper. The mechanical system may include a crank, pump, lever, pulley, spring(s), piston(s), hinges, spring-loaded hinges, motorized hinges, motor, other opening/closing mechanisms or components, and/or any combination of one or more of the foregoing as appropriate for the size and weight of the shelter/camper. The front and rear wall panels may also include components of a track or pulley system for raising and lowering of the bed system (e.g., mattress 486 and platform 488) or the bed system may be removed and reinserted in a variety of slots at different heights (e.g., similar to adjustable levels in an oven).

The roof section 402 of camper 400 may be the same as or similar to roof section 2 of camper 1 or roof section 102 of camper 100. For example, the roof section 402, in one embodiment, may be flat across the entire length and width of the shelter/camper and may have a continuous dropped edge along the perimeter of the shelter/camper. Optionally, the roof section 402 may be curved, contoured, ridged, or include other aerodynamic features as discussed above with respect to camper 1 and camper 100. The dropped edge may be tall enough to completely contain the side wall panels or sections of the side wall panels (e.g., upper sections 426 and 434 of the upper pairs of side wall panels 410 and 414) inside the roof section 402 when the shelter/camper is in the closed/collapsed configuration (e.g., as shown in FIG. 19). If the front and rear wall panels are hinged to the roof section, then a dropped edge of the roof may be tall enough to accommodate those panels as well, when in the closed/collapsed configuration.

Figure 15:
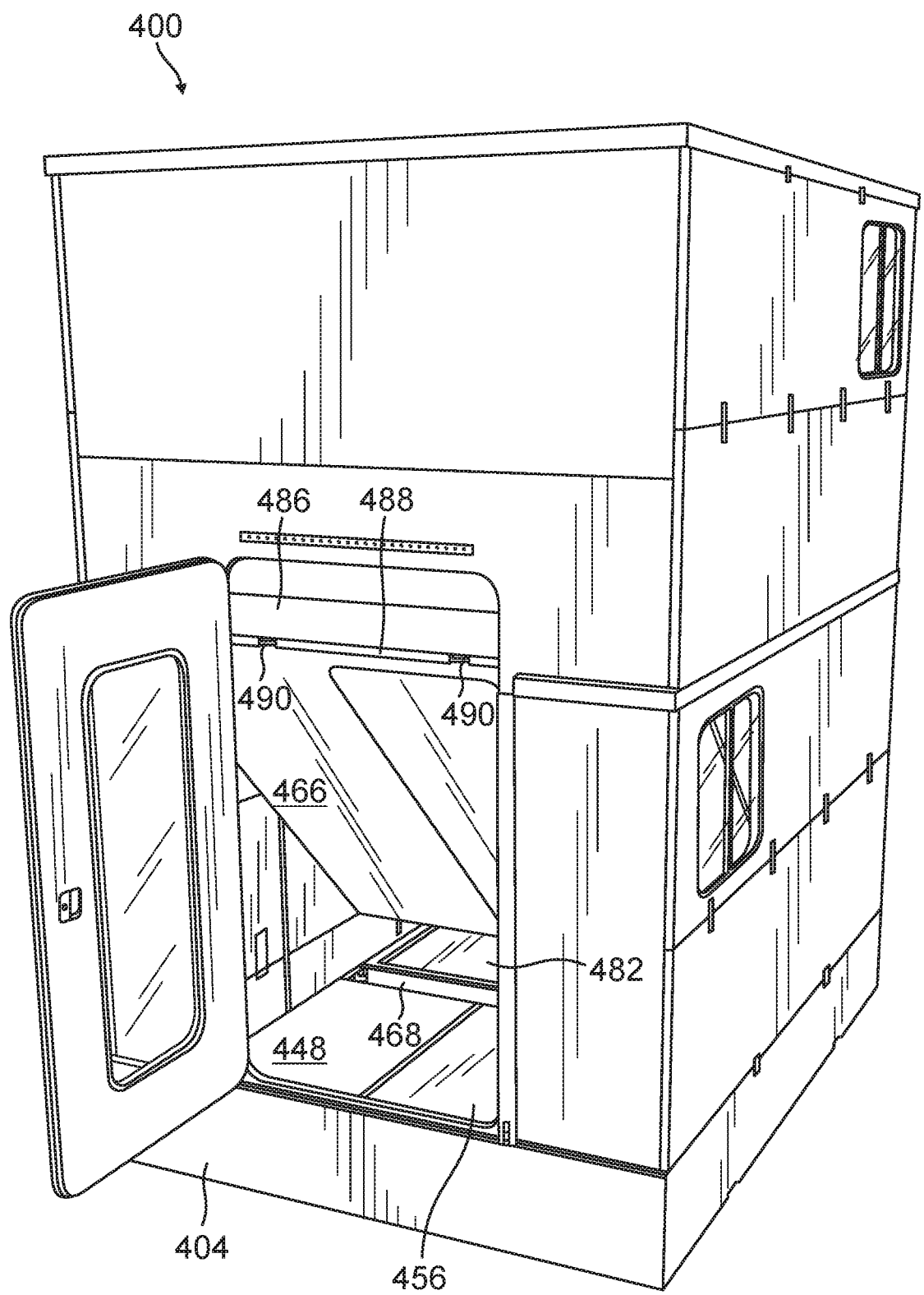
FIG. 15 shows a front perspective view of the shelter of FIG. 12 in which the interior components are transitioning to a closed or collapsed configuration.

In one embodiment, the front and rear wall panels may each be long enough to extend between the interior edges or bottom surface of the roof and the interior edges of the floor. If the front and rear wall panels are hinged to the roof section, then the dropped edge of the roof may be tall enough to contain the front and rear wall panels, and/or upper sections of the upper wall panels, when in a closed/collapsed configuration. The roof section 402 may have a length and width equivalent to the floor. The width may be about the same as, slightly greater than, or greater than that of a mattress 486 contained within the shelter/camper, and the length may be about the same as, slightly greater than, or greater than the length of the side wall panels. Having the width and length at least slightly greater than the mattress may ensure that the mattress sits completely within the 4 walls that are attached to the roof section and the mattress and walls sit entirely inside the shelter/camper when closed/collapsed. For example, a shelter/camper containing a King mattress (e.g., 76"×80" give or take a couple of inches) and having 1" thick panels, may have a roof section that is about 78" wide×102" long (or slightly longer than the side walls, which may be 100" long in this case, to provide a gap between the mattress and the front wall when the shelter is open/expanded and between the mattress and the rear of the shelter when the shelter is closed/collapsed) (e.g., as shown in FIGS. 15 and 19). The edge(s) (e.g., a continuous dropped edge) of the roof section 402 may include weather stripping or gaskets that may form a weather tight seal between it and the walls or wall panels connected to it. The weather stripping or gasket may also form a weather tight seal with the mid-section connector 442 when the shelter/camper is in a closed/collapsed configuration (e.g., as shown in FIG. 19).

The top of the roof section 402 may include solar panels 418, roof rack attachments and/or antennae for radio, television and/or internet transmissions. The interior of the roof section 402 (i.e., the ceiling of the shelter/camper) may include light fixtures and/or other fixtures such as light switches, electrical outlets, ceiling-mounted televisions, venting fans, storage pockets, storage hooks, electrical connections, plumbing connections and attachments for mounting heating/cooling equipment. The roof section 402 may include a mechanical system or components of a mechanical system for opening/expanding and closing/collapsing of the camper. The mechanical system may include a crank, pump, lever, pulley, spring(s), piston(s), hinges, spring-loaded hinges, motorized hinges, motor, other opening/closing mechanisms or components, and/or any combination of one or more of the foregoing as appropriate for the size and weight of the shelter/camper. The roof may also include components of a track or pulley system for raising or lowering of the bed system (e.g., mattress 486 and platform 488). The roof section 402 may also include lock and latch components or other connection components to latch it to the mid-section connector and/or floor section to keep the shelter/camper closed tightly. The roof section 402 may also include handles (e.g., in the front and rear and/or on the sides of the shelter/camper) for manual lifting or lowering of the roof section 402 for opening/expanding or closing/collapsing of the shelter/camper, respectively, or for carrying the shelter/camper when closed/collapsed. The roof section 402 may include lights or light fixtures internally and/or externally. Internally, lights or light fixtures may provide light for the occupant. Externally, the lights may act as car lights (e.g., tail lights, break lights, head lights, etc.) and may connect with the lights or other electronics of the vehicle towing the shelter/camper such that the lights of each are similarly controlled (e.g., brake lights on each are coordinated).

The shelter/camper 400 may include one or more connectors or connector components/sections (e.g., the same as or similar to connector 442). In one embodiment, connector 442 may be a mid-section connector. Connector 442 may be a continuous, structural ring around the perimeter of the shelter/camper (e.g., for shelters/campers that have two or more pairs of wall panels per side). The connector 442 may connect the upper pairs of wall panels (e.g., wall panels 410 and 414) to the lower pairs of wall panels (e.g., wall panels 412 and 416). The connector 442 may be tall enough to allow the lower sections 428 and 436 of the upper pairs of wall panels and the upper sections 430 and 438 of the lower pairs of wall panels to sit completely or partially within the connector 442 when the shelter/camper is in a closed/collapsed configuration, and all wall panels are folded flat. Assuming 1" thick panels, this may result in at least a 2" tall mid-section connector, but the connector 442 may be a variety of sizes, including 1" to 24" tall, 2" to 12" tall, or 2" to 6" tall. The connector 442 may give structural rigidity to the shelter/camper during the opening/expanding and closing/collapsing processes or transitions (e.g., as may be seen in FIGS. 16, 17 and 18). The connector 442 may include weather stripping or gaskets that may form a weather tight seal between it and the walls or wall panels connected to it. The weather stripping or gasket may also form a weather tight seal with the roof section 402 and/or the floor section 404 when the shelter/camper is in a closed/collapsed configuration (e.g., as shown in FIG. 19).

The connector 442 may include a portion/segment (e.g., a front end portion/segment) that may be hinged and/or latched on one or both sides of an end or portion of the shelter/camper (e.g., at a portion of a mid-section connector across the front door 422) allowing the door 422 to open and close freely when the shelter/camper is in an open/expanded configuration. This hinged/latched portion may be unlatched from the rest of the connector 442 allowing the hinged/latched portion to swing open and closed with the door 422, if attached to the door. Optionally, the hinged/latched portion may be unlatched and swung away to the side or completely removed to allow free movement of the door 422. During opening/expanding, closing/collapsing, and in closed/collapsed configuration, this hinged/latched portion of the connector 442 may be latched to the rest of the connector 442, forming a continuous structural ring around the perimeter of the shelter/camper. The connector 442 may include components of a lock, latch and/or hinge system. The connector 442 may also include handles (e.g., in the front and rear and/or on the sides of the shelter/camper) for manual lifting or lowering of a portion/section (e.g., the mid-section) of the shelter/camper during opening/expanding or closing/collapsing of the shelter/camper, respectively, or for carrying the shelter/camper when closed/collapsed. The connector 442 may include a mechanical system or components of a mechanical system for opening/expanding and closing/collapsing of the shelter/camper. The mechanical system may include a crank, pump, lever, pulley, spring(s), piston(s), hinges, spring-loaded hinges, motorized hinges, motor, other opening/closing mechanisms or components, and/or any combination of one or more of the foregoing as appropriate for the size and weight of the shelter/camper. The connector 442 may also include components of a track or pulley system for raising and lowering of the bed system (e.g., including a mattress 486 and a platform 488).

The floor section 404 may be the same as or similar to the floor section 4 of camper 1 and the floor section 104 of camper 100 above. In one embodiment, the floor section 404 may be flat across the entire length and width of the shelter/camper and may have an edge (e.g., a continuous raised edge) along all or a portion of the perimeter of the shelter/camper. Optionally, the floor section 404 may be curved, contoured, ridged, and/or include other aerodynamic features as discussed previously. A raised edge may be tall enough to completely contain various fixtures or components (e.g., optional seating, bath fixtures, interior wall components and a bed system) (see e.g., components 446-470, 474-490 in FIG. 14). The raised edge may be tall enough also to contain wall panels or sections of wall panels (e.g., front and rear wall panels 406 and 408 and the lower sections 432 and 440 of the lower pairs of wall panels 412 and 416 inside the floor when the shelter/camper is closed/collapsed) (e.g., as shown in FIG. 19). In one embodiment, the interior fixtures may be folded, minimized, or rearranged to reduce size in the closed/collapsed configuration. The floor section 404 may include an interior edge 492 in the front and an interior edge 494 in the rear of the shelter/camper that are slightly shorter than adjacent exterior edges so that the joint between it and the front and rear wall panels hinged to it can remain inside the floor section 404, which may also provide a better hinge point and water tightness when the shelter/camper is open/expanded.

The floor section 404 may have a length and width that matches or is equivalent to the roof section 402, floor section 4 of camper 1 or floor section 104 of camper 100. The width may be about the same as, slightly greater than, or greater than that of a mattress 486 contained within the shelter/camper or wider, and the length may be about the same as, slightly greater than, or greater than the length of the side wall panels or longer. Having the width and length at least slightly greater than the mattress may ensure that the mattress sits completely within the walls or wall panels that are attached to the floor section 404. The dimensions may be such that the mattress 486, walls/wall panels, interior fixtures, etc. sit entirely inside the shelter/camper when closed/collapsed. For example, a shelter/camper containing a King mattress (e.g., 76"×80" give or take a couple of inches) and having 1" thick panels, may have a floor section that is 78" wide×102" long (slightly longer than the bi-fold side walls, which may be 100" long in this case, to provide a gap between the mattress and the front wall when the shelter/camper is open/expanded and between the mattress and the rear of the shelter when the shelter is closed/collapsed). The edge(s) (e.g., a continuous raised edge) of the floor section 404 may include weather stripping or gaskets that may form a weather tight seal between it and the walls/wall panels connected to it. The weather stripping or gasket may also form a weather tight seal with the connector 442 when the shelter/camper is in the closed/collapsed configuration.

The floor section 404 may include an access panel 420, allowing access to batteries and/or other system components (e.g., any components or features discussed with respect to floor section 4 of camper 1 or floor section 104 of camper 100). The bottom or sides of the floor section (internally or externally) may also include access panels or ports, allowing access to plumbing or electrical connections for fresh water supply, waste and waste water drainage, fuel supply (e.g., propane) or electrical supply (e.g., external generator). The floor section 404 may include fixtures such as lighting, light switches, electrical outlets, venting fans, storage pockets, electrical connections, plumbing connections and attachments for mounting heating/cooling equipment. The floor section 404 may include seating (e.g., a left side backrest 446, a left side seat 448, a left side backrest frame 450, a left side seat frame 452, a right side backrest 456, a right side seat 458, a right side backrest frame 460, a right side seat frame 462); a bathroom (e.g., a vanity section 474 with a sink and faucet, vanity sections 476 and 478, with storage and/or plumbing components, piston lifts 480 to raise the vanity height, a shower 482, and/or a toilet 484); an interior wall 464 (e.g., an upper interior wall panel 466 with door 470, a section 468 (e.g., a raised interior section of the floor section), and/or a track system 490 attached to the bed platform for moving the upper interior wall panel); a bed system (e.g., mattress 486 and platform 488); and other associated components. The floor section 404 may also include attachments to allow mounting to vehicle roof racks, utility trailers or pick-up truck beds or secure attachment to any surface below it. The floor section 404 may include a mechanical system or components of a mechanical system for opening/expanding and closing/collapsing of the camper. The mechanical system may include a crank, pump, lever, pulley, spring(s), piston(s), hinges, spring-loaded hinges, motorized hinges, motor, other opening/closing mechanisms or components, and/or any combination of one or more of the foregoing as appropriate for the size and weight of the shelter/camper. The floor may also include components of a track or pulley system for raising or lowering of the bed system (e.g., mattress 486 and platform 488). The floor section may also include connection, lock, and/or latch components to latch it to a connector 442 and/or the roof section 402 to keep the shelter/camper closed tightly. The exterior of the floor section 404 may also include small wheels for transportation or direct towing/pulling (e.g., transportation over short distances like that to and from a vehicle). The floor section may also include fixed height or adjustable feet removably or permanently attached thereto (e.g., to one or more exterior portions of the floor section). The Floor section 404 may include lights or light fixtures internally and/or externally. Internally, lights or light fixtures may provide light for the occupant. Externally, the lights may act as car lights (e.g., tail lights, break lights, head lights, etc.) and may connect with the lights or other electronics of the vehicle towing the shelter/camper such that the lights of each are similarly controlled (e.g., break lights on each are coordinated).

The bed system may comprise or consist of a mattress 486, a mattress platform 488, components of a system for raising and lowering of the bed, and/or other components. The bed system may be positioned roughly 3' or more or less below the roof section 402 and toward the rear wall panel 408 (e.g., creating a loft as shown in FIG. 14) when the shelter/camper is in an open/expanded configuration, and when standing height below the bed and sleeping height above the bed are simultaneously preferred; or the bed system may be moved to a position in or near the floor section 404 and toward the front of the shelter/camper, resting on any interior components below, when the shelter/camper is closed (e.g., as shown in FIG. 19). The bed system may be raised or lowered manually or mechanically using a track system; slots, ledges, a cable system, a pulley system, a hook system; and/or using a combination of components (e.g., a combination of track and pulley systems); or using some other system capable of easily and quickly raising and lowering the bed system. A mechanical system for raising or lowering the bed system may be powered or operated manually.

The bottom surface of the bed platform may serve as a ceiling for the areas below the bed, when the shelter/camper is in the open/expanded configuration and the bed system is raised or located roughly 3' below the roof section 402 and adjacent to and optionally attached (e.g., attached using one or more latches or other types of connectors) to the rear wall 408 of the shelter/camper, creating a loft; therefore the bed system or bed platform 488 may include light fixtures, components (e.g., track system 490) to attach an upper section 466 of interior wall 464, curtains, dividers, a shower curtain, and/or any combination of these. As the bed system rises or lowers, the upper panel 466 of the interior wall (e.g., if detached from raised section 468 in the floor section), curtains, dividers, and/or shower curtain may rise and lower with the bed system, without detachment from it (e.g., as can be seen in FIG. 15). This may allow the interior components attached to the bed system to quickly convert between configurations for use and storage when the shelter/camper converts between open/expanded and closed/collapsed configurations. Movement between the loft area and other areas may be possible via a ladder 454 placed in the gap between the front wall 406 and the bed system (e.g., as shown in FIG. 14), in a camper configured to be sufficiently longer than the mattress it contains. If the shelter/camper is sufficiently wider than the mattress it contains, the ladder may be placed in the gap between the left and/or right wall panels and the bed system. The ladder may be a collapsible ladder that may capable of transitioning between a collapsed configuration for storage and an expanded configuration for use; or the ladder may be a standard, fixed length ladder. For closing/collapsing of the shelter/camper the ladder may be collapsed, if necessary, and stored in any available space in a closed/collapsed shelter (e.g., in the space between the folded right side wall panels and the folded left side wall panels). Alternatively, the shelter/camper may contain other components or methods that may enable an occupant to move between the loft and the areas below the bed system, such as: foot and/or hand holds embedded in the wall panels, retractable into the wall panels or otherwise attached to the wall panels; interior components arranged in a manner that they may be stepped on or climbed up or down on (e.g., an occupant may be able to step on seats, backrests, and/or other fixtures to reach the bed or climb down from the bed); a rope ladder; a ladder attached to and retractable into the bed system; and/or any other fixtures or components or combinations of fixtures or components or methods that may allow an occupant to move between the bed and the areas below it. The bed platform 488 may also include other fixtures such as light switches, electrical outlets, ceiling-mounted televisions, storage pockets, storage hooks, removable tables, electrical connections and plumbing connections. The mattress 486 contained within the shelter/camper may be any standard size mattress (Twin, Twin XL, Full, Full XL, Queen, King, California King) or any custom size mattress. The mattress 486 may be foam, inner-spring, or any type of mattress commonly available.

Shelter/camper 400 may have one or more interior wall panels or dividers the same as or similar to its exterior panels described above. The interior wall panels may be rigid, folding, bi-folding, tri-folding, quadri-folding, multi-folding or sectional; or the interior wall may be flexible (e.g., similar to accordion walls and door 166-170 of camper 100). Optionally, the interior walls may be a combination of sectional components or maybe another type of panel or may be a combination of panels or components. In one embodiment, as shown in FIG. 14, interior wall 464 may be a combination of upper interior wall panel 466 and section 468 (e.g., a raised interior section of the floor section). The interior wall panel may be the same width as the front and rear wall panels, extending from the right side wall panels 410 and 412 to the left side wall panels 414 and 416, and sitting flush against the side panels and mid-section connector 442. Interior wall 464 may be attached to the bed system, as described above. The interior wall may contain an upper, movable interior wall panel 466 hinged on the top to platform 488 using track system 490 or other type of track or connector. The track may be embedded or otherwise attached to a bottom surface of the bed platform 488. The track system may allow the interior wall panel to move with the bed platform, as the bed platform is moved between positions for use and storage, as previously mentioned. The upper panel section may also be connected to the bed platform using hinges, latches, hooks or any other types of connectors. In a closed/collapsed configuration or for closing/collapsing of the shelter/camper, the upper interior wall panel may be positioned parallel to and underneath the bed platform 488 (e.g., as shown in transition in FIG. 15 and in a closed/collapsed shelter/camper in FIG. 19). In an open/expanded configuration, the upper interior wall panel may be positioned perpendicular to the bed platform and latched to a raised interior section 468 in the floor section (e.g., as shown in FIG. 14). The upper panel 466 of the interior wall 464 may be tall enough to extend between the bed platform in a raised or loft position and section 468 (e.g., a raised interior section attached to floor section 404, or integrated or integrated with the floor section), forming a continuous interior wall. In one embodiment the upper interior wall panel section may be 80" L. When connected to section 468, which may be 4" L in this case, the interior wall may be about 7' tall. Movement from one section to another section of the shelter/camper (e.g., from the seating area to the bathroom) through the interior wall may be accomplished through door 470.

Shelter/camper 400 may have seating (e.g., components 446-452 and 456-462) that may be convertible into extra sleeping surfaces. In one embodiment, the seating may be converted into an extra bed by repositioning both backrests 446 and 456 from vertical positions, or almost vertical positions, for sitting, to horizontal positions, between left seat bottom 448 and right seat bottom 458. The backrests may each be about ½ the depth of the seat bottoms to allow one backrest to rest on top of the other back rest for sleep or storage configurations, when positioned between the seat bottoms. The backrest frames 450 and 460 may be stacked, one on top of the other, as described above, and may be secured to the seat frames 452 and 462 by use of hinges, latches, hooks or other types of connectors, or may simply rest on the floor 404 between the seat bottoms, if the seat bottoms are also lowered to the floor (e.g., similar to the configuration of the seat benches when stored in a closed/collapsed shelter/camper, as can be seen in FIG. 19). One backrest frame (e.g., frame 450, which may be the lower backrest frame when positioned horizontally) may have a hard bottom surface and side surfaces and the other backrest frame (e.g., frame 460, which may be the upper backrest frame when positioned horizontally) may have just hard side surfaces. When frame 460 rests on top of frame 450 for use as a bed, this may allow the attached cushion for backrest 456 to rest directly on top of the attached cushion for backrest 446 (e.g., with no hard frame or surface between the cushions), providing cushion depth for sleeping roughly similar to the depth of each seat bottom cushion while still providing a hard support surface below the cushions (e.g., when the backrests are stacked and placed between the seat bottoms, each of the three sections of the converted bed may have a similar mattress depth and support below). The seat frames may contain adjustable legs which may be used to adjust the height of the seats, if configured for sitting, or the bed, if configured for sleeping. The seats may also be attached to and positioned using a track system or any other components that may exist for raising and lowering the bed system above (e.g., mattress 486 and platform 488) (e.g., the seat frames may also be attached, below the bed platform, to the same track system or other components for raising and lowering the bed system). Alternatively, the backrests 446 and 456 may simply be cushions themselves (e.g., with no backrest frame), and conversion for sleep may be done by simply lowering the seat bottoms to the floor and repositioning the cushions in the center, between the seat bottoms (e.g., as in a closed shelter/camper). In one embodiment, shelter/camper 400 may contain seat bottoms 448 and 458 that are 26" W×55" L and backrests 446 and 456 that are 24" W×55" L. When configured for sleep position, components 446-452 and 456-462 may combine to form a bed that is similar in size to a Full mattress (e.g., 54"×75" give or take a couple of inches). Optionally, a shelter/camper may also be configured to use the seating as the only sleeping surface (e.g., shelters/campers with no bed system, as described above).

The shelters/campers (e.g., camper 1, camper 100 and camper 400) described herein may include a variety of interior fixtures or components for convenience (see e.g., fixtures/components 446-484) and related system components. Depending on the size of the shelter/camper, several combinations of seating, cooking and bathroom fixtures may be possible. The fixtures or other components described herein may be designed to remain in the shelter/camper when in the closed/collapsed configuration or may be designed to be removed when closing/collapsing the shelter/camper and reinstalled when opening/expanding the shelter/camper. If the interior fixtures are to remain inside the shelter/camper when it is closed/collapsed, the fixture dimensions, especially the heights, may be limited by the available space in the shelter/camper when it is in the closed/collapsed configuration. For example, the dimensions may be limited by the size or depth of the floor section 404 under the wall panels or by the space between wall panels, when all panels are folded flat for closing, or by any space available in the roof section. The floor section 404 may be any depth necessary to accommodate interior fixtures. If desired to reduce the overall height of the shelter/camper when closed/collapsed to allow for easier transportation (e.g., on a roof rack), the height of the floor section may need to be kept to a minimum, and interior components may need to be collapsible or removable for closing/collapsing of the shelter/camper.

Figure 16:
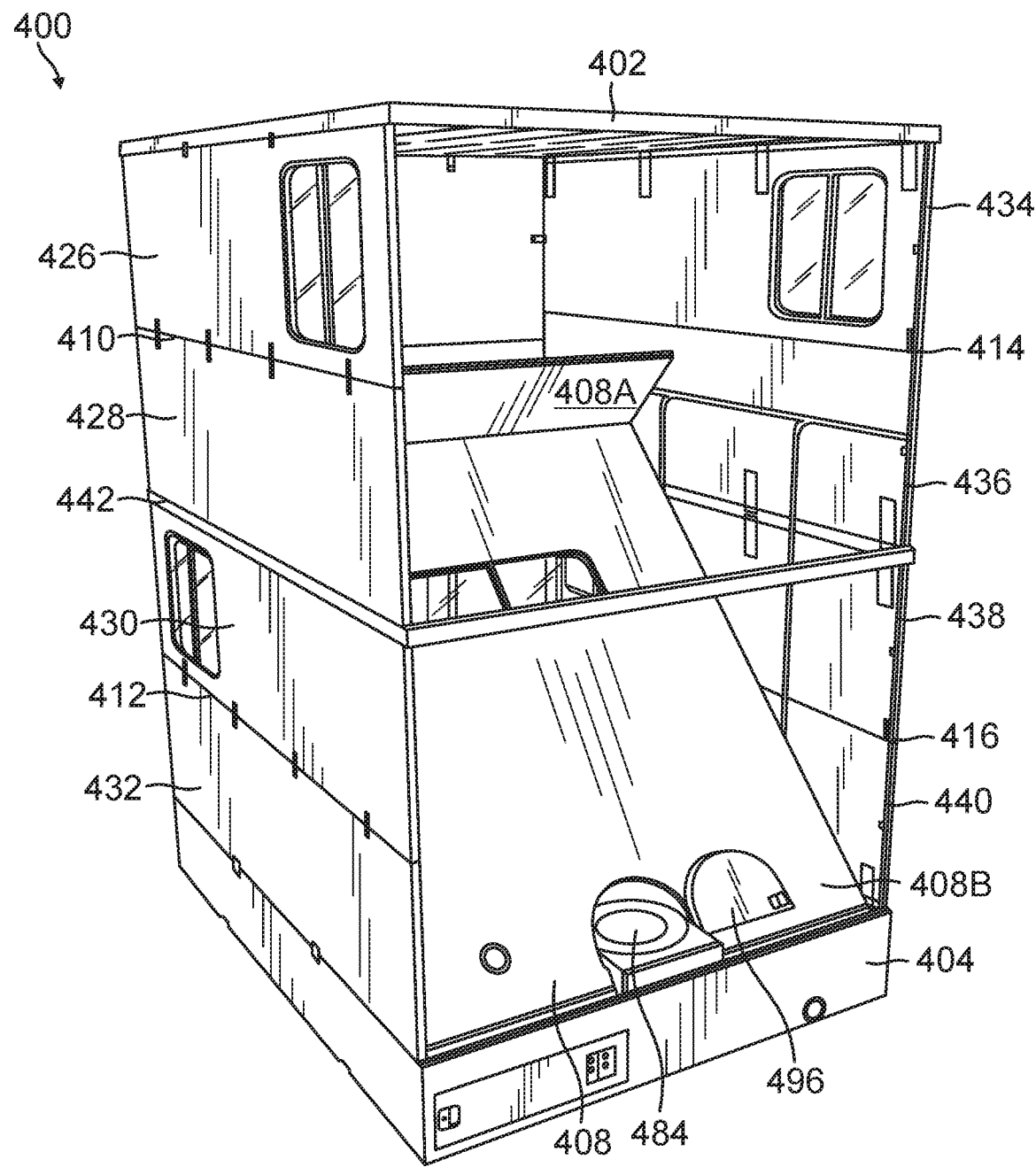
FIG. 16 shows a rear perspective view of the shelter of FIG. 12 in a first transition position between an open or expanded configuration and a closed or collapsed configuration.

In one embodiment, as shown in FIGS. 15 and 19, only 9" H×76" W×98" L in the floor section plus 4" H×22" W×100" L in the center, between the folded side wall panels may be available for interior components that may remain in the shelter/camper when closed/collapsed. Accordingly, in this and similar situations of other dimensions, interior seat, storage, kitchenette and bathroom components may have to be collapsible into a small area (e.g., no more than 9" or 4"

tall sections, with the exception of a 16" tall component or section of a component that may fit through door 496 in the lower rear wall panel 408B, in the example above), depending on where they will rest in the closed/collapsed shelter/camper. This can be accomplished by use of sectional components that are either connected (e.g., by hinges or some other connectors) or completely detached, which may enable the sections to lay flat for closing/collapsing of the shelter/camper (see FIGS. 15-19) or stacked for use while the shelter/camper is open/expanded (see FIGS. 12 and 14). For example, seat benches (see e.g., components 446-452 and 456-462) or a bath vanity (see e.g., components 474-478) may be laid flat for closing/collapsing of the shelter/camper or stacked for opening/expanding of the shelter/camper, and possibly even raised to a more comfortable user height by use of adjustable legs, lifts, piston lifts (see e.g., component 480), or other lifting mechanism appropriate for the size and weight of the component. Some components such as the shower basin 482 may be short enough to fit in the space of the floor section without the need to be collapsed or removed, and associated shower components such as a flexible shower head, shower curtain and/or other shower components may fit inside the shower basin. Some components such as a sink faucet and/or drain may either be folded into the sink without detachment, or detached and stored in the available space in the sink or vanity cabinets. The toilet 484 may be a fixed height component that can be removed for closing, may extend through openings in the wall panels (e.g., through a door 496 in the lower rear wall panel 408B, as can be seen in FIGS. 16-18), may be sectional, or may be a collapsible camp style toilet.

A wall divider the same as or different from interior wall 464 may be used between various areas within the shelter/camper (e.g., between the seating/cooking areas and the bathroom area). For example, use of one or more collapsible, accordion-type walls with an accordion door (e.g., similar to walls 166-168 with door 170 in camper 100), or other type of flexible or collapsible wall (e.g., a rigid wall panel 466 or flexible/fabric wall that may be foldable and/or collapsible) may be attachable to the bottom of the bed platform 488, while the shelter/camper is in an open/expanded configuration. The wall and door may be detachable and compressible into the floor area below the folded wall panels while the shelter/camper is in a closed/collapsed configuration. Alternatively, all or part of the collapsible/flexible wall may remain fixed to the bed platform 488 and may be detachable from the floor or a raised section in the floor (e.g., lower section 468). The wall may be stored under the bed platform and parallel relative to the bed platform in a closed/collapsed configuration, as described previously. Similarly, a shower curtain can be attached to the bed platform 488 while the shelter/camper is open/expanded and detached while the shelter/camper is closed/collapsed. A shower curtain may also remain attached to platform 488 and stored flat under the platform while the shelter/camper is closed/collapsed. In one embodiment, plumbing lines can be tubes, pipes, flexible tubing, etc. attached to the sectional components themselves, embedded in the panels of the roof, floor, walls or bed platform, or detached and stored when the shelter/camper is closed/collapsed and reattached when the shelter/camper is open/expanded. Fresh water tanks and fuel tanks may be (1) included external to the shelter/camper and attached with piping, tubing, flexible tubing, etc.; (2) placed inside when the shelter/camper is open/expanded and removed when the shelter/camper is closed/collapsed, (3) fitted into any available space inside storage cabinets or in lieu of other components; or (4) otherwise associated and/or connected to the shelter/camper. Other fixtures, such as one or more mirrors 472, wall/ceiling mounted televisions, storage pockets and hooks and other components may be embedded in the panels of the roof, floor, walls or bed platform.

In one embodiment, where the exterior height of the closed/collapsed shelter/camper is not limited or may be greater, e.g., as in shelters/campers designed for attachment to a utility trailer, the depth of the floor section (or height of the raised edge of the floor) may be tall enough to accommodate seating, kitchenette fixtures, bathroom fixtures, and other fixtures or components that do not need to be collapsed when the shelter/camper is closed/collapsed. For example, a floor section 404 with a height of 30-36" or more may accommodate fixtures such as seating, cooking, bath fixtures, etc. that may be permanently installed, do not need to be collapsed and may remain inside the shelter/camper when the shelter/camper is closed/collapsed.

When the shelter/camper 400 is in an open/expanded configuration, all wall panels 406, 408, 410, 412, 414 and 416 may be extended vertically until they are perpendicular to the roof section 402 and floor section 404, forming a complete enclosure that is suitable for sleeping and living, in properly equipped shelters/campers. The front wall panel 406 and rear wall panel 408 may sit flush against the right side wall panels 410 and 412, left side wall panels 414 and 416 and connector/mid-section connector 442. Positioned between the side wall panels, the front and rear wall panels may help prevent the side wall panels from folding inward. Slide latches or other components, as mentioned above, may also be used to help prevent wall panels from folding inward when in an open/expanded configuration. Weather stripping or gaskets may ensure a weather tight seal between all joints. The door 422 may allow entry to and exit from the shelter/camper and may be locked, securing occupants and/or belongings inside the shelter/camper. The windows 444 may also be opened or closed.

In open/expanded configuration (e.g., as shown in FIG. 14), the shelter/camper may have an interior height between the floor and the mattress platform 488 comfortable enough for most occupants to stand. The interior height between the mattress and the ceiling may also be enough to sit, crawl, sleep and in some cases even stand. In an open/expanded configuration, interior fixtures 446-470 and 474-490 may be stacked and/or extended for use or collapsed for closing/collapsing of the shelter/camper. If the shelter/camper (e.g., in the floor section 404) is tall enough to accommodate interior fixtures that do not need to be collapsed or removed for closure of the shelter/camper, the fixtures can remain in place while the shelter/camper is in open/expanded configuration or in the closed/collapsed configuration. In an open/expanded configuration, the bed system (e.g., mattress 486 and platform 488) may be raised to a loft position for full standing height below the platform 488 and sleeping height above the mattress 486 (e.g., as shown in FIG. 14) or any height in between the ceiling and the fixtures (e.g., fixtures 446-470 and 474-484) below the bed system.

Water and fuel tanks may be placed externally or internally and connected to interior components as described previously. Use of optional heating and cooling equipment can maintain a comfortable interior environment in an open/expanded configuration. Components such as televisions and other electrical equipment may also be used when the shelter/camper is open/expanded. Optional solar panels 418 and batteries can continue to operate in the open/expanded configuration or in the closed/collapsed configuration. The shelter/camper 400 may remain open/expanded in place on a vehicle roof rack, in a pick-up truck bed, on a trailer, or on any surface that can support its weight and the weight of its occupants.

When the shelter/camper is in closed/collapsed configuration (e.g., as shown in FIG. 19), all wall panels (e.g., wall panels 406, 408, 410, 412, 414 and 416), interior wall 464, the bed system (e.g., mattress 486 and platform 488), and all interior components/fixtures that remain in the closed/collapsed shelter/camper (e.g., fixtures/components 446-462 and 472-484) may sit entirely inside a closed case formed by joining the roof section 402, one or more connectors 442 (if used), and/or the floor section 404. In one embodiment, the closed case may contain components in the following order, from top to bottom: Upper panel sections 426 and 434 of the upper pairs of wall panels 410 and 414; lower panel sections 428 and 436 of the upper pairs of wall panels 410 and 414; upper panel sections 430 and 438 of the lower pairs of wall panels 412 and 416; lower panel sections 432 and 440 of the lower pairs of wall panels 412 and 416; lower panel section 406B of the front wall panel 406; upper panel sections 406A and 408A of the front and rear wall panels 406 and 408; lower panel section 408B of the rear wall panel 408; mattress 486, mattress platform 488; shower curtain, if attached to the mattress platform; upper panel 466 of the interior wall 464; and all interior components/fixtures attached to the floor (e.g., fixtures/components 446-452 and 456-462, 468 and 474-484). If the front and rear wall panels are hinged to the roof section instead of the floor section, the front and rear wall panels may sit between the roof section and the upper panel sections of the upper pairs of bi-fold side wall panels. The roof section 402, one or more connectors 442, the floor section 404, or various combinations of these may have weather stripping or gaskets in between, forming a weather tight enclosure when in the closed/collapsed configuration. Locks, latches, connectors, etc. connecting the roof section, mid-section connector and the floor section may ensure the case remains tightly closed while in transit or not used. Optional solar panels 418 and batteries can continue to operate in closed/collapsed configuration.

The shelter/camper may be simple and easy to transition between configurations without any tools/specialized tools or, optionally, with additional tools that aid transitioning. In one embodiment, to open/expand the shelter/camper 400, the locks, latches, or other connectors connecting the roof section 402, one or more connectors 442, the floor section 404, or various combinations of these may first be unlocked, unlatched, unconnected, etc. and opened. Then the roof section 402 and the side wall panels 410 and 414 may be raised (e.g., as shown in transition in FIG. 18) until the wall panels 410 and 414 are completely vertical (e.g., as shown in FIGS. 16 and 17). The raising/opening of the roof section 402 and side wall panels may be done either manually or using some manner of mechanical assistance or mechanical system (e.g., lifting/lowering mechanisms that are either powered or manually operated, such as motorized hinges, pistons, other systems/components described elsewhere herein, etc.) that is appropriate for the size and weight of the shelter/camper. Slide latches or other components may be used between sections of the wall panels (e.g., between upper sections 426 and 434 and lower wall panel sections 428 and 436 of the upper pairs of wall panels 410 and 414) to prevent the bi-fold wall panels from folding inward. This process may open/expand the upper half of the shelter/camper. The same or a similar process may open/expand the lower half. The side wall panels 412 and 416 may be raised/opened simultaneously with the other side wall panels 410 and 414 or may be raised/opened successively. Opening processes may be performed simultaneously or in succession in any order. FIGS. 16 and 17 show the shelter/camper 400 in the fully raised position with the side wall panels 410, 412, 414, and 416 all expanded and vertical.

With the shelter/camper in fully raised position, the front wall panel 406 can be raised (manually or mechanically) until the free or unhinged end of the upper panel section 406A of the front wall latches or otherwise connects with the front edge (e.g., an interior surface of the dropped front edge) of the roof section 402 or directly with the bottom surface of the roof section (e.g., the ceiling of the shelter/camper). Once the front wall is raised, the rear wall panel 408 can be raised (manually or mechanically) until the free or unhinged end of the upper panel section 408A of the rear wall latches or otherwise connects with the rear edge (e.g., an interior surface of the dropped rear edge) of the roof section 402 or directly with the bottom surface of the roof section (e.g., the ceiling of the shelter/camper). FIGS. 16 and 17 show the front and rear wall panels 406 and 408 in the process of being raised. Once fully raised, the front and rear wall panels may sit flush with the edges of the side wall panels, further preventing the wall panels (e.g., bi-fold wall panels) from folding inward. Once the shelter/camper is fully opened/expanded, the bed system (e.g., mattress 486 and platform 488) may be raised and positioned toward the top and rear of the camper. The upper panel section 466 of the interior wall 464 may then be lowered (by gravity or mechanically) and positioned so that the free or unhinged end may latch or otherwise connect with a raised section (e.g., raised interior section 468) of the floor section 404. FIG. 15 shows the bed system and upper panel section of the interior wall in the process of being raised. Once the bed system is raised and the internal wall is connected, the interior fixtures 446-462 and 474-484 may be extended, stacked, raised, and/or otherwise situated for use. External tanks, plumbing components, and/or other equipment may be connected and/or attached for operation. If the rear wall panel is hinged higher than the front wall panel to the edges (e.g., raised interior edges) of the floor section, then the order mentioned above for raising and lowering the front and rear wall panels may be reversed. If the front and rear wall panels are hinged to the roof section instead of the floor section, the free ends of the front and rear wall panels may then be lowered (by gravity or mechanically) until they latch with the front and rear edges (e.g., raised interior edges) of the floor section.

To close/collapse the shelter/camper, the interior fixtures 446-462 and 474-484 may be collapsed or removed for storage, if necessary, the upper section of the interior wall may be disconnected from the raised interior section of the floor, the bed system, along with the upper interior wall panel, may be moved toward the front of the camper and lowered into the floor section, and external tanks, plumbing components, and/or other equipment may be disconnected, detached or removed, if necessary. Then the free end of the upper panel section 408A of the rear wall panel may be unlatched or otherwise disconnected from the edge or bottom surface of the roof section and the panel may be lowered (by gravity or mechanically) (e.g., as shown in transition in FIG. 16) toward the floor section and folded inward so that the lower panel section 408B of the rear wall may rest flat against the top of the mattress 486 and the upper panel section 408A may rest above the lower panel section (e.g., as shown in FIG. 17). Then the free end of the upper panel section 406A of the front wall panel may be unlatched or otherwise disconnected from the edge or bottom surface of the roof section and the panel may be lowered (by gravity or mechanically) (e.g., as shown in transition in FIG. 17) toward the floor section and folded inward so that the upper panel section 406A rests flat against the lower panel section 408B of the rear wall and the lower panel section 406B rests above both of the upper panel sections of the front and rear wall (e.g., shown in FIG. 18). Then any slide latches or other components holding the side wall panels open can be unlatched or adjusted, so that the side wall panels (e.g., bi-fold side wall panels) can begin to fold inward and the roof section 402 and any connector(s) 442 can begin to lower (e.g., as shown in transition in FIG. 18). The upper and lower halves of the shelter/camper may be lowered simultaneously or in succession, in any order. The lowering of the roof section, any connector(s), and the side wall panels (e.g., four pairs of bi-fold side wall panels as shown in FIG. 18) may be mechanically assisted by lifting/lowering mechanisms or other mechanical systems described herein that are either powered or manually operated, such as motorized hinges, pistons, etc. that are appropriate for the size and weight of the shelter/camper. If the front and rear wall panels are hinged to the roof section instead of the floor section, the free ends of the of the front wall panel and rear wall panel lower sections may be unlatched or otherwise disconnected from the raised edge of the floor section so that the panels may be raised (manually or mechanically) until they latch flat against the ceiling of the roof section. Once the wall panels are fully lowered, the roof section 402, any connector(s) 442, and the floor section 404 may be latched, connected, and/or locked together, creating a tightly closed, secure case (e.g., as shown in FIG. 19).

The enclosure walls 406, 408, 410, 412, 414, and 416, roof section 402, connector(s) 442, and floor section 404 may be constructed of composite material such as fiberglass, carbon fiber, or any other composite material. Alternatively, the panels may be constructed with wood or aluminum framing and sided with wood, aluminum, laminate, fiberglass or any other siding material. The panels may have a solid, honeycomb, sectioned or hollow core. The panels may be insulated with polystyrene, fiberglass, any other insulating material, and/or any other vapor barrier material (e.g., one or more of these may be used inside the panels). Interior surfaces may be painted, left unfinished or finished with any appropriate material, such as plastic, wood or fiberglass paneling or may be upholstered. The interior wall panel 466 may be constructed the same as or similar to the exterior walls or from any of the materials or combinations of materials mentioned above for the exterior wall panels. Interior fixtures 446-462, 472-484, 488 and 490 may be constructed of any appropriate material such as plastic, wood, laminate, fiberglass, glass, stainless steel, or other metal or fabric.

In one exemplary embodiment, as shown in FIGS. 15 and 19, the exterior dimensions of shelter/camper 400 that contains a 3" thick King mattress (e.g., 76"×80" give or take a couple of inches), 1" thick panels and has front and rear wall panels hinged to the floor may be 78" W×102" L×126" H in an open/expanded configuration and 78" W×102" L×18" H in a closed/collapsed configuration. This embodiment has 27" H×100" L bi-fold side panel sections 426, 428, 430, 432, 434, 436, 438 and 440. This embodiment also has a 14" tall floor section 404, which has a floor thickness of 1", plus 9" of height to accommodate the interior fixtures 446-470 and 474-490, plus 3" of height to accommodate the 1" thick front and rear folding wall panels 406 and 408 (e.g., 1" for the lower panel section 408B of the rear wall, 1" for both of the upper panel sections 406A and 408A of the front and rear walls, and 1" for the lower panel section 406B of the front wall), plus 1" of height to accommodate the 1" thick lower sections 432 and 440 of the lower pairs of bi-fold side wall panels 412 and 416 when in a closed/collapsed configuration. This embodiment may have a 2" tall mid-section connector 442 that may provide 2" of height for the 1" thick upper sections 430 and 438 of the lower pairs of bi-fold side wall panels 412 and 416 and the 1" thick lower sections 428 and 436 of the upper pairs of bi-fold side wall panels 410 and 414. This embodiment may have a 2" tall roof section 402 with a ceiling thickness of 1", plus 1" of height to accommodate the 1" thick upper sections 426 and 434 of the upper pairs of bi-fold side wall panels 410 and 414 when closed/collapsed.

In the embodiment shown in FIGS. 15 and 19, the lower panel section 406B of the front wall 406 may be 76" W×80" H and the upper panel section 406A may be 76" W×33" H or have a total combined length of 113" for both or all sections of a foldable, bi-fold or multi-fold front wall panel. The lower panel section 408B of the rear wall 408 may be 76" W×97" H and the upper panel section 408A may be 76" W×18" H or have a total combined length of 115" for both or all sections of a foldable, bi-fold or multi-fold rear wall panel. The roof section 402 may have a dropped interior edge that is 1" H. The floor section 404 may have a raised interior front edge 492 that is 11" H and a raised interior rear edge 494 that is 9" H (except for a middle portion of the raised interior rear edge that is 16" H, in this case, to accommodate a fixed height toilet 484). With the shelter/camper fully opened/expanded, the distance between the roof and floor exterior edges may be 110". With the bed system (e.g., mattress 486 and platform 488) in fully raised position, the distance between the mattress platform and the floor is 84", resulting in about 7' of interior standing height, and the distance between mattress platform and the ceiling is 39", resulting in about 3' of interior height for sleeping, depending on the thickness of the mattress. In this embodiment, the available space for interior fixtures may be 9" H×76" W×98" L along the floor, under all of the folded wall panels; and 4" H×22" W×100" L in the center, in the gap between the 2 pairs of folded bi-fold wall panels on each side (this amounts to a continuous height of 16" from the floor to the bottom surface of the roof section through door 496 in the rear wall panel for a fixed height component such as a toilet). This embodiment employs a configuration that accommodates the following: 4" H×26" W×55" L left seat bench; 4" H×26" W×55" L right seat bench; 2" H×24" W×55" L left and right seat backrests stacked on top of each other for storage; a 1" thick fixed lower section of an interior wall; shower basin that is 4" H×27" W×36" L; a bath vanity in 3 sections, 1 of which is 4" H×30" W×12" L and 2 of which are 9" H×30" W×9" L; 16" H×16" W×18" L toilet; and available space for components such as electrical outlet boxes or other smaller interior components. When the shelter/camper is collapsed, the benches, backrests, fixed lower interior wall section, the upper vanity section and a portion of the shower basin may occupy the 4" of height under the upper interior wall panel section when it is positioned horizontally. That panel will occupy 1" of height and the mattress and platform together will occupy about 4 in of height above that, adding up to 9" of total height for the interior components below all of the folded wall panels. The rest of the shower basin and the other two vanity sections will occupy the rest of the 9" of height in the gap between the upper interior wall panel section, mattress, or platform and the rear of the shelter/camper. The toilet may occupy the 16" of height between the floor and the roof, through the door in the rear lower wall panel section. These example dimensions are for a shelter/camper with a King mattress. The dimensions and/or configurations of components and interior fixtures may vary depending on the size of the mattress the shelter/camper contains and other factors. For example, in one embodiment, the dimensions cited above may vary within plus or minus 15", 12", 6", 3", or other amounts. In one embodiment, the dimensions may be sized to leave room in the collapsed/closed configuration for interior fixtures that could be 36" tall or taller and/or to allow for shelters where the floor is tall enough to accommodate fixtures such that they do not need to be collapsed. In one embodiment, the dimensions affecting the height of the shelter may be increased by an amount between 2" and 40", between 10" and 30", and/or between 12" and 24".

FIGS. 20-27 illustrate another exemplary embodiment of a shelter or camper. Camper 600 depicted in FIGS. 20-27 may include features the same as or similar to those described above with respect to camper 1, camper 100 or camper 400 (and camper 1, camper 100 or camper 400 may include features the same as or similar to those of camper 600). In one embodiment, camper 600 may be configured as a hard-sided, collapsible camping unit that is a fully enclosed, weather tight, lockable and private living structure while in an open/expanded configuration and is an easily portable, hard case for transportation while in a closed/collapsed configuration. While camper 600 is in an open/expanded configuration, occupants may be able to sleep, sit, eat or use the bathroom in a properly equipped unit. The walls, wall panels, floor, roof, etc. may be constructed of rigid material or of materials similar to those described above with respect to camper 1, camper 100 and camper 400. In one embodiment, camper 600 may be configured as a stationary or non-portable shelter with similar features to those described herein, but configured to remain in a permanent or semi-permanent location.

Figure 22:
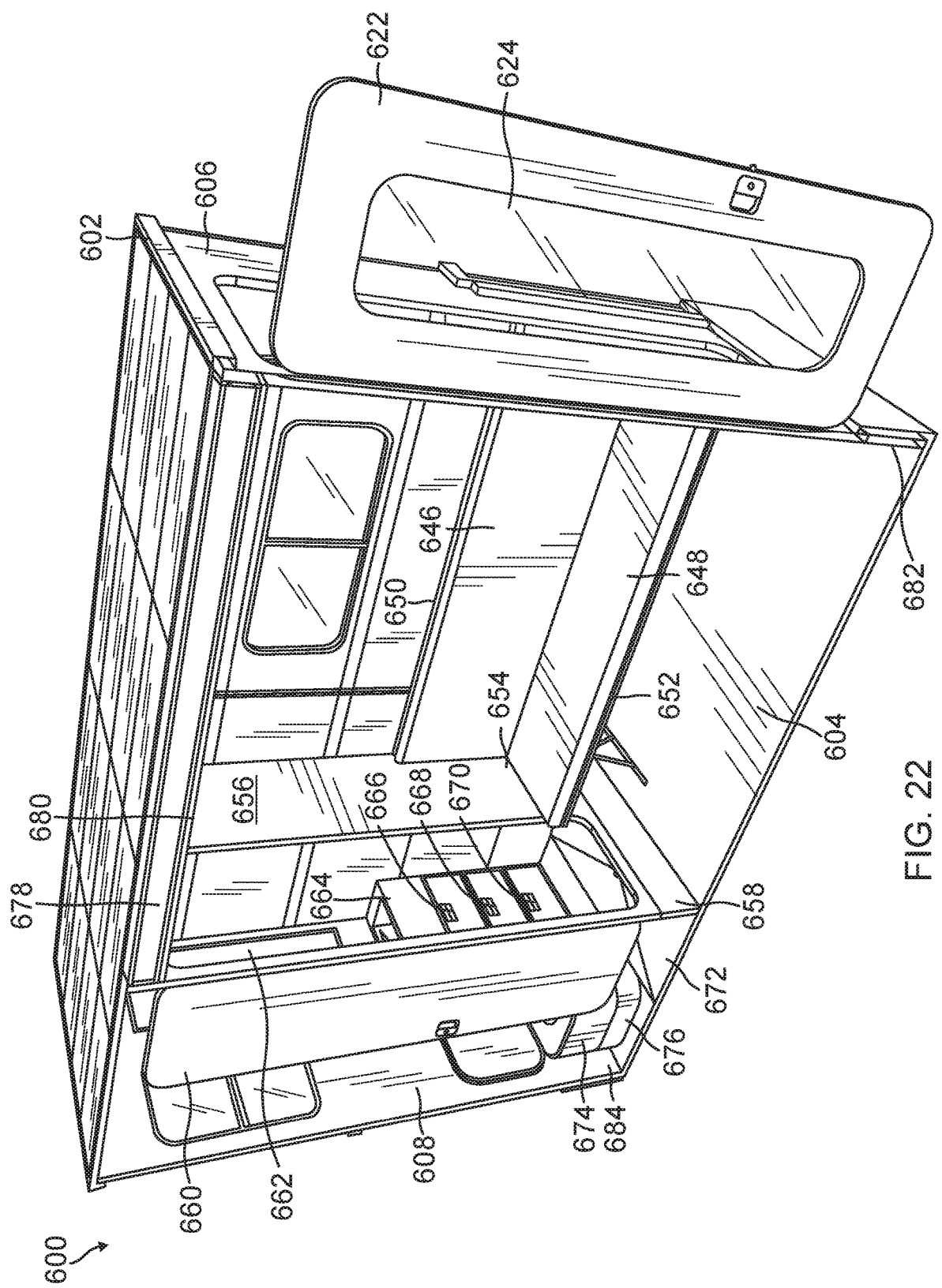
FIG. 22 shows a left perspective interior view of the shelter of FIG. 20 in an open or expanded configuration, with one wall removed for ease of view.
Figure 23:
FIG. 23 shows a front perspective view of the shelter of FIG. 20 in an open or expanded configuration, showing one possible configuration or position for the bed system.

In one embodiment, the structure (e.g., a rigid structure) of the shelter/camper 600 in both opened/expanded and closed/collapsed configurations may allow the shelter/camper to contain a mattress, seating, kitchen and bathroom fixtures, as well as televisions, lighting, electrical outlets, solar panels, batteries, heating and cooling appliances and any other system or convenience components that may be permanently or temporarily attached to or included in the shelter/camper. A rigid structure may also provide protection from the elements by forming a secure, weather-tight enclosure that may be heated or cooled with optional equipment. A rigid structure design may also allow the use of insulation in the structure's panels, further improving its interior climate control performance. The rigid structure (e.g., including hard-siding) may offer security by being lockable in both opened/expanded and closed/collapsed configurations. While in the open/expanded configuration, shelter/camper 600 may contain two sections or rooms separated by an interior wall. In one section (e.g., a section/room between the front wall and an interior wall), the shelter/camper 600 can provide a comfortable interior standing height with the bed system fully raised and stored (e.g., with the mattress 678 stored at the top of the camper 600 as shown in FIG. 22), or can provide a comfortable height for siting, sleeping and crawling when the bed system is lowered to a sleeping position (e.g., with mattress 678 in a low or middle position as shown, for example, in FIG. 23). The mattress 678 may be positioned in different locations (e.g., at different heights) in the camper 600 for different purposes/uses. In a second section (e.g., a section/room between the interior wall and the rear wall), the shelter/camper 600 can provide full interior standing height for use of components located that section (e.g., bathroom components 662-676) that is unaffected by the height of the bed system (e.g., as can be seen in FIGS. 22-23). Occupants may be able to move freely between the two sections, regardless of the bed position (e.g., the bed may be positioned at any height, and movement may be either over the bed and/or under the bed). When the camper 600 is closed, it may be collapsed into a low-profile, case (e.g., a hard case) that may be mounted to a vehicle roof rack; placed in the bed of a pick-up truck; placed on a trailer and towed behind a car, truck, motorcycle, bicycle or any other tow vehicle; placed in or on a boat; and/or placed anywhere there is a sufficient foundation or surface below and sufficient height above while open/expanded. The shelter/camper may be designed and configured to be easily and quickly opened/expanded in place for occupancy and closed/collapsed when in transit or in storage.

Figure 26:
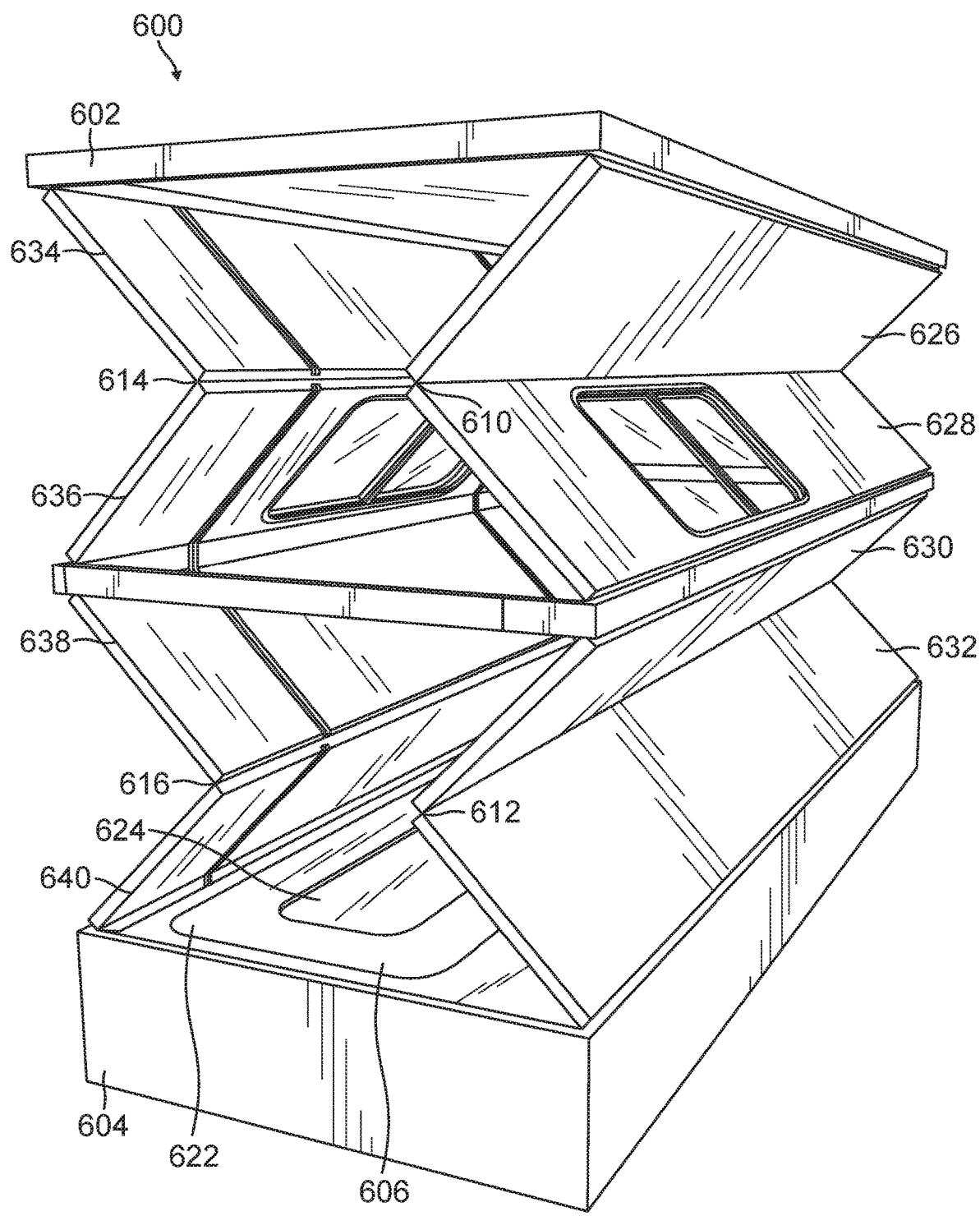
FIG. 26 shows a front perspective view of the shelter of FIG. 20 in a second transition position between an open or expanded configuration and a closed or collapsed configuration.
Figure 27:
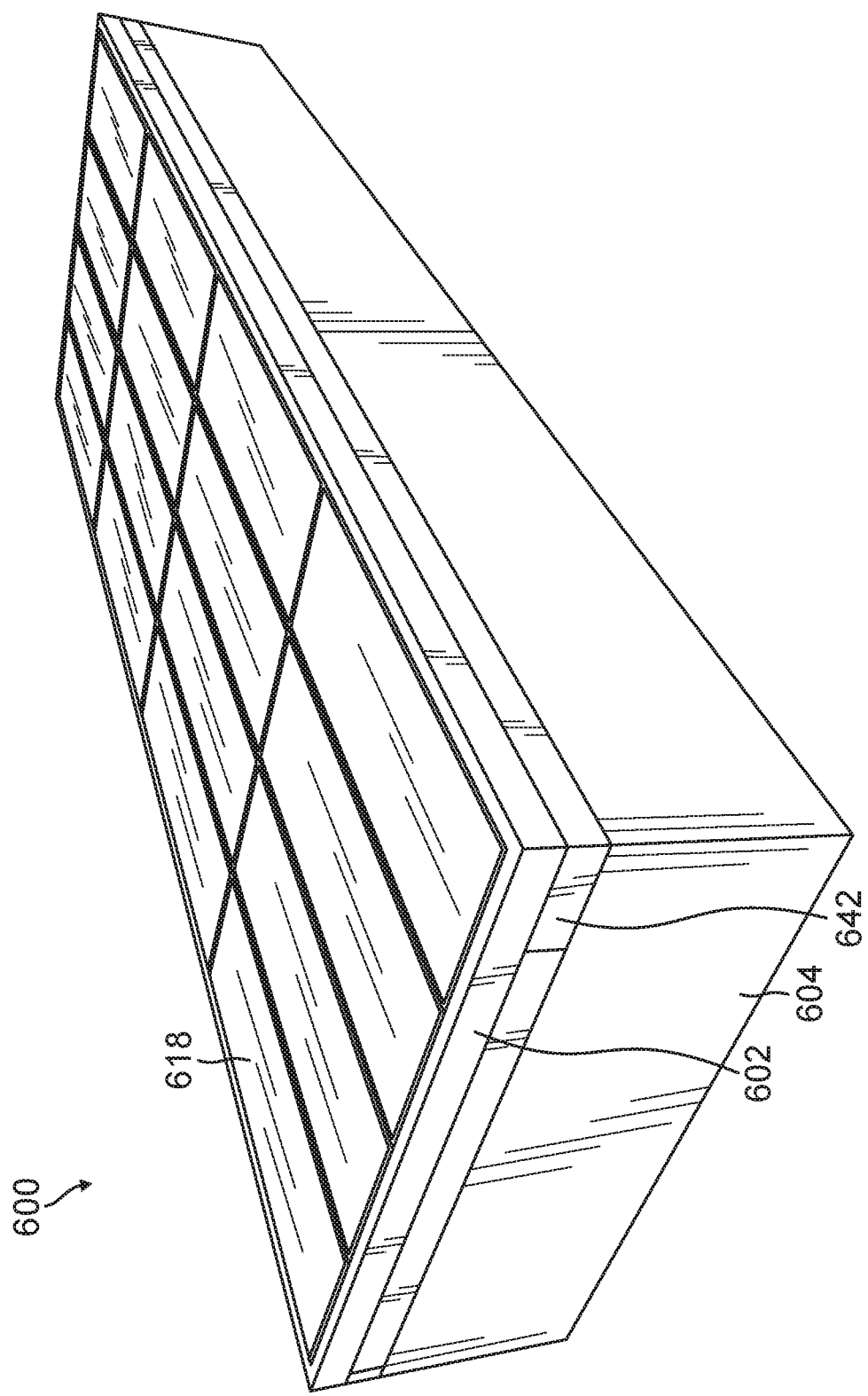
FIG. 27 shows a perspective view of the shelter of FIG. 20 in a closed or collapsed configuration.

Camper 600 may include wall panels 606, 608, 610, 612, 614 and 616, which may be rigid, folding, bi-folding, tri-folding, quadri-folding, multi-folding, or may be similar to other panels described herein. In one embodiment, camper 600 may maintain a rigid structure in both opened/expanded (FIGS. 20-23) and closed/collapsed (FIG. 27) configurations by use of rigid wall panels 606, 608, 610, 612, 614 and 616 (e.g., folding and bi-folding wall panels, or panels similar to those described with respect to camper 1, camper 100 and camper 400). The wall panels 606, 608, 610, 612, 614 and 616 may be hinged and/or latched to a rigid roof section 602, a mid-section connector 642, and/or a rigid floor section 604. When opening/expanding (e.g., as shown in transition in FIGS. 24-26), the wall panels 606, 608, 610, 612, 614 and 616 may be extended vertically until they are perpendicular to the roof section 602 and floor section 604. When closing/collapsing the camper 600 (e.g., as shown in transition in FIGS. 24-26), the wall panels 606, 608, 610, 612, 614 and 616 may be folded flat or until they are parallel to the roof section 602 and floor section 604. When fully opened/expanded (e.g., as shown in FIGS. 20-23), the shelter/camper 600 may provide comfortable living quarters for occupants. When closed/collapsed (e.g., as shown in FIG. 27), the roof section 602, floor section 604, and mid-section connector 642 (if used), may come together to form a weather tight and portable case, fully enclosing all interior fixtures that may remain in the shelter/camper and front, rear and side wall panels. Components of the shelter/camper 600 may be the same as or similar to components of shelter/camper 1, shelter/camper 100 or shelter/camper 400 described above; additional components/features are also described in detail below.

Figure 21:
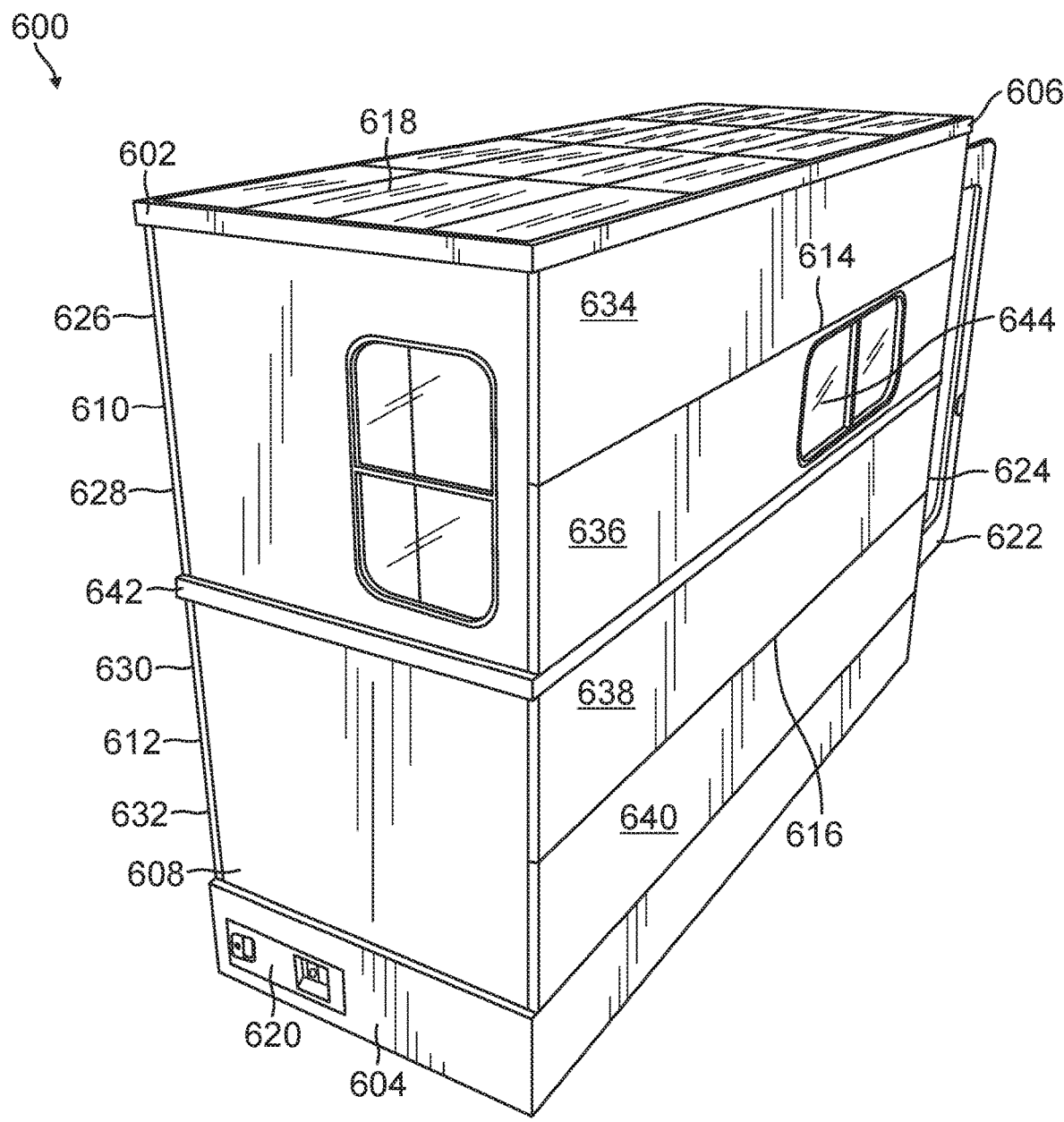
FIG. 21 shows a rear perspective view of the shelter of FIG. 20 in an open or expanded configuration.
Figure 25:
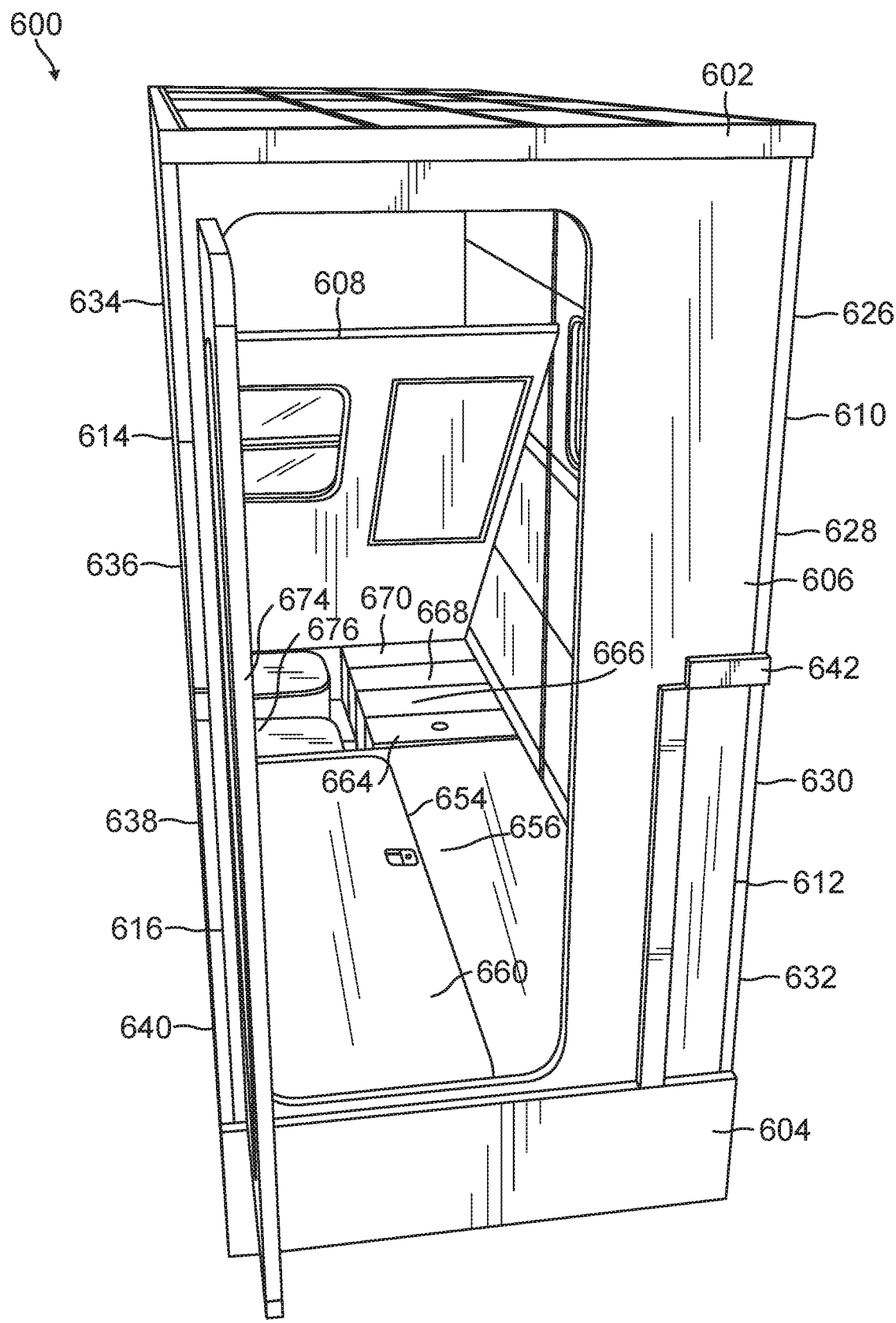
FIG. 25 shows a front perspective view of the shelter of FIG. 20 in a first transition position between an open or expanded configuration and a closed or collapsed configuration.

Shelter/camper 600 may have one or more wall panels the same as or similar to the wall panels of camper 1, camper 100 or camper 400 described above. The wall panels may be rigid, folding, bi-folding, tri-folding, quadri-folding, multi-folding, etc. Optionally, the side wall panels may be a combination of two or more bi-fold panels, may be a quadri-fold panel, or may be another type of panel or combination of panels. In one embodiment, as shown in FIGS. 20-23 and 25-26, the shelter/camper 600 may have two pairs of right side bi-fold wall panels 610 and 612 and two pairs of left side bi-fold wall panels 614 and 616. Each wall panel and/or section of the wall panels may be of similar size/dimensions as the wall panels and sections of wall panels described above with respect to camper 1, camper 100 or camper 400. In one embodiment, the height of the sections of the wall panels may be between 17" to ½ of the interior width of the shelter/camper. Combined with space provided by the roof section 602, a mid-section connector 642, and the floor section 604, this may allow for well over 6' of interior height (e.g., as shown in FIG. 22) with about 6½ ft between the floor and bed system (including mattress 678 and platform 680) in the living section (e.g., the section/room between the front wall 606 and the interior wall 654) and with almost 7' between the floor and ceiling in the bathroom section (e.g., the section/room between the interior wall 654 and the rear wall 608) when the shelter/camper is in the open/expanded configuration (e.g., as shown in FIGS. 20-22), and when the bed system is fully raised and stored (e.g., as shown in FIG. 22). The right side wall panels may sit side by side with the left side wall panels, without overlapping, when folded for closing/collapsing of the shelter/camper or in the closed/collapsed configuration (e.g., as shown in FIGS. 26-27).

In an embodiment with four pairs of bi-fold wall panels, all four pairs of bi-fold wall panels may be long enough to contain a mattress 678, an interior wall 654, space for a bathroom and the front and rear wall panels 606 and 608 within the shelter/camper or longer. For example, a shelter/camper with an adult mattress about 75" long may have bi-fold wall panel sections that are roughly 17"×114" (e.g., as shown in FIG. 21) or longer, extending roughly 1" (or the equivalent thickness of the front wall panel) or more beyond one end of the mattress and 38" or more beyond the other end of the mattress. This configuration may allow the front wall panel 606 and rear wall panel 608 edges to sit flush with the side wall panel edges when the shelter/camper is in an open/expanded configuration; with weather stripping or gaskets, this can create a weather tight corner joint between side walls and front and rear walls. Arranging/positioning the front wall panel 606 and rear wall panel 608 between the side wall panels may also allow the front and rear wall panels to prevent the side wall panels from folding inward when the shelter/camper is in the open/expanded configuration. This configuration may also allow enough space for an interior wall 654 and about 36" for bathroom fixtures 664-676 (e.g. as shown in FIG. 22). In one embodiment, the right and left side walls may each have a set of upper bi-fold wall panels 610 and 614 and a set of lower bi-fold wall panels 612 and 616. The upper panel sections 626 and 634 of the upper wall panels 610 and 614 may be hinged on the top to an edge (e.g., a dropped edge) of the roof section 602, and the lower panel sections 628 and 636 of the same set of upper wall panels may be hinged on the bottom to the top of an optional mid-section connector 642 or other panel. The bottom of the mid-section connector 642 may be hinged to the tops of upper panel sections 630 and 638 of the lower set of wall panels 612 and 616, and the lower panel sections 632 and 640 of the same set of lower wall panels 612 and 616 may be hinged on the bottom to the raised edge of the floor section 604. Weather stripping or gaskets along some or all of the edges of each section of the wall panels may form weather tight joints between the side walls and the roof, mid-section connector and floor and in between the upper and lower wall sections of the wall panels. Latches, hooks, locks, or other connectors/attachments may also be used at the corners or joints between the walls, panels, connector(s), sections, etc. (e.g., between side walls and front and rear walls) to help securely hold the walls, panels, connector(s), sections, etc. together and in position when in the open/expanded configuration.

Shelter/camper 600 may also include slide latches (or other latches or locks) that can slide or be positioned between the walls, wall panels, or sections of the wall panels (e.g. to prevent folding or other undesired movement). For example, wall panel slide latches may be included that can slide or be positioned between the upper sections 626, 630, 634, and 638 and the lower sections 628, 632, 636 and 640 to further prevent the wall panels from folding inward and to help maintain the open/expanded configuration. When in a closed/collapsed configuration, all wall panels may sit entirely inside the closed case formed by the roof section, mid-section connector, floor section, and/or any combination of these. Each section of the wall panels 610, 612, 614 and 616 may also contain a window or multiple windows 644. The windows may be fixed or capable of being opened. The windows may also include or be fitted with screens and blinds. Any or all wall panels may also include fixtures such as light switches, electrical outlets, wall-mounted televisions, storage pockets, storage hooks, venting fans, electrical connections, plumbing connections and attachments for mounting heating/cooling equipment. The wall panels may include a mechanical system or components of a mechanical system for opening/expanding and closing/collapsing of the shelter/camper. The mechanical system may include a crank, pump, lever, pulley, spring(s), piston(s), hinges, spring-loaded hinges, motorized hinges, motor, other opening/closing mechanisms or components, and/or any combination of one or more of the foregoing as appropriate for the size and weight of the shelter/camper. The wall panels may also include fixtures such as mirrors, tables, or seat back rests embedded in their interior surfaces. The wall panels may also include components of a track or pulley system for raising and lowering of the bed system (e.g., including a mattress 678 and a platform 680).

In one embodiment, shelters/campers may have a width greater than or equal to 72", e.g., to contain a King (e.g., 76"×80" give or take a couple of inches) or California King (e.g., 72"×84" give or take a couple of inches) mattresses, which may achieve an interior height sufficient for standing with only one set of wall panels per side, e.g., similar to the side wall design of camper 1 above. For example, use of one pair of bi-fold wall panels with panel sections that are 36" tall (rather than 17" tall) per side may result in a standing interior height of over 6', combined with the heights of the floor and roof sections, when the shelter/camper is in an open/expanded configuration. In this case, no mid-section connector may be necessary and the bi-fold wall panels may be hinged in a similar manner as with camper 1.

The front wall panel 606 and rear wall panel 608 may be the same as or similar to the front wall panel 6 and the rear wall panel 8 of camper 1, the front wall panel 106 and rear wall panel 108 of camper 100, or the front wall panel 406 and rear wall panel 408 of camper 400. The front wall panel 606 and rear wall panel 608 may have a fixed length, or may be bi-fold or multi-fold panels hinged to edges (e.g., raised, interior edges 682 and 684 as shown in FIG. 22) of the floor section 604 in the front and rear of the shelter/camper. The front and rear wall panels may be at least the same width as, slightly wider than, or wider than a mattress 678 contained within the shelter/camper. As can be seen in FIG. 22, the front and rear wall panels 606 and 608 may be long enough to extend between an edge (e.g., a raised interior edge 682 and 684) of the floor section and an edge (e.g., an interior surface of the dropped, interior edge) of the roof section in the front and rear of the shelter/camper, or directly to the bottom surface of the roof section (e.g., the ceiling of the shelter/camper). In one embodiment with fixed length front and rear panels, the panels have a length less than the interior length of the shelter/camper. The front wall panel 606 may be hinged at least 1" (or an equivalent thickness of the wall panels) higher than the rear wall panel 608. In other words, the hinge points on the edges (e.g., on interior raised edges 682 and 684) in the front and rear of the floor section 604 may be staggered for the front and rear wall panels. This may allow the front wall panel 606 to sit above the rear wall panel 608 when the walls are folded for closing/collapsing of the shelter/camper. The hinge points may be staggered to allow the rear wall panel to sit above the front wall panel when the shelter/camper is closed/collapsed.

When opening/expanding the shelter/camper (e.g., as shown in transition in FIG. 25), the unattached (free or unhinged) ends of these wall panels may be raised until they latch, connect, or otherwise attach to an edge (e.g., an interior surface of the dropped, interior edge) of the roof section 602 in the front and rear of the shelter/camper, or directly to the bottom surface of the roof section (e.g., the ceiling of shelter/camper), forming a continuous and weather tight front and rear wall connecting the roof and floor. Alternatively, the front and rear wall panels may be hinged to edges (e.g., dropped, interior edges) of the roof section 602 and lowered to latch, connect, or otherwise attach to edges (e.g., raised, interior edges 682 and 684) of the floor section 604. When the shelter/camper is in an open/expanded configuration as shown in FIGS. 20 and 21, the walls may be completely unfolded. The front and rear wall edges may sit flush with the side wall edges, forming a weather tight corner joint as described above. Latches, hooks, locks, weather stripping, or other connectors/attachments may optionally be used at the corners or joints between the walls, panels, connector(s), sections, etc. (e.g., between side walls and front and rear walls) to help securely hold the walls, panels, connector(s), sections, etc. together and in position when in the open/expanded configuration. The front and rear wall panels, if hinged to the floor section 604, may sit between the upper interior wall panel 656 as well as any fixtures or components included in the bathroom section (e.g., components 664-676) and the lower sections 632 and 640 of the lower pairs of wall panels 612 and 616 when closed/collapsed (e.g., as can be seen in FIG. 25). If the front and rear wall panels are hinged to the roof section 602, the front and rear wall panels may sit between the upper sections 626 and 634 of the upper pairs of wall panels 610 and 614 and the roof section, or the upper interior wall panel 656 if that panel is hinged to the roof section as well. When in closed/collapsed configuration, all wall panels may sit entirely inside the closed case formed by the roof section, mid-section connector, floor section, and/or a combination of these (e.g., as shown in FIG. 27). Optionally, the front and rear wall panels may also be bi-fold (e.g., folding in half) or multi-fold panels. The panels or sections of the panels may include a door or large window in one or more sections or halves of the front or rear wall panels.

The front wall panel 606 may include a door 622, and the door may contain a window 624 or multiple windows. The doors and/or windows may include locks, latches, etc. Any door 622 or window 624 may include weather stripping or gaskets, creating a weather tight seal between the door and the rest of the front or rear wall panel, when the door or window is closed.

The front wall panel may also latch to a portion of the mid-section connector in the front of the shelter/camper, allowing that portion of the mid-section connector to swing open and closed with the door, or alternatively that portion of the mid-section connecter can simply be left open and swung away to allow free operation of the door, when the shelter/camper is open/expanded. The front and rear wall panels may each contain a window 644 or multiple windows. The windows may be fixed or capable of being opened. The windows may also include or be fitted with screens and/or blinds. The front and rear wall panels may also include fixtures such as light switches, electrical outlets, wall-mounted televisions, venting fans, storage pockets, storage hooks, electrical connections, plumbing connections and attachments for mounting heating/cooling equipment. The front and rear wall panels may include a mechanical system or components of a mechanical system for opening/expanding and closing/collapsing of the camper. The mechanical system may include a crank, pump, lever, pulley, spring(s), piston(s), hinges, spring-loaded hinges, motorized hinges, motor, other opening/closing mechanisms or components, and/or any combination of one or more of the foregoing as appropriate for the size and weight of the shelter/camper. The front and rear wall panels may also include components of a track or pulley system for raising and lowering of the bed system (e.g., mattress 678 and platform 680) or the bed system may be removed and reinserted in a variety of slots at different heights (e.g., similar to adjustable levels in an oven).

The roof section 602 of camper 600 may be the same as or similar to roof section 2 of camper 1, roof section 102 of camper 100 or roof section 402 of camper 400. For example, the roof section 602, in one embodiment, may be flat across the entire length and width of the shelter/camper and may have a continuous dropped edge along the perimeter of the shelter/camper. Optionally, the roof section 602 may be curved, contoured, ridged, or include other aerodynamic features as discussed above with respect to camper 1, camper 100 and camper 400. The dropped edge may be tall enough to completely contain the side wall panels or sections of the side wall panels (e.g., upper sections 626 and 634 of the upper pairs of side wall panels 610 and 614) inside the roof section 602 when the shelter/camper is in the closed/collapsed configuration (e.g., as shown in FIG. 27). If the front, rear or interior wall panels are hinged to the roof section, then a dropped edge of the roof may be tall enough to accommodate those panels as well, when in the closed/collapsed configuration.

In one embodiment, the front and rear wall panels may each be long enough to extend between the interior edges or bottom surface of the roof and the interior edges of the floor. If the front and rear wall panels are hinged to the roof section, then the dropped edge of the roof may be tall enough to contain the front and rear wall panels, and/or upper sections of the upper wall panels, when in a closed/collapsed configuration. The roof section 602 may have a length and width equivalent to the floor. The width may be about the same as, slightly greater than, or greater than that of a mattress 686 contained within the shelter/camper, and the length may be about the same as, slightly greater than, or greater than the length of the side wall panels. Having the width at least slightly greater than the mattress and the length slightly more than enough to contain the mattress, interior wall and a bathroom may ensure that the mattress, interior wall and bathroom sit completely within the 4 exterior walls that are attached to the roof section and the mattress, bathroom fixtures and walls sit entirely inside the shelter/camper when closed/collapsed. For example, a shelter/camper containing a Twin mattress (e.g., 39"×75" give or take a couple of inches), a bathroom that is about 39" W×36" L and having 1" thick panels, may have a roof section that is about 41" wide×116" long (or slightly longer than the side walls, which may be 114" long in this case) (e.g., as shown in FIGS. 21 and 27). The edge(s) (e.g., a continuous dropped edge) of the roof section 602 may include weather stripping or gaskets that may form a weather tight seal between it and the walls or wall panels connected to it. The weather stripping or gasket may also form a weather tight seal with the mid-section connector 642 when the shelter/camper is in a closed/collapsed configuration (e.g., as shown in FIG. 27).

The top of the roof section 602 may include solar panels 618, roof rack attachments and/or antennae for radio, television and/or internet transmissions. The interior of the roof section 602 (i.e., the ceiling of the shelter/camper) may include light fixtures and/or other fixtures such as light switches, electrical outlets, ceiling-mounted televisions, venting fans, storage pockets, storage hooks, electrical connections, plumbing connections and attachments for mounting heating/cooling equipment. The roof section 602 may include a mechanical system or components of a mechanical system for opening/expanding and closing/collapsing of the camper. The mechanical system may include a crank, pump, lever, pulley, spring(s), piston(s), hinges, spring-loaded hinges, motorized hinges, motor, other opening/closing mechanisms or components, and/or any combination of one or more of the foregoing as appropriate for the size and weight of the shelter/camper. The roof may also include components of a track or pulley system for raising or lowering of the bed system (e.g., mattress 678 and platform 680). The roof section 602 may also include lock and latch components or other connection components to latch it to the mid-section connector and/or floor section to keep the shelter/camper closed tightly. The roof section 602 may also include handles (e.g., in the front and rear and/or on the sides of the shelter/camper) for manual lifting or lowering of the roof section 602 for opening/expanding or closing/collapsing of the shelter/camper, respectively, or for carrying the shelter/camper when closed/collapsed. The roof section 602 may include lights or light fixtures internally and/or externally. Internally, lights or light fixtures may provide light for the occupant. Externally, the lights may act as car lights (e.g., tail lights, break lights, head lights, etc.) and may connect with the lights or other electronics of the vehicle towing the shelter/camper such that the lights of each are similarly controlled (e.g., brake lights on each are coordinated).

The shelter/camper 600 may include one or more connectors or connector components/sections (e.g., the same as or similar to connector 642). In one embodiment, connector 642 may be a mid-section connector. Connector 642 may be a continuous, structural ring around the perimeter of the shelter/camper (e.g., for shelters/campers that have two or more pairs of wall panels per side). The connector 642 may connect the upper pairs of wall panels (e.g., wall panels 610 and 614) to the lower pairs of wall panels (e.g., wall panels 612 and 616). The connector 642 may be tall enough to allow the lower sections 628 and 636 of the upper pairs of wall panels and the upper sections 630 and 638 of the lower pairs of wall panels to sit completely or partially within the connector 642 when the shelter/camper is in a closed/collapsed configuration, and all wall panels are folded flat. Assuming 1" thick panels, this may result in at least a 2" tall mid-section connector, but the connector 642 may be a variety of sizes, including 1" to 24" tall, 2" to 12" tall, or 2" to 6" tall. The connector 642 may give structural rigidity to the shelter/camper during the opening/expanding and closing/collapsing processes or transitions (e.g., as may be seen in FIGS. 25 and 26). The connector 642 may include weather stripping or gaskets that may form a weather tight seal between it and the walls or wall panels connected to it. The weather stripping or gasket may also form a weather tight seal with the roof section 602 and/or the floor section 604 when the shelter/camper is in a closed/collapsed configuration (e.g., as shown in FIG. 27).

The connector 642 may include a portion/segment (e.g., a front end portion/segment) that may be hinged and/or latched on one or both sides of an end or portion of the shelter/camper (e.g., at a portion of a mid-section connector across the front door 622) allowing the door 622 to open and close freely when the shelter/camper is in an open/expanded configuration. This hinged/latched portion may be unlatched from the rest of the connector 642 allowing the hinged/latched portion to swing open and closed with the door 622, if attached to the door. Optionally, the hinged/latched portion may be unlatched and swung away to the side or completely removed to allow free movement of the door 622. During opening/expanding, closing/collapsing, and in closed/collapsed configuration, this hinged/latched portion of the connector 642 may be latched to the rest of the connector 642, forming a continuous structural ring around the perimeter of the shelter/camper. The connector 642 may include components of a lock, latch and/or hinge system. The connector 642 may also include handles (e.g., in the front and rear and/or on the sides of the shelter/camper) for manual lifting or lowering of a portion/section (e.g., the mid-section) of the shelter/camper during opening/expanding or closing/collapsing of the shelter/camper, respectively, or for carrying the shelter/camper when closed/collapsed. The connector 642 may include a mechanical system or components of a mechanical system for opening/expanding and closing/collapsing of the shelter/camper. The mechanical system may include a crank, pump, lever, pulley, spring(s), piston(s), hinges, spring-loaded hinges, motorized hinges, motor, other opening/closing mechanisms or components, and/or any combination of one or more of the foregoing as appropriate for the size and weight of the shelter/camper. The connector 642 may also include components of a track or pulley system for raising and lowering of the bed system (e.g., including a mattress 678 and a platform 680).

The floor section 604 may be the same as or similar to the floor section 4 of camper 1, the floor section 104 of camper 100 or the floor section 404 of camper 400 above. In one embodiment, the floor section 604 may be flat across the entire length and width of the shelter/camper and may have an edge (e.g., a continuous raised edge) along all or a portion of the perimeter of the shelter/camper. Optionally, the floor section 604 may be curved, contoured, ridged, and/or include other aerodynamic features as discussed previously. A raised edge may be tall enough to completely contain various fixtures or components (e.g., optional seating, bath fixtures, interior wall components and a bed system) (see e.g., components 646-660 and 664-680 in FIG. 22). The raised edge may be tall enough also to contain wall panels or sections of wall panels (e.g., front and rear wall panels 606 and 608 and the lower sections 632 and 640 of the lower pairs of wall panels 612 and 616 inside the floor when the shelter/camper is closed/collapsed) (e.g., as shown in FIG. 27). In one embodiment, the interior fixtures may be folded, minimized, or rearranged to reduce size in the closed/collapsed configuration. The floor section 604 may include an interior edge 682 in the front and an interior edge 684 in the rear of the shelter/camper that are slightly shorter than adjacent exterior edges so that the joint between it and the front and rear wall panels hinged to it can remain inside the floor section 604, which may also provide a better hinge point and water tightness when the shelter/camper is open/expanded.

The floor section 604 may have a length and width that matches or is equivalent to the roof section 602, floor section 4 of camper 1, floor section 104 of camper 100 or floor section 404 of camper 400. The width may be about the same as, slightly greater than, or greater than that of a mattress 678 contained within the shelter/camper or wider, and the length may be about the same as, slightly greater than, or greater than the length of the side wall panels or longer. Having the width at least slightly greater than the mattress and the length slightly more than enough to contain the mattress, interior wall and a bathroom may ensure that the mattress, interior wall and bathroom sit completely within the exterior walls or wall panels that are attached to the floor section 604. The dimensions may be such that the mattress 678, walls/wall panels, interior fixtures, etc. sit entirely inside the shelter/camper when closed/collapsed. For example, a shelter/camper containing a Twin mattress (e.g., 39"×75" give or take a couple of inches), a bathroom that is about 39" W×36" L and having 1" thick panels, may have a floor section that is 41" wide×116" long (slightly longer than the bi-fold side walls, which may be 114" long in this case). The edge(s) (e.g., a continuous raised edge) of the floor section 604 may include weather stripping or gaskets that may form a weather tight seal between it and the walls/wall panels connected to it. The weather stripping or gasket may also form a weather tight seal with the connector 642 when the shelter/camper is in the closed/collapsed configuration.

The floor section 604 may include an access panel 620, allowing access to batteries and/or other system components (e.g., any components or features discussed with respect to floor section 4 of camper 1, floor section 104 of camper 100 or floor section 404 of camper 400). The bottom or sides of the floor section (internally or externally) may also include access panels or ports, allowing access to plumbing or electrical connections for fresh water supply, waste and waste water drainage, fuel supply (e.g., propane) or electrical supply (e.g., external generator).

The floor section 604 may include fixtures such as lighting, light switches, electrical outlets, venting fans, storage pockets, electrical connections, plumbing connections and attachments for mounting heating/cooling equipment.

The floor section 604 may include seating (e.g., backrest 646, seat 648, backrest frame 650, seat frame 652); a bathroom (e.g., a vanity section 664 with a sink and faucet, vanity sections 666-670 with storage and/or plumbing components, a shower 672 with a shower basin integrated with the floor (e.g., the floor of the bathroom is also the shower pan, similar to a wet bath in an RV), and/or a sectional, portable toilet 674 and tank 676); an interior wall 654 (e.g., an upper interior wall panel 656 with door 660, and a section 658 (e.g., a raised interior section of the floor section)); a bed system (e.g., mattress 678 and platform 680); and other associated components.

The floor section 604 may also include attachments to allow mounting to vehicle roof racks, utility trailers or pick-up truck beds or secure attachment to any surface below it. The floor section 604 may include a mechanical system or components of a mechanical system for opening/expanding and closing/collapsing of the camper. The mechanical system may include a crank, pump, lever, pulley, spring(s), piston(s), hinges, spring-loaded hinges, motorized hinges, motor, other opening/closing mechanisms or components, and/or any combination of one or more of the foregoing as appropriate for the size and weight of the shelter/camper.

The floor may also include components of a track or pulley system for raising or lowering of the bed system (e.g., mattress 678 and platform 680). The floor section may also include connection, lock, and/or latch components to latch it to a connector 642 and/or the roof section 602 to keep the shelter/camper closed tightly. The exterior of the floor section 604 may also include small wheels for transportation or direct towing/pulling (e.g., transportation over short distances like that to and from a vehicle). The floor section may also include fixed height or adjustable feet removably or permanently attached thereto (e.g., to one or more exterior portions of the floor section). The Floor section 604 may include lights or light fixtures internally and/or externally. Internally, lights or light fixtures may provide light for the occupant. Externally, the lights may act as car lights (e.g., tail lights, break lights, head lights, etc.) and may connect with the lights or other electronics of the vehicle towing the shelter/camper such that the lights of each are similarly controlled (e.g., break lights on each are coordinated).

Figure 24:
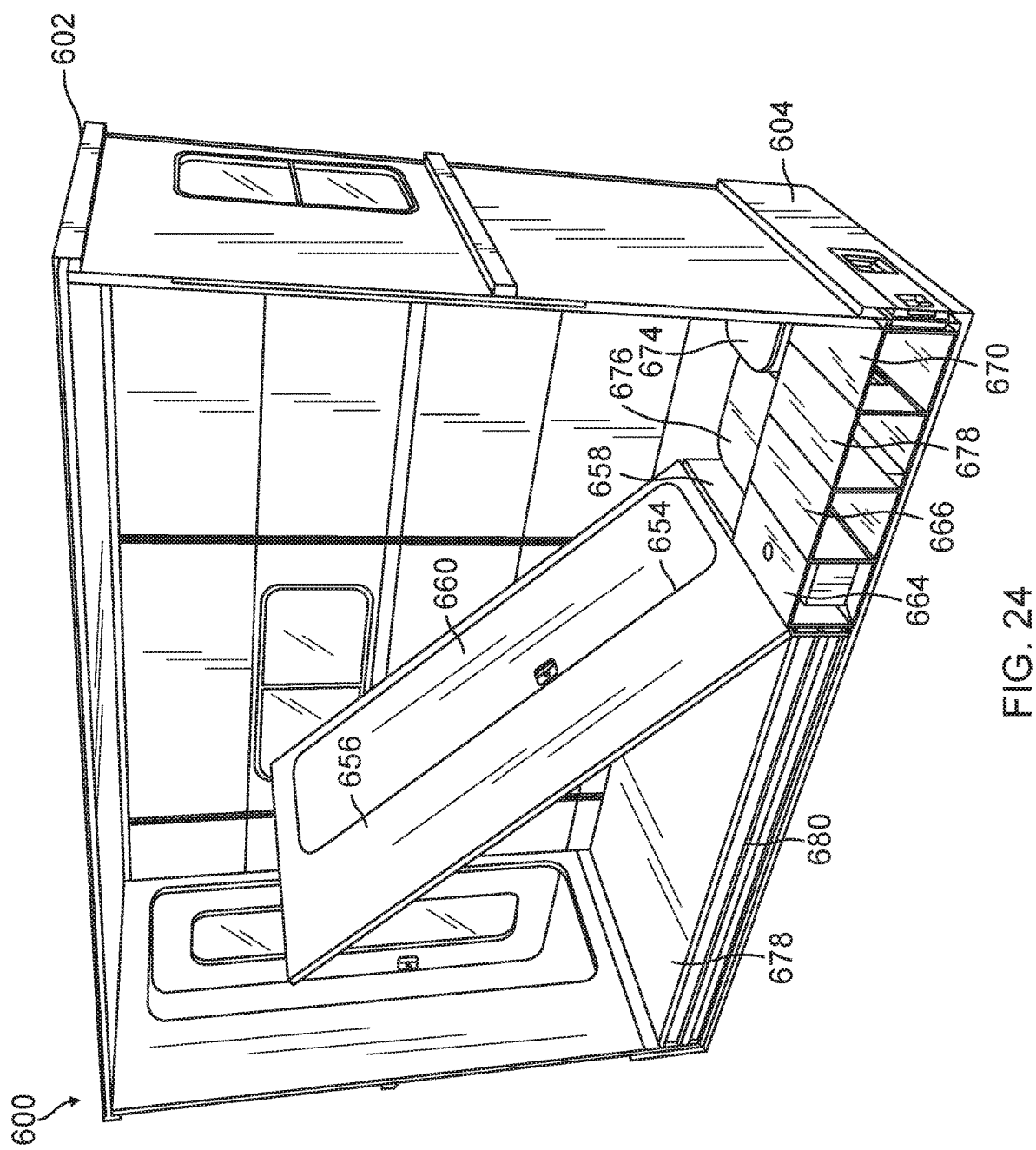
FIG. 24 shows a right side cross-sectional view of the shelter of FIG. 20 in which the interior components are transitioning to a closed or collapsed configuration.

The bed system may comprise or consist of a mattress 678, a mattress platform 680, components of a system for raising and lowering of the bed, and/or other components. The bed system may be stored in or near the roof section 602 (e.g., as shown in FIG. 22) when the shelter/camper is in an open/expanded configuration, and when maximum standing height below the bed is preferred. As shown in FIG. 23, the bed system may be lowered or positioned at a variety of heights, including to a position about half of the interior height of the shelter/camper (or any comfortable height between the ceiling of the shelter/camper and any fixtures below the bed platform) to allow entry to the sleeping area while still allowing any fixtures below it to remain in either collapsed or stacked/extended configurations. The bed system may be positioned at any height between the ceiling of the shelter/camper and any fixtures below the bed platform to allow comfortable access to either the sleeping area, the area below the bed or both areas simultaneously. The bed system may be moved to a position in or near the floor section 604 to rest on any interior components below (e.g., bench components 646-652), when the shelter/camper is closed (e.g., as can be seen in FIG. 24). The bed system may be raised or lowered manually or mechanically using a track system; slots, ledges, a cable system, a pulley system, a hook system; and/or using a combination of components (e.g., a combination of track and pulley systems); or using some other system capable of easily and quickly raising and lowering the bed system. A mechanical system for raising or lowering the bed system may be powered or operated manually.

The bottom surface of the bed platform may serve as a ceiling for the areas below the bed, when the shelter/camper is in the open/expanded configuration and the bed system is raised or located in or near the top of the shelter/camper; therefore the bed system or bed platform 680 may include light fixtures or other components. Movement from the sleeping area to the area below the bed, with the bed in sleep position (FIG. 23), may be accomplished by exit and reentry through the door 622 in the front wall panel 606 or exit and reentry through door 660 in the interior wall panel 656 of interior wall 654. Movement from the sleeping area to the bathroom (e.g., to use the bathroom or the section of the shelter/camper between the interior wall 654 and the rear wall 608, which is not under the bed system) may be accomplished through door 660. In a shelter/camper that is sufficiently longer than the mattress it contains to have components/fixtures (e.g., all bathroom components 664-676) that may sit in a separate section of the shelter/camper, not under the bed system, those components/fixtures may be used without the need to raise the bed system (e.g., an occupant may exit the sleeping area through the door in the interior wall, as described above, and use the bathroom without adjusting the height of the bed system as shown in FIG. 23). If the section of the shelter/camper that contains the bed system (e.g., the area between the front wall 606 and interior wall 654) is sufficiently wider or longer than the mattress contained in that section of the shelter/camper, then movement between the sleep area and the other areas may be possible without exiting and reentering the shelter/camper or moving through the interior door (e.g., an occupant may simply get down from the bed if the that section of the camper is sufficiently wider or longer than the bed, without the need to move through an interior or exterior door). Movement between the sleep area and other areas may also be possible via a hatch in the bed platform, and a movable or removable section of the mattress. The bed platform 488 may also include other fixtures such as light switches, electrical outlets, ceiling-mounted televisions, storage pockets, storage hooks, removable tables, electrical connections and plumbing connections. The mattress 678 contained within the shelter/camper may be any standard size mattress (Twin, Twin XL, Full, Full XL, Queen, King, California King) or any custom size mattress. The mattress 678 may be foam, inner-spring, or any type of mattress commonly available.

Shelter/camper 600 may have one or more interior wall panels or dividers, as described above. The wall panels may be the same as or similar to the front and rear panels described above. The interior wall panels may be rigid, folding, bi-folding, tri-folding, quadri-folding, multi-folding or sectional; or the interior wall may be flexible (e.g., similar to accordion walls and door 166-170 of camper 100). Optionally, the interior walls may be a combination of sectional components or maybe another type of panel or may be a combination of panels or components. In one embodiment, as shown in FIG. 22, interior wall 654 may consist of upper interior wall panel 656 hinged to a section (e.g., a raised interior section 658) of the floor section. The interior wall panel may be the same width as the front and rear wall panels, extending from the right side wall panels 610 and 612 to the left side wall panels 614 and 616, and sitting flush against the side panels and mid-section connector 642. The interior wall 654 may also have the same height as the total height of the front and rear walls (e.g., the total, combined height of the interior wall panel 656 and raised section 658 may be equivalent to the total, combined height of the front wall 606 and the raised interior front edge 682 and the total, combined height of the rear wall 608 and the raised interior rear edge 684). As can be seen in FIG. 22, the interior wall panel 656 may be long enough to extend between a section (e.g., a raised interior section 658) of the floor section. In one embodiment the upper interior wall panel section may be 75" L. When connected to section 658, which may be 7" L in this case, the interior wall may be almost 7' tall. The interior wall panel 656 may be hinged at least 1" (of the equivalent thickness of the wall panels) lower than the either the front wall panel or the rear wall panel, whichever is hinged lower. In other words, the hinge points for the front, rear and interior wall panels may be staggered. If the front wall panel is hinged higher than the rear wall panel, this may allow the interior wall panel to sit below the rear wall panel and the rear wall panel, in turn, to sit below the front wall panel for closing/collapsing of the shelter or camper (e.g., as shown in transition in FIGS. 24-26 and in a closed/collapsed configuration in FIG. 27). Movement from one section to another section of the shelter/camper (e.g., from the living area to the bathroom) through the interior wall may be accomplished through door 660, as described above.

When opening/expanding the shelter/camper (e.g., as shown in transition in FIG. 24), the unattached (free or unhinged) end of interior wall panel 656 may be raised until it latches, connects or otherwise attaches to a bottom surface (e.g., the ceiling) of the roof section 602 of the shelter/camper, forming a continuous internal wall connecting the roof and floor. Alternatively, the interior wall panel may be hinged to a bottom surface (e.g., the ceiling) of the roof section 602 and may be lowered until it latches, connects or otherwise attaches to a section (e.g., a raised interior section 658) of the floor section 604. When the shelter/camper is in an open/expanded configuration as shown in FIGS. 22-23, the interior wall may be completely unfolded. The interior wall edges may sit flush with the side wall edges. Latches, hooks, locks or other connectors/attachments may optionally be used at the corners or joints between the walls, panels, connector(s), sections, etc. (e.g., between the side walls and the interior wall) to help securely hold the walls, panels, connector(s), sections, etc. together and in position when in the open/expanded configuration. The interior wall panel may sit between the mattress 678 and rear wall 608 when closed/collapsed. If the rear wall panel is hinged higher than the front wall panel, then the interior wall panel may sit between the mattress 678 and the front wall panel 606.

Shelter/camper 600 may have seating (e.g., components 646-652) that may be convertible into extra sleeping surfaces. The seating may be the same as or similar to the seating (e.g., components 446-452 and 456-462) of camper 400. In one embodiment, the seating may be converted into an extra bed by repositioning the backrest 446 from a vertical position, or almost vertical position, for sitting to a horizontal position, next to seat bottom 648 (e.g., as seen in FIG. 23). The backrest frame 650 and seat frame 652 may each contain adjustable legs that may be used to: (1) adjust the height of the seat if the legs of the seat are extended only and the back rest is positioned for sitting; (2) or may be used to adjust the height of the bed, if both the back rest and seat are positioned for sleeping and legs attached to both frames are extended. The backrest frame and seat frame may optionally be attached or otherwise connected to each other using hinges, latches, hooks or other types of connectors. The backrest and/or seat may also be attached to and positioned using a track system or any other components that may exist for raising and lowering the bed system above (e.g., mattress 678 and platform 680) (e.g., the seat and backrest frames may also be attached, below the bed platform, to the same track system or other components for raising and lowering the bed system). Alternatively, the backrest may be just a cushion without a frame, in which case the bench may be positioned for sleep by laying both the seat and backrest flat on the floor (e.g., as in a closed/collapsed camper).

If the bed system above (e.g., mattress 678 and platform 680) is lowered for sleeping (e.g., to a position roughly halfway down the shelter/camper or to any comfortable height between the ceiling and the fixtures below for simultaneous use of the bed system and the bench below), then the bench may be positioned for either sitting below the bed or for sleeping below the bed (e.g., as an additional sleep surface as shown in FIG. 23). The bench may also be lowered completely to the floor for sleeping, as mentioned above.

If the bench is configured for either sitting or sleeping and the bed system above is either raised toward the roof section for storage or lowered to a roughly middle position for use, then movement from the bench to other areas may be accomplished by exiting and reentering through door 622 in front wall 606 or through door 660 in interior wall 654. An occupant may move from the bench, to use the bathroom or exit the shelter/camper, for example, without the need to reposition the bed system above, if the bed system is positioned at a height sufficient for the occupant to move, sit, sleep or crawl on the bench. In one embodiment, shelter/camper 600 may contain a seat bottom 448 that is 19½" W×75" L and backrest 446 that is 19½" W×75"L.

When configured for sleep position, components 446-452 may combine to form a bed that is similar in size to a Twin mattress (e.g., 39"×75" give or take a couple of inches). The seating may be configured to be any size however, and may be equivalent in size to the mattress above or smaller or larger. For example, shelters containing a Full, Queen or King mattress, may contain one or more benches below the bed system and may be converted to beds equivalent in size to the mattress above, or smaller or larger. Optionally, a shelter/camper may also be configured to use the seating as the only sleeping surface (e.g., shelters/campers with no bed system, as described above).

The shelters/campers (e.g., camper 1, camper 100, camper 400 and camper 600) described herein may include a variety of interior fixtures or components for convenience (see e.g., fixtures/components 646-676) and related system components. Depending on the size of the shelter/camper, several combinations of seating, cooking and bathroom fixtures may be possible. The fixtures or other components described herein may be designed to remain in the shelter/camper when in the closed/collapsed configuration or may be designed to be removed when closing/collapsing the shelter/camper and reinstalled when opening/expanding the shelter/camper. If the interior fixtures are to remain inside the shelter/camper when it is closed/collapsed, the fixture dimensions, especially the heights, may be limited by the available space in the shelter/camper when it is in the closed/collapsed configuration. For example, the dimensions may be limited by the size or depth of the floor section 604 under the wall panels or by the space between wall panels, when all panels are folded flat for closing, or by any space available in the roof section. The floor section 604 may be any depth necessary to accommodate interior fixtures. If desired to reduce the overall height of the shelter/camper when closed/collapsed to allow for easier transportation (e.g., on a roof rack), the height of the floor section may need be kept to a minimum, and interior components may need to be collapsible or removable for closing/collapsing of the shelter/camper.

In one embodiment, as shown in FIGS. 21, 22 and 27, only 8" H×39" W×75" L in the floor section between raised interior front edge 682 and raised section 658, plus 8" H×39" W×36" L in the floor section between raised section 658 and raised interior rear edge 684, plus 4" H×5 in W×114" L in the center, between the folded side wall panels may be available for interior components that may remain in the shelter/camper when closed/collapsed. Accordingly, in this and similar situations of other dimensions, interior seat, storage, kitchenette and bathroom components may have to be collapsible into a small area (e.g., no more than 8" or 4" tall sections in the example above), depending on where they will rest in the closed/collapsed shelter/camper. This can be accomplished by use of sectional components that are either connected (e.g., by hinges or some other connectors) or completely detached, which may enable the sections to lay flat for closing/collapsing of the shelter/camper (see FIGS. 24-27) or stacked for use while the shelter/camper is open/expanded (see FIGS. 22-23).

For example, seat benches (see e.g., components 646-652) or a bath vanity (see e.g., components 664-670) may be laid flat for closing/collapsing of the shelter/camper or stacked for opening/expanding of the shelter/camper, and possibly even raised to a more comfortable user height by use of adjustable legs, lifts, piston lifts, or other lifting mechanism appropriate for the size and weight of the component. Some components such as the shower basin 672 may be integrated into the bathroom portion of the floor section 604 (e.g., similar to an RV wet bath floor) or may be short enough to fit in the space of the floor section without the need to be collapsed or removed, and associated shower components such as a flexible shower head, shower curtain and/or other shower components may fit inside the shower basin, in any available floor space, or in the vanity cabinets. If a shower curtain is attached directly to the roof section (e.g., to hooks or other connectors in the ceiling), then the shower curtain may be raised or compressed and stored in the 4"×5" gap between the side wall panels. Some components such as a sink faucet and/or drain may either be folded into the sink without detachment, or detached and stored in the available space in the sink or vanity cabinets. The toilet may be a fixed height component that can be removed for closing, may be sectional (e.g., components 674 and 676), or may be a collapsible camp style toilet.

A wall divider the same as or different from interior wall 654 may be used between various areas within the shelter/camper (e.g., between the seating/cooking areas and the bathroom area). For example, use of one or more collapsible, accordion-type walls with an accordion door (e.g., similar to walls 166-168 with door 170 in camper 100), or other type of flexible or collapsible wall (e.g., a rigid wall panel 656 or flexible/fabric wall that may be foldable and/or collapsible) may be attachable to the bottom of the bed platform 680 or the bottom of the roof section or ceiling, while the shelter/camper is in an open/expanded configuration. The wall and door may be detachable and compressible into the floor area below the folded wall panels while the shelter/camper is in a closed/collapsed configuration. Alternatively, all or part of the collapsible/flexible wall may remain fixed to the bed platform 680 or ceiling of the shelter/camper and may be detachable from the floor or a raised section in the floor (e.g., section 658). The wall may be stored under the bed platform or ceiling and parallel relative to the bed platform or ceiling in a closed/collapsed configuration, as described previously. Similarly, a shower curtain can be attached to the ceiling of the shelter/camper, as described above, while the shelter/camper is open/expanded and detached while the shelter/camper is closed/collapsed. A shower curtain may also remain attached to the ceiling and stored flat between the roof section and the upper panel sections 626 and 634 of the folded side wall panels 610 and 614, and/or occupy the gap in the center, between the left and right side wall panels, while the shelter/camper is closed/collapsed. In one embodiment, plumbing lines can be tubes, pipes, flexible tubing, etc. attached to the sectional components themselves, embedded in the panels of the roof, floor, walls or bed platform, or detached and stored when the shelter/camper is closed/collapsed and reattached when the shelter/camper is open/expanded. Fresh water tanks and fuel tanks may be (1) included external to the shelter/camper and attached with piping, tubing, flexible tubing, etc.; (2) placed inside when the shelter/camper is open/expanded and removed when the shelter/camper is closed/collapsed, (3) fitted into any available space inside storage cabinets or in lieu of other components; or (4) otherwise associated and/or connected to the shelter/camper. Other fixtures, such as one or more mirrors

662, wall/ceiling mounted televisions, storage pockets and hooks and other components may be embedded in the panels of the roof, floor, walls or bed platform.

In one embodiment, where the exterior height of the closed/collapsed shelter/camper is not limited or may be greater, e.g., as in shelters/campers designed for attachment to a utility trailer, the depth of the floor section (or height of the raised edge of the floor) may be tall enough to accommodate seating, kitchenette fixtures, bathroom fixtures, and other fixtures or components that do not need to be collapsed when the shelter/camper is closed/collapsed. For example, a floor section 604 with a height of 30-36" or more may accommodate fixtures such as seating, cooking, bath fixtures, etc. that may be permanently installed, do not need to be collapsed and may remain inside the shelter/camper when the shelter/camper is closed/collapsed.

When the shelter/camper 600 is in an open/expanded configuration, all wall panels 606, 608, 610, 612, 614 and 616 may be extended vertically until they are perpendicular to the roof section 602 and floor section 604, forming a complete enclosure that is suitable for sleeping and living, in properly equipped shelters/campers. The front wall panel 606 and rear wall panel 608 may sit flush against the right side wall panels 610 and 612, left side wall panels 614 and 616 and connector/mid-section connector 642. Positioned between the side wall panels, the front and rear wall panels may help prevent the side wall panels from folding inward. Slide latches or other components, as mentioned above, may also be used to help prevent wall panels from folding inward when in an open/expanded configuration. Weather stripping or gaskets may ensure a weather tight seal between all joints. The door 622 may allow entry to and exit from the shelter/camper and may be locked, securing occupants and/or belongings inside the shelter/camper. The windows 644 may also be opened or closed.

In open/expanded configuration (e.g., as shown in FIG. 22), the shelter/camper may have an interior height between the floor and the mattress platform 678 comfortable enough for most occupants to stand. In an open/expanded, sleeping configuration (e.g., as shown in FIG. 23), the interior height between the mattress and the ceiling may also be enough to sit, crawl, sleep and in some cases even stand. In an open/expanded configuration, interior fixtures 646-660 and 664-680 may be stacked and/or extended for use or collapsed for closing/collapsing of the shelter/camper. If the shelter/camper (e.g., in the floor section 604) is tall enough to accommodate interior fixtures that do not need to be collapsed or removed for closure of the shelter/camper, the fixtures can remain in place while the shelter/camper is in open/expanded configuration or in the closed/collapsed configuration. In an open/expanded configuration, the bed system (e.g., mattress 678 and platform 680) may be raised for full standing height (e.g., as shown in FIG. 22) or any height between the ceiling and the fixtures (e.g., fixtures 446-652) below the bed system. In shelters/campers that are sufficiently longer than the bed system to contain fixtures/components in a section of the shelter/camper that does not lie under the bed system (e.g., bathroom section with components 664-676), the interior height of that portion of the shelter/camper may have full interior standing height between the floor and the ceiling and may not be affected by the position of the bed system (e.g., as shown in FIG. 22).

Water and fuel tanks may be placed externally or internally and connected to interior components as described previously. Use of optional heating and cooling equipment can maintain a comfortable interior environment in an open/expanded configuration. Components such as televisions and other electrical equipment may also be used when the shelter/camper is open/expanded. Optional solar panels 618 and batteries can continue to operate in the open/expanded configuration or in the closed/collapsed configuration. The shelter/camper 600 may remain open/expanded in place on a vehicle roof rack, in a pick-up truck bed, on a trailer, or on any surface that can support its weight and the weight of its occupants.

When the shelter/camper is in closed/collapsed configuration (e.g., as shown in FIG. 27), all wall panels (e.g., wall panels 606, 608, 610, 612, 614 and 616), interior wall 654, the bed system (e.g., mattress 678 and platform 680) and all interior components/fixtures that remain in the closed/collapsed shelter/camper (e.g., fixtures/components 646-652 and 662-676) may sit entirely inside a closed case formed by joining the roof section 602, one or more connectors 642 (if used), and/or the floor section 604. In one embodiment, the closed case may contain components in the following order, from top to bottom: Upper panel sections 626 and 634 of the upper pairs of wall panels 610 and 614; lower panel sections 628 and 636 of the upper pairs of wall panels 610 and 614; upper panel sections 630 and 638 of the lower pairs of wall panels 612 and 616; lower panel sections 632 and 640 of the lower pairs of wall panels 612 and 616; front wall panel 606; rear wall panel 608; bathroom components 664-670, 674 and 676 (in the portion of the floor section between the rear edge 684 and raised section 658) and upper panel 656 of the interior wall 654 (in the portion of the floor section between raised section 658 and front edge 682); mattress 678; mattress platform 680; bench 646-652 and any other interior components/fixtures attached to the floor. If the front, rear and interior wall panels are hinged to the roof section instead of the floor section, the interior wall may sit between the roof section and the front or rear wall panels and the front and rear wall panels may sit between the interior wall panel and the upper panel sections of the upper pairs of bi-fold side wall panels. The roof section 602, one or more connectors 642, the floor section 604, or various combinations of these may have weather stripping or gaskets in between, forming a weather tight enclosure when in the closed/collapsed configuration. Locks, latches, connectors, etc. connecting the roof section, mid-section connector and the floor section may ensure the case remains tightly closed while in transit or not used. Optional solar panels 618 and batteries can continue to operate in closed/collapsed configuration.

The shelter/camper may be simple and easy to transition between configurations without any tools/specialized tools or, optionally, with additional tools that aid transitioning. In one embodiment, to open/expand the shelter/camper 600, the locks, latches, or other connectors connecting the roof section 602, one or more connectors 642, the floor section 604, or various combinations of these may first be unlocked, unlatched, unconnected, etc. and opened. Then the roof section 602 and the side wall panels 610 and 614 may be raised (e.g., as shown in transition in FIG. 26) until the wall panels 610 and 614 are completely vertical (e.g., as shown in FIG. 25). The raising/opening of the roof section 602 and side wall panels may be done either manually or using some manner of mechanical assistance or mechanical system (e.g., lifting/lowering mechanisms that are either powered or manually operated, such as motorized hinges, pistons, other systems/components described elsewhere herein, etc.) that is appropriate for the size and weight of the shelter/camper. Slide latches or other components may be used between sections of the wall panels (e.g., between upper sections 626 and 634 and lower wall panel sections 628 and 636 of the upper pairs of wall panels 610 and 614) to prevent the bi-fold wall panels from folding inward. This process may open/expand the upper half of the shelter/camper. The same or a similar process may open/expand the lower half. The side wall panels 612 and 616 may be raised/opened simultaneously with the other side wall panels 610 and 614 or may be raised/opened successively. Opening processes may be performed simultaneously or in succession in any order. FIG. 25 show the shelter/camper 600 in the fully raised position with the side wall panels 610, 612, 614, and 616 all expanded and vertical.

With the shelter/camper in fully raised position, the front wall panel 606 can be raised (manually or mechanically) until the free or unhinged end latches or otherwise connects with the front edge (e.g., an interior surface of the dropped front edge) of the roof section 602 or directly with the bottom surface of the roof section (e.g., the ceiling of the shelter/camper). Once the front wall is raised, the rear wall panel 608 can be raised (manually or mechanically) until the free or unhinged end latches or otherwise connects with the rear edge (e.g., an interior surface of the dropped rear edge) of the roof section 602 or directly with the bottom surface of the roof section (e.g., the ceiling of the shelter/camper). FIG. 25 show the front and rear wall panels 606 and 608 in the process of being raised. Once fully raised, the front and rear wall panels may sit flush with the edges of the side wall panels, further preventing the wall panels (e.g., bi-fold wall panels) from folding inward. Once the shelter/camper is fully opened/expanded, the interior wall panel 656 can be raised (manually or mechanically) until the free or unhinged end latches or otherwise connects with a bottom surface of the roof section (e.g., the ceiling of the shelter/camper) (e.g., as shown in transition in FIG. 24). Once the interior wall is raised, the bed system (e.g., mattress 678 and platform 680) may be raised and positioned toward the roof section 602 of the camper for storage and when maximum standing height below the bed is preferred (e.g., as shown in FIG. 22) or may be positioned at any height below the roof section and above any interior components below for use (e.g., as shown in FIG. 23). Once the bed system is raised and the internal wall is connected, the interior fixtures 646-652 and 664-676 may be extended, stacked, raised, and/or otherwise situated for use. External tanks, plumbing components, and/or other equipment may be connected and/or attached for operation. If the rear wall panel is hinged higher than the front wall panel to the edges (e.g., raised interior edges) of the floor section, then the order mentioned above for raising and lowering the front and rear wall panels may be reversed. If the interior, front and rear wall panels are hinged to the roof section instead of the floor section, the free ends of the interior, front and rear wall panels may then be lowered (by gravity or mechanically) until they latch with the raised section (e.g., raised section 658) or the front and rear edges (e.g., raised interior edges) of the floor section.

To close/collapse the shelter/camper, the interior fixtures 646-652 and 664-670, 674 and 676 may be collapsed or removed for storage, if necessary, the bed system may be lowered into the floor section, and external tanks, plumbing components, and/or other equipment may be disconnected, detached or removed, if necessary. Next, the free end of the interior wall panel may be unlatched or otherwise disconnected from the bottom surface of the roof section and the panel may be lowered (by gravity or mechanically) (e.g., as shown in transition in FIG. 24) toward the floor section until it rests flat against the mattress 678. The free end of the rear wall panel may then be unlatched or otherwise disconnected from the edge or bottom surface of the roof section and the panel may be lowered (by gravity or mechanically) (e.g., as shown in transition in FIG. 25) toward the floor section until it rests flat against the upper interior wall panel. Then the free end of the front wall panel may be unlatched or otherwise disconnected from the edge or bottom surface of the roof section and the panel may be lowered (by gravity or mechanically) (e.g., as shown in transition in FIG. 25) toward the floor section until it rests flat against the rear wall panel. Next, any slide latches or other components holding the side wall panels open can be unlatched or adjusted, so that the side wall panels (e.g., bi-fold side wall panels) can begin to fold inward and the roof section 602 and any connector(s) 642 can begin to lower (e.g., as shown in transition in FIG. 26). The upper and lower halves of the shelter/camper may be lowered simultaneously or in succession, in any order. The lowering of the roof section, any connector(s), and the side wall panels (e.g., four pairs of bi-fold side wall panels as shown in FIG. 26) may be mechanically assisted by lifting/lowering mechanisms or other mechanical systems described herein that are either powered or manually operated, such as motorized hinges, pistons, etc. that are appropriate for the size and weight of the shelter/camper. If the interior, front and rear wall panels are hinged to the roof section instead of the floor section, the free ends of the of the interior, front and rear wall panels may be unlatched or otherwise disconnected from the raised section or edges of the floor section so that the panels may be raised (manually or mechanically) until they latch flat against the ceiling of the roof section. Once the wall panels are fully lowered, the roof section 602, any connector(s) 642, and the floor section 604 may be latched, connected, and/or locked together, creating a tightly closed, secure case (e.g., as shown in FIG. 27).

The enclosure walls 606, 608, 610, 612, 614, and 616, roof section 602, connector(s) 642, and floor section 604 may be constructed of composite material such as fiberglass, carbon fiber, or any other composite material. Alternatively, the panels may be constructed with wood or aluminum framing and sided with wood, aluminum, laminate, fiberglass or any other siding material. The panels may have a solid, honeycomb, sectioned or hollow core. The panels may be insulated with polystyrene, fiberglass, any other insulating material, and/or any other vapor barrier material (e.g., one or more of these may be used inside the panels). Interior surfaces may be painted, left unfinished or finished with any appropriate material, such as plastic, wood or fiberglass paneling or may be upholstered. The interior wall panel 656 may be constructed the same as or similar to the exterior walls or from any of the materials or combinations of materials mentioned above for the exterior wall panels. Interior fixtures 646-652, 662-676 and 680 may be constructed of any appropriate material such as plastic, wood, laminate, fiberglass, glass, stainless steel, or other metal or fabric.

In one exemplary embodiment, as shown in FIG. 21, the exterior dimensions of shelter/camper 600 that contains a 3½" thick Twin mattress (e.g., 39"×75" give or take a couple of inches), a bathroom that is 39" W×36" L, 1" thick panels and has interior, front and rear wall panels hinged to the floor may be 41" W×116" L×84" H in an open/expanded configuration and 41" W×116" L×16" H in a closed/collapsed configuration. This embodiment has 17" H×114" L bi-fold side panel sections 626, 628, 630, 632, 634, 636, 638 and 640. This embodiment also has a 12" tall floor section 604, which has a floor thickness of 1", plus 8" of height to accommodate the interior fixtures 646-660 and 664-680, plus 2" of height to accommodate the 1" thick front and rear wall panels 606 and 608, plus 1" of height to accommodate the 1" thick lower sections 632 and 640 of the lower pairs of bi-fold side wall panels 612 and 616 when in a closed/collapsed configuration. This embodiment may have a 2" tall mid-section connector 642 that may provide 2" of height for the 1" thick upper sections 630 and 638 of the lower pairs of bi-fold side wall panels 612 and 616 and the 1" thick lower sections 628 and 636 of the upper pairs of bi-fold side wall panels 610 and 614. This embodiment may have a 2" tall roof section 602 with a ceiling thickness of 1", plus 1" of height to accommodate the 1" thick upper sections 626 and 634 of the upper pairs of bi-fold side wall panels 610 and 614 when closed/collapsed.

In the embodiment shown in FIGS. 21-27, the front wall panel 606 may be 39" W×73" H or have a total combined length of 73" for both or all sections of a foldable, bi-fold or multi-fold front wall panel. The rear wall 608 may be 39" W×74" H or have a total combined length of 74" for both or all sections of a foldable, bi-fold or multi-fold rear wall panel. The roof section 602 may have a dropped interior edge that is 1" H. The floor section 604 may have a raised interior front edge 682 that is 9" H and a raised interior rear edge 684 that is 8" H. With the shelter/camper fully opened/expanded, the distance between the roof and floor exterior edges may be 70". With the bed system (e.g., mattress 678 and platform 680) in fully raised position, the distance between the mattress platform and the floor is 78", resulting in about 6½ ft of interior standing height in the portion of the shelter/camper between the raised interior front edge 682 and raised interior section 658. The distance between the floor and the ceiling in the portion of the shelter/camper between raised interior section 658 and raised interior rear edge 684 is 82", resulting in almost 7' of interior standing height. In this embodiment, the available space for interior fixtures may be 8" H×39" W×112" L along the floor under all of the folded exterior wall panels; and 4" H×5" W×114" L in the center, in the gap between the 2 pairs of folded bi-fold wall panels on each side. This embodiment employs a configuration that accommodates the following: 3" H×19½" W×75" L seat bench (including frame); 3" H×19½" W×75" L backrest (including frame); 4" thick bed (including mattress and platform); a 1" thick upper interior wall panel; a 7" H×39" W×1" L fixed raised section (e.g., section 658); a shower basin integrated into the floor (e.g., a shower basin that takes up no additional space or very little space); a bath vanity in 4 sections, each of which is 8"H×18" W×9" L; a 7½" H×15" W×16" L toilet section 1; a 4½" H×15" W×16" L toilet section 2; and available space for components such as electrical outlet boxes or other smaller interior components. When the shelter/camper is collapsed, the seat, backrest, bed system, upper interior wall panel, fixed raised interior wall section, the vanity sections and the toilet sections may occupy the 8" of height under the rear wall panel (e.g., as can be seen in FIG. 25). These example dimensions may be especially useful for use with a shelter/camper with a Twin mattress. The dimensions and/or configurations of components and interior fixtures may vary depending on the size of the mattress the shelter/camper contains and other factors. For example, in one embodiment, the dimensions cited above may vary within plus or minus 15", 12", 6", 3", or other amounts. In one embodiment, the dimensions may be sized to leave room in the collapsed/closed configuration for interior fixtures that could be 36" tall or taller and/or to allow for shelters where the floor is tall enough to accommodate fixtures such that they do not need to be collapsed. In one embodiment, the dimensions affecting the height of the shelter may be increased by an amount between 2" and 40", between 10" and 30", and/or between 12" and 24".

It would be beneficial if the walls, roof sections, floor sections, mid-section connectors, interior components and other components of camper 1, camper 100, camper 400 and camper 600 collapsed to form closed cases with low profiles wherever a compact closed shelter/camper is preferred for transportation or storage purposes (e.g., for shelters/campers that may be attached to roof racks, towed by small vehicles, transported in multiples for emergency relief or other events, stored in pick-up truck beds, or stored in small storage closets or garages, etc.). To this end, it would be beneficial if the walls, roof sections, floor sections, mid-section connectors, interior components and other components maintained as low a profile as possible and stacked as flat as possible in closed/collapsed shelters/campers. It would also be beneficial if as many components as may be possible were interconnected in the closed/collapsed and open/expanded configurations of these shelters/campers to reduce the amount of time, number of steps, and overall complexity involved in transitioning these shelters/campers between configurations (e.g., it may be easier to open/expand and/or close/collapse shelters/campers with hinged, hinged and/or latched, partially hinged and/or latched or otherwise connected panels or other components than it would be to assemble and disassemble shelters/campers with completely independent panels or components). For these and other reasons, hinges, latches, locks, hooks, connectors, track systems or any other components may be used to attach or connect components or fixtures to each other, or easily expand or collapse components or fixtures for use or storage; connector or accessory components can be made flush with the surfaces or edges of the exterior or interior wall panels, roof sections, floor sections, mid-section connectors, mattress platforms, seat frames, cabinets or other internal or external components to maintain as low a profile as possible for these components. Connector components and other components that may aide in transitioning the shelters/campers are discussed herein.

Hinges that connect two wall panel sections (e.g., the panel sections of a folding, bi-folding, tri-folding, quadri-folding or multi-folding panel) together, connect a door with a wall panel, connect a wall panel with a raised front or rear edge or raised interior section of a floor section, connect a panel with a dropped edge or ceiling of a roof section, connect a front portion of a mid-section connector with the rest of the connector or with a door or wall panel, connect two vanity sections together, connect two kitchenette sections together, connect a window with a door, connect a window with a wall panel, connect an interior wall with a mattress platform or connect any two components together may be any type of flush mounted or concealed hinge available, such as flush mounted door or panel hinges, concealed SOSS® hinges or similar concealed hinges, low-profile carbon fiber hinges, or similar type of hinge. These hinges may be recessed into slight indentations in the surfaces of connected components that are adjacent to the joints between the two components or they may be recessed or otherwise concealed in the adjacent or adjoining edges between the two components. This may allow the hinges to add no additional or minimally additional height, depth or thickness to the height, depth or thickness of the components which they connect. These connectors may aide in maintaining a low profile in a closed/collapsed shelter/camper. Use of these types of connectors may also prevent the connectors from protruding beyond the component surfaces and interfering with other components that may come in contact with those surfaces (e.g., flush mounted or concealed hinges in wall panels may not interrupt or impede the movement of a bed platform or another wall panel whose edges are flush with the side wall edges and may need to move freely past or along the surfaces of the side walls for closing/collapsing or opening/expanding of the shelter/camper or otherwise situating the component for use or storage).

Similarly, any latch, lock or lock and latch combination available, such as panel latches, panel slam latches, surface mountable toggle latches, or any flush mountable or recessed latch connecting two otherwise unattached edges or surfaces (e.g., connecting the free or unhinged end of a front, rear or interior wall panel with a roof edge (e.g., a dropped front or rear interior edge of a roof section or the ceiling of the shelter/camper) or a floor edge (e.g., a raised front or rear interior edge or raised interior section of a floor section), connecting the unhinged end of a door with its wall panel, connecting a cabinet door with its cabinet housing, etc.) may likewise be used.

Similarly, hooks or other connectors for temporary or semi-permanent attachment of any components (e.g., attachment of a shower curtain or wall divider to a bed platform or ceiling; for attaching plumbing tubes, hoses or attachments to wall panels; for hanging clothes, toiletry cases, pots and pans or other supplies; for temporary or semi-permanent attachment of any component, item or personal belonging) may be fully recessed into the wall panels, bed platforms, ceilings or any other component surfaces in open/expanded or closed/collapsed shelters/campers for the reasons discussed above.

Tracks and any other components or systems for connecting two or more components or used to move or otherwise situate components for use or storage may similarly be recessed into or made flush with the surfaces or edges of wall panels, roof sections, mid-section connectors, floor sections or any surface of components that may remain inside or be attached to a shelter/camper in either open/expanded or closed/collapsed configurations. The connectors or accessory components described above may be commercially available or may be made specific to the shelters/campers described herein or to the components included in the shelters/campers, depending on the purpose, size, weight and material of the shelter/camper or the component.

FIGS. 28-35 illustrate exemplary connectors or accessory components or features that may be applicable to camper 1, camper 100, camper 400 or camper 600 or any of the components associated with these shelters/campers. The components described herewith illustrate only some possibilities for connecting components, expanding or collapsing components, or improving the performance of certain components or of the shelter/camper as a whole.

Shelters/campers with one or more pairs of bi-fold wall panels per side may use a rod hinge or rod connector similar to the connectors shown in the FIGS. 28-32. These figures illustrate an example of how such a rod connector may connect bi-fold wall panels to the roof sections, mid-section connectors, or floor sections of camper 1, camper 100, camper 400 or camper 600. To show detail, the wall panels, roof sections, mid-section connectors or floor sections shown in these figures are compressed portions of example components shown in a cross-sectional view. Versions of these exemplary rod hinges or similar hinges may be used in full sized versions of shelters/campers.

The rod hinges (e.g., components 902-906, shown in FIGS. 28-32) may allow example upper panel section 826 of example upper bi-fold wall panel 810 to be hinged on top to example roof section 802, and example lower panel section 828 of the same upper bi-fold wall panel to be hinged on the bottom to example mid-section connector 842, and connector 842 to be hinged to the top of example upper panel section 830 of example lower bi-fold wall panel 812, and example lower panel section 832 of the same lower bi-fold wall panel to be hinged on the bottom to example floor section 804. Rod 902 in the rod hinge/connector may be a continuous rod that runs the full length or almost the full length of a floor section, mid-section connector or roof section (e.g., example components 802, 804 and 842 in FIGS. 28, 29, 30 and 31).

Figure 31:
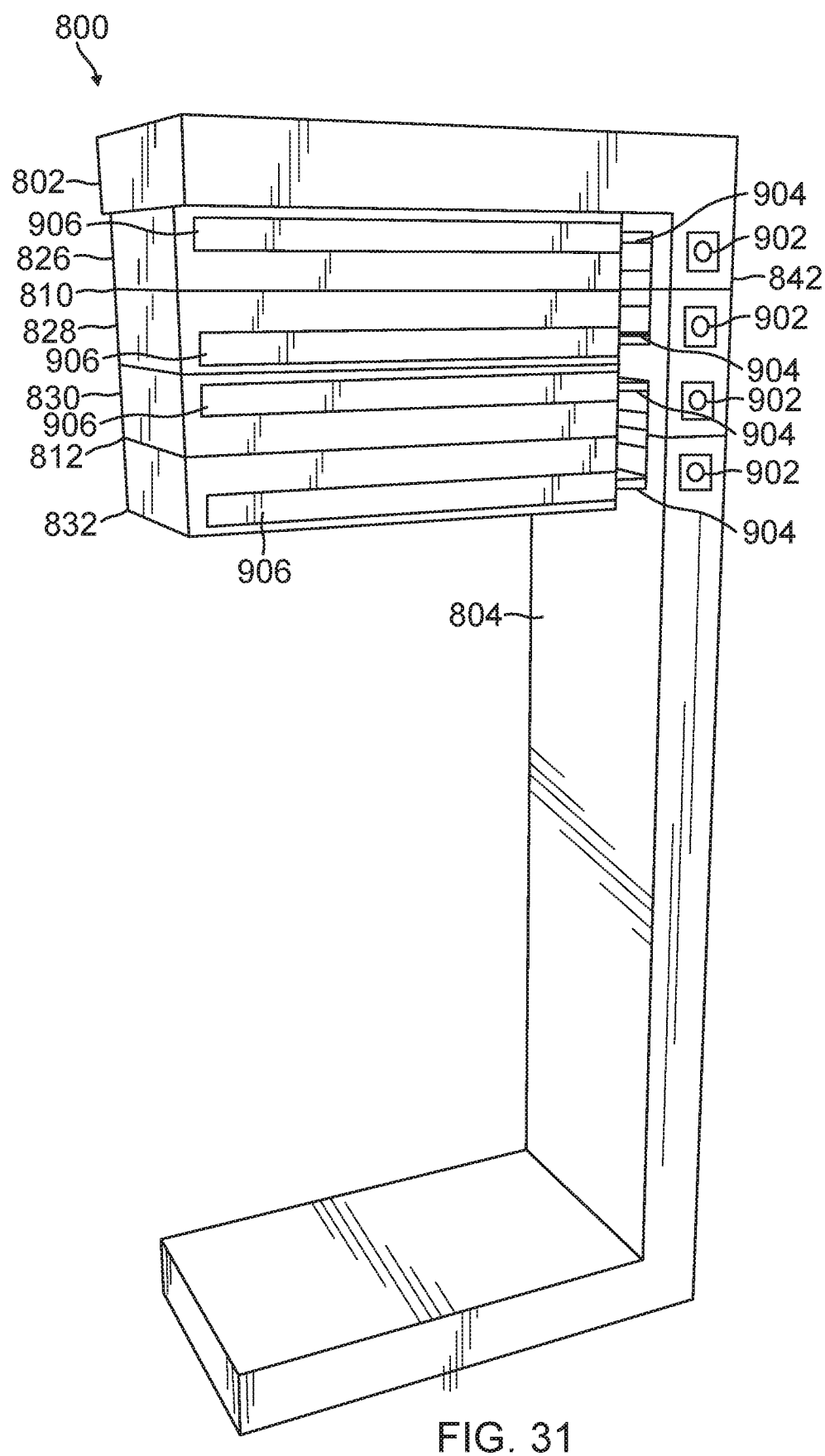
FIG. 31 shows a cross-sectional view of an exemplary panel with a rod hinge connector hinge connector system of FIG. 28 in a closed or collapsed configuration.
Figure 32:
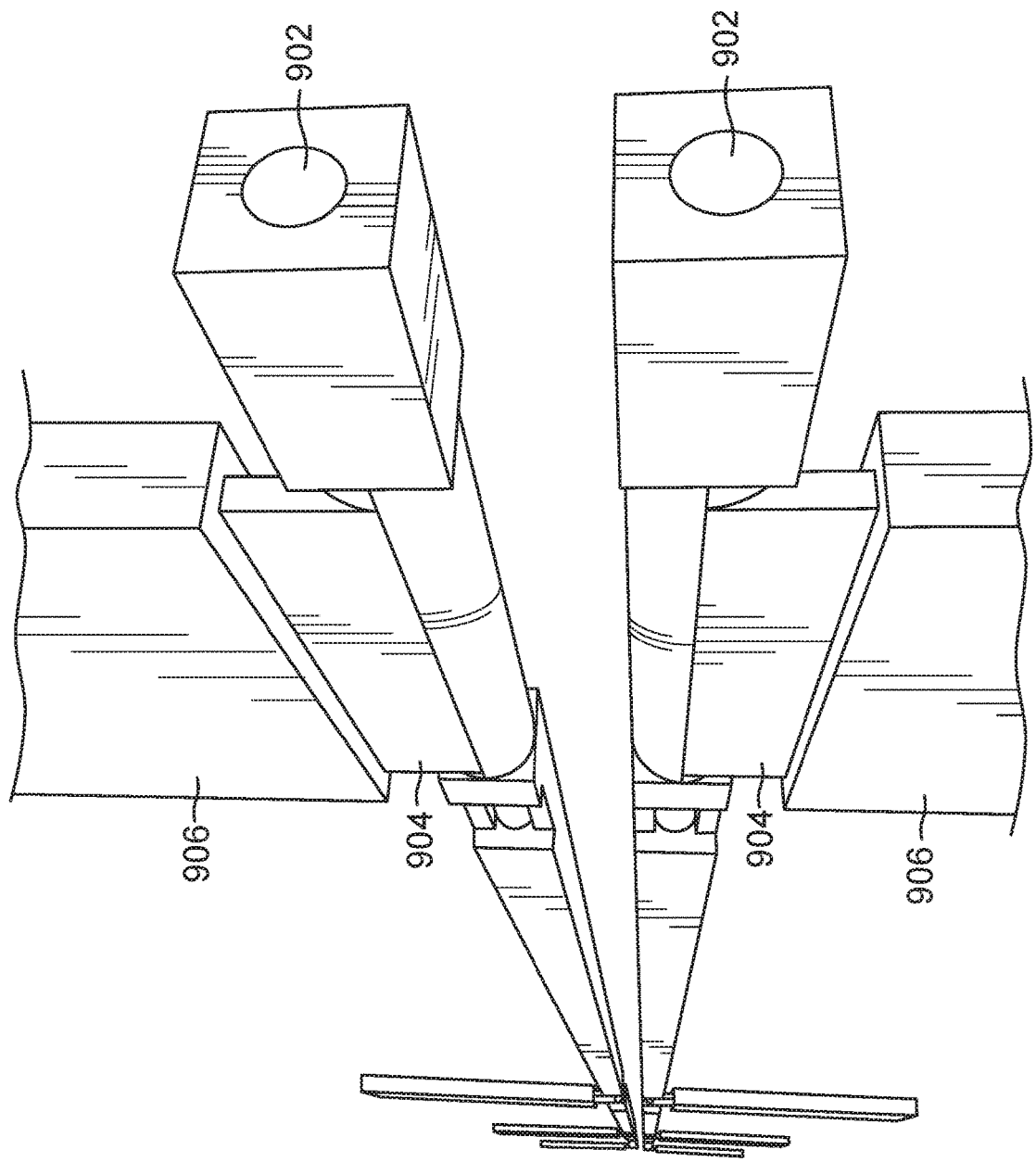
FIG. 32 shows a close up view of the rod connector system of FIG. 28.

The rod 902 may pass through one or more inserts 904 which may slide into sleeves 906 (e.g. as shown in FIG. 32). The rod hinge/connector may contain as many inserts/sleeves as may be appropriate for the size and weight of the wall panel section attached to it. The rod 902 and one or more inserts (e.g., insert 904) may be attached to (e.g., permanently attached to, fastened to or integrated with) an edge of a roof section, mid-section connector or a floor section (e.g., as shown in FIGS. 28-31) that connects with an end of a bi-fold wall panel section. Each insert 904 may slide into a sleeve 906, which may be attached to (e.g., permanently attached to, fastened to, or integrated with) an edge of a wall panel section that may rest directly below or above an edge of a roof section, mid-section connector or floor section in an open/expanded shelter/camper.

The rod 902 in the connector may allow the insert to rotate around the rod or alternatively with the rod, allowing or causing the sleeve and therefore the wall panel to rotate. This will allow a connected wall panel section to move from a vertical position (e.g., as shown in FIG. 28) in an open/expanded shelter/camper to a horizontal position (e.g., as shown in FIG. 31) in a closed/collapsed shelter/camper.

For closing/collapsing of the shelter/camper, the rod hinge/connector may allow the wall panel section connected to it, to rotate one quarter turn into the shelter (e.g., as shown in transition in FIG. 30) until the wall panel exterior surface is flush with or above the dropped edge of the roof section, flush with or below the top edge of the mid-section connector, flush with or above the bottom edge of the mid-section connector, or flush with or below the raised edge of the floor section, whichever edge the wall panel is connected to (e.g., the wall panel is rotated into the shelter/camper until it sits completely within the dropped edge of the roof section, the top or bottom edge of the mid-section connector or the raised edge of the floor section allowing the wall panel to sit completely inside the closed case formed by the shelter/camper, as shown in FIG. 31). A standard hinge may not fold the wall panel enough to completely sit within the edges of the sections it is connected to. Or if the wall panel is hinged to the roof section, floor section or mid-section connector in such a manner that it sits completely within the edges of those sections in a closed/collapsed shelter/camper (e.g., similar to an inset kitchen cabinet door), then a standard hinge may not unfold the panel until it lines the panel edge up directly and in line with an edge of the roof section, mid-section connector or floor section in an open/expanded shelter/camper.

Figure 28:
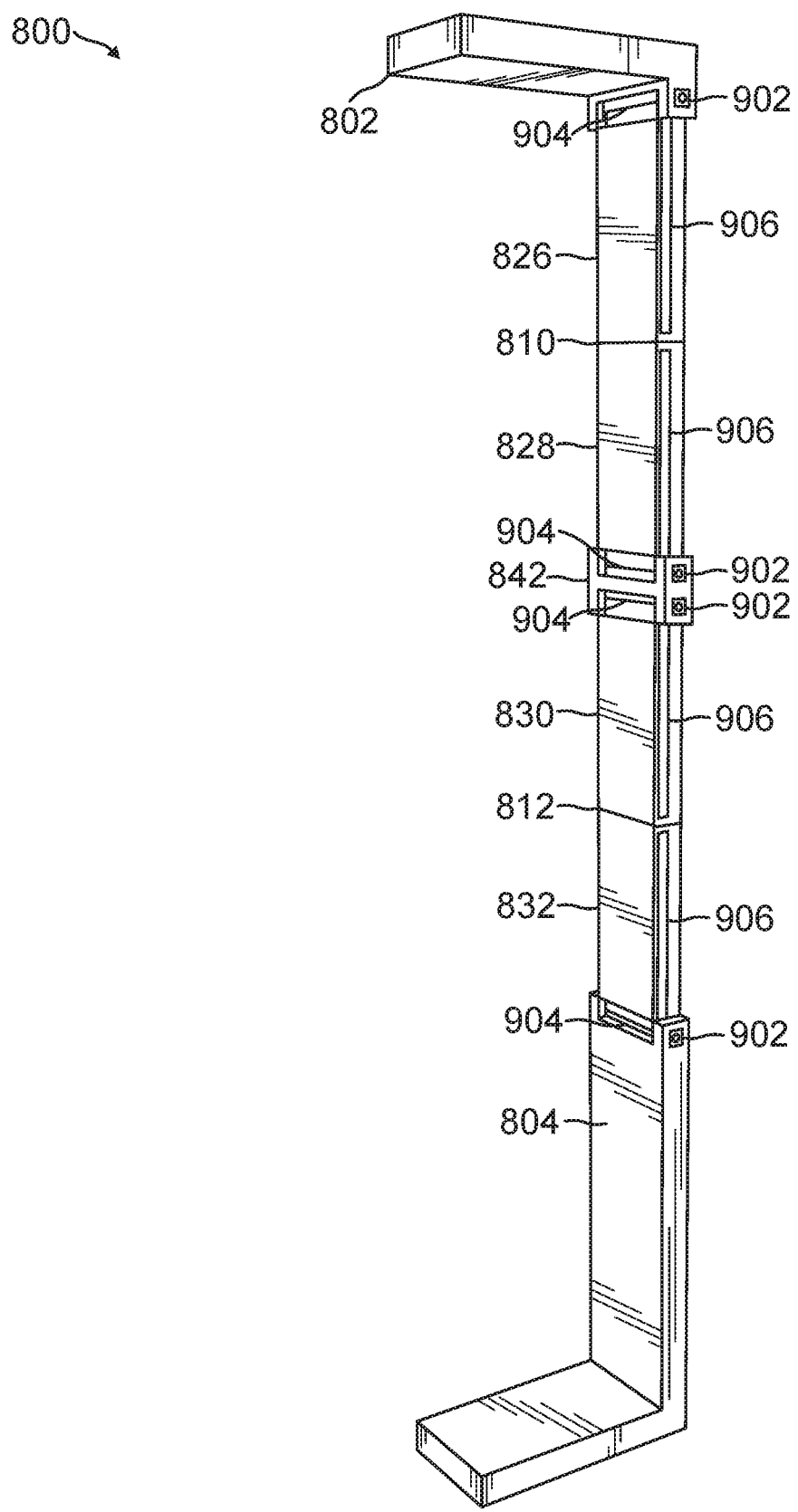
FIG. 28 shows a cross-sectional view of an exemplary panel with a rod hinge connector system in an open or expanded configuration.

Other hinge types, (e.g., similar to some inset kitchen cabinet hinges) may allow a wall panel section to sit completely within the edges of the roof section, mid-section connector, or floor section when closed/collapsed (e.g., as can be seen in FIG. 31 and similar to how an inset cabinet hinge may allow a cabinet door to sit completely within the frame edges of the cabinet) and may also allow the panel section to unfold properly and rest end to end and in line with the edge of the roof section, mid-section connector or floor section that it is hinged to (e.g., as shown in FIG. 28), however that hinge type may not be capable of being completely recessed into the wall panel; this would add additional depth to each wall panel and therefore may add significant depth to the closed shelter/camper since they may be attached to all side wall panel sections (e.g., two, four or more panel sections per side) and the hinges would interfere with the movement of bed systems and front, rear and interior wall panels that have to move passed those surfaces of the hinged side-wall panels.

The rod hinge/connector components (e.g., components 902-906) may sit completely inside the wall panels or edges of the roof sections, mid-section connectors or floor sections in both open/expanded and closed/collapsed configurations of these shelters/campers (e.g., as shown in FIGS. 28 and 31) and therefore may not add any additional depth to the panels and the closed/collapsed shelter/camper and may not interfere with the movement of any other components.

Figure 29:
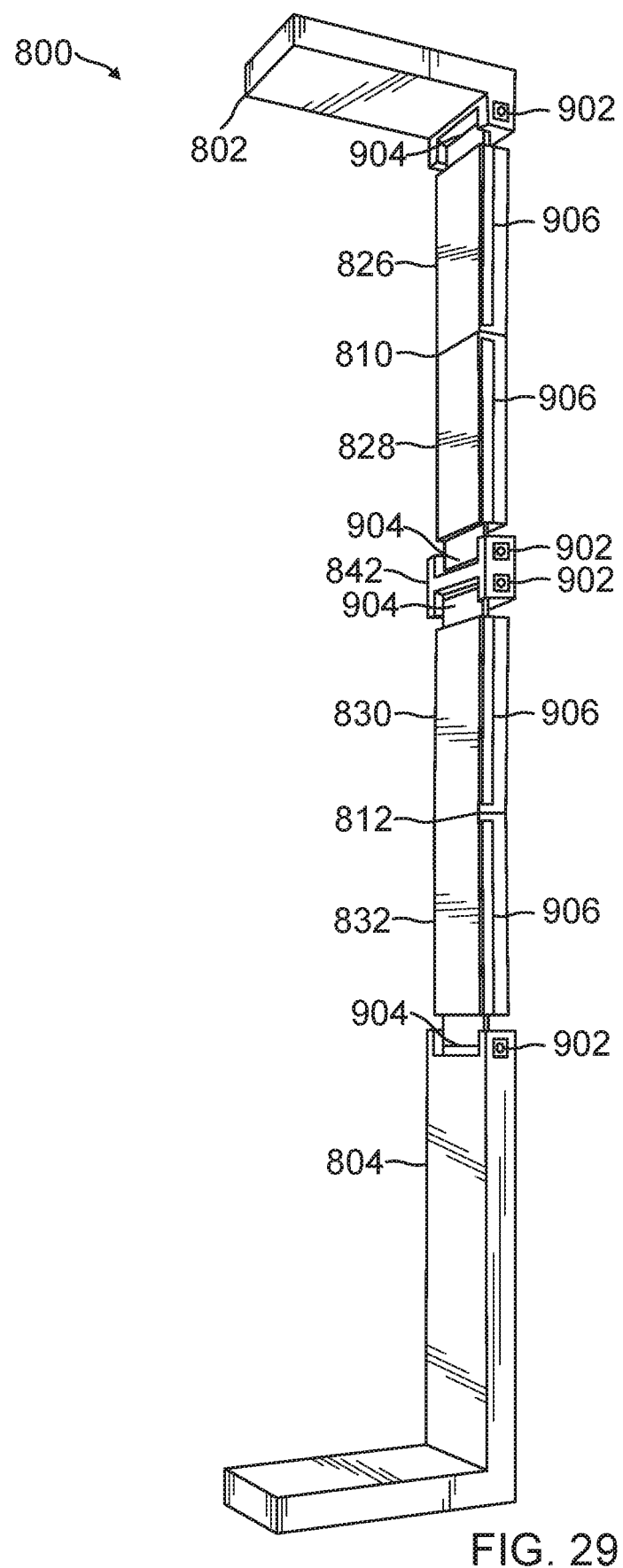
FIG. 29 shows a cross-sectional view of an exemplary panel with a rod hinge connector system of FIG. 28 in a first transition position between an open or expanded configuration and a closed or collapsed configuration.
Figure 30:
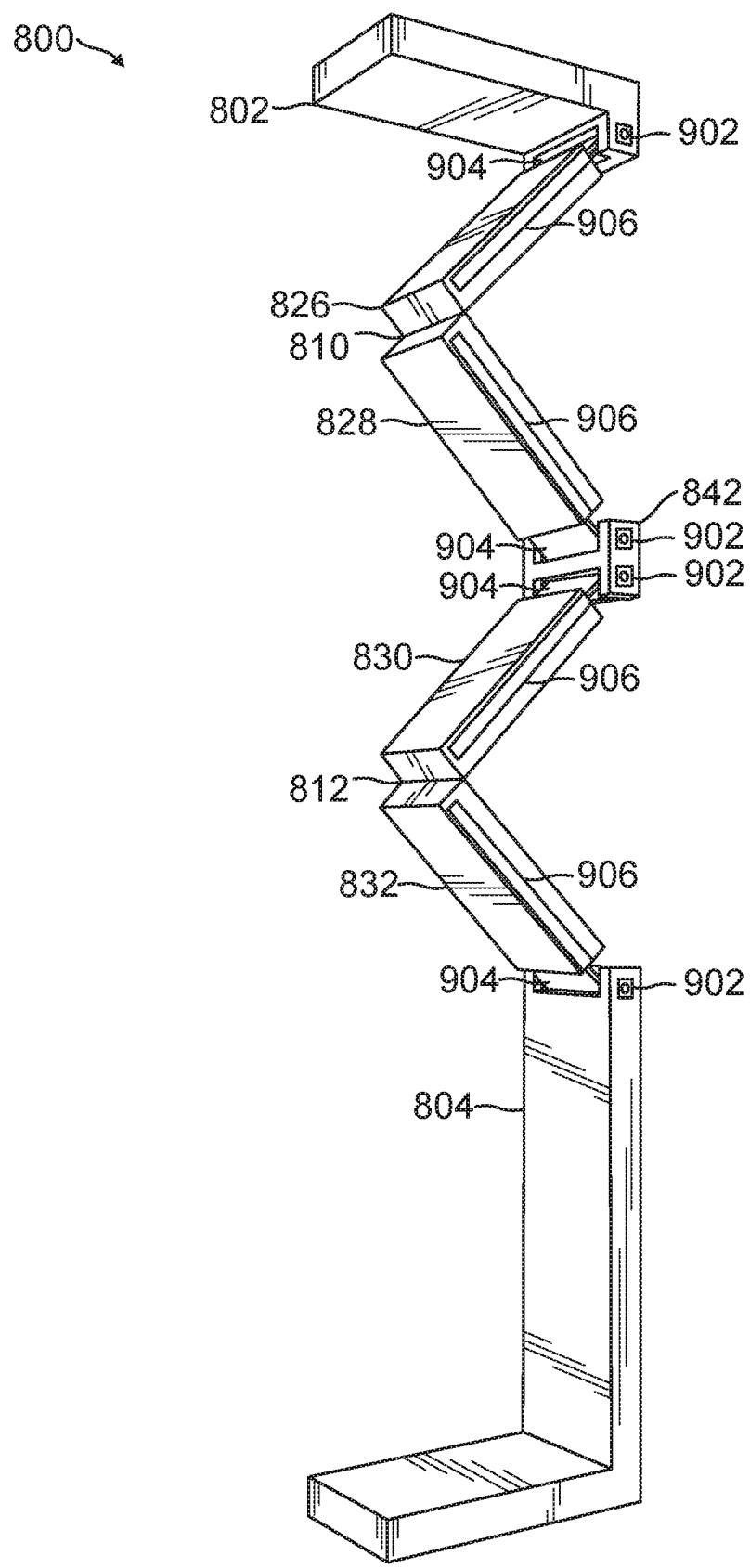
FIG. 30 shows a cross-sectional view of an exemplary panel with a rod hinge connector system of FIG. 28 in a second transition position between an open or expanded configuration and a closed or collapsed configuration.

The rod hinge/connector may also allow each side wall panel section to move (e.g., the sleeve 906 may slide up or down the insert 904, as can be seen in transition in FIG. 29) just enough to clear the edge of the roof section, mid-section connector or floor section as the panel rotates for closing/collapsing or opening/expanding. Without that clearance or the ability to move slightly the wall panel edges would butt up against the edges or interior surfaces of the roof section, mid-section connector or floor section, preventing the panels from rotating when the panels are vertical, in open/expanded configuration, or horizontal, in closed/collapsed configuration. The gap may be created during the opening and closing processes (e.g., as shown in transition in FIG. 30) as the roof section or mid-section connectors are lifted.

To transition the shelter/camper from a closed/collapsed configuration, lifting the roof or mid-section connectors will pull the sleeves 906 slightly away from the inserts 904 and therefore the wall panel sections will be pulled away from the interior surfaces of the roof section, mid-section connector and floor section as the corners of the wall panel edges touch those interior surfaces, thereby creating the clearance needed to rotate the bi-fold side wall panel sections passed the edges of the roof section, mid-section connector and floor section.

To transition the shelter/camper from an open/expanded configuration, lifting the roof section or mid-section connector will pull the sleeves apart slightly from the inserts, creating the clearance needed to fold the bi-fold wall panel sections inward. A set screw attached to the insert 904 through a gap in the sleeve 906 may limit the amount of movement that can occur between the sleeve and the insert to just the length of the gap, preventing the sleeve from completely separating from the insert (e.g., a screw passing through a gap in the sleeve and interior surface of a side wall panel section and screwing into to an insert, may limit the movement of that insert to just the length of the gap in the sleeve). Removing the set screws may allow the sleeve and insert to completely separate, allowing for detachment of the bi-fold wall panel sections from the roof section, mid-section connector for repair, replacement or servicing of any of those components.

The gap needed to fold/unfold the bi-fold wall panel sections may be done manually by lifting sections of the shelter/camper during opening and closing processes. Alternatively, springs may aide in the creation and/or closing of the gaps needed to fold/unfold the side wall panels. A spring attached inside and positioned between the sleeve 906 and the insert 904 end, may cause the panel section to separate just enough to create that clearance (e.g., a spring inside the sleeve 906 may push on the end of the insert 904, creating a small gap inside and therefore pushing the wall panel section slightly away from the edge or interior surface of the roof section, mid-section connector or floor section). The spring in its natural state may push the wall panel section slightly away from the edges or interior surfaces of the roof section, mid-section connector or floor section (e.g., as shown in FIGS. 29 and 31).

In this configuration, for opening/expanding the shelter/camper, a downward pressure on the roof section or upward pressure on the floor section may cause the springs in all of the rod hinges/connectors to compress and close the gaps, as shown in FIG. 28 (e.g., compression, toggle latches or slam latches connecting the roof or floor section with the free or unhinged ends of the front and rear wall panels may provide the pressure needed to close the gaps by pulling the roof downward, if the front and rear wall panels are latched to the roof section, or by pulling the front and rear wall panels downward, if the panels are latched to the floor section instead, closing all of the gaps between all side wall panel sections and edges of the roof, mid-section connector and floor).

For closing/collapsing the shelter/camper, unlatching the front and rear wall panels from the roof section or floor section, if latched to the floor, will allow the springs to return to their natural state and create the gap needed to rotate the side wall panel edges passed the edges of the roof section, mid-section connector or floor section. In a closed/collapsed shelter/camper the gap between the bi-fold side wall panel edges and the interior surfaces of the roof section, mid-section connector and floor section may remain since it may not take up a significant amount of space (e.g., as shown in FIG. 31).

Alternatively, a spring attached inside and positioned between the sleeve 906 and insert 904 may pull the sleeve toward the insert in its natural state (e.g., if an insert is slightly shorter than the sleeve then a spring fixed to the inside of the sleeve and end of the insert may pull the sleeve and insert toward each other, creating no gap between the wall panel section and an edge or interior surface of a roof section, mid-section connector or floor section). In this case, the spring's natural state would cause the side wall panel to be pulled toward the edge or interior surface of the roof section, mid-section connector or floor section (e.g. as shown in FIG. 28 in an open/expanded shelter/camper).

In this configuration, for closing/collapsing or opening/expanding the shelter/camper, an upward pressure during opening or closing processes may stretch the springs and create a gap just wide enough for the panel edges to clear the edges of the roof section, mid-section connector or floor sections so that the wall panel edges may rotate over them, and once released the gaps will close as the springs return to their natural state. The gaps needed between the bi-fold side panel section edges and the edges and interior surfaces of the roof section, mid-section connector and floor sections of shelters/campers described herein, may also be mechanically created or closed by use of screws between the sleeves 906 and inserts 904. The screws may turn in one direction to create the gap and another direction to close the gap. The screws may be configured in such a way that the rotation of the rod hinge/connector inward for closing/collapsing of the shelter/camper or outward for opening/expanding the shelter/camper itself may cause the screws to turn in the necessary direction (e.g., similar to the mechanism used in some right angled screw drivers).

Another benefit of the rod hinge/connector may be the ability to attach mechanisms that aid in opening or closing the shelters/campers to the rod hinges/connectors, if the inserts 904 are configured to turn with the rods 902 as the rods turn. A hand crank or motor may be connected via a pulley system to the rods to turn the rods and therefore unfold or fold the bi-fold side wall panels for opening or closing of the shelter/camper. Belts or chains may connect a crank or motor in the floor section to rods on either side of the floor section. One belt may be connected directly to a rod on one side to allow the rod to turn in the direction the crank or motor turns, and the other belt may form a FIG. 8 formation to cause the rod on the other side to turn in the opposite direction the crank or motor turns (e.g., as is a common setup in pulley systems). Therefore turning the crank or motor will turn the rods on the right and left side of the shelter/camper in opposite directions simultaneously to fold/lower or unfold/raise the bottom sections of the lower pairs (or pair, if only one pair bi-fold panels per side is used). As the lower panel sections move it will force the upper panel sections to move since they're hinged together. This process may unfold/fold only the pairs of bi-fold wall panels connected to the floor section, causing the mid-section connector and everything above it to rise/lower or causing only the roof section to rise/lower, if the shelter/camper has only one pair of bi-fold wall panels per side. A similar configuration connecting a crank or motor in the mid-section connector to the rods along the upper edge of the mid-section connector may fold/close or unfold/open the upper pairs of bi-fold wall panels. Alternatively, one or more cranks or motors turning just the rods in the mid-section connector (e.g., one or more cranks or motors turning 4 rods connecting the upper pairs of bi-fold wall panels and lower pairs of bi-fold wall panels) may unfold or fold all bi-fold wall panels connected to it, possibly unfolding or folding the entire shelter/camper. Optionally cranks or motors and belts or chains may be used to turn rods in the roof section and/or lower rods of the mid-section connectors, directly rotating the upper panel sections of the bi-fold wall panels and forcing the lower pairs to rotate as well. Access to cranks or the crank handles may be located externally either at the front or rear end of the shelter/camper which may allow a user to turn the crank from outside to unfold or fold the shelter/camper. If motors are used, one or more motors located at various locations may be connected via belts or chains to the rods (e.g., a motor may be located in the front, rear or middle of the shelter/camper and located in the center or positioned to the side and connected to the rods with belts long enough to reach the rods on each side). One or more motors may be used in combination or separately for separate pairs of bi-fold wall panels. Optionally any mechanism for opening or closing the shelter/camper as discussed previously or elsewhere may be used.

The roof section, mid-section connector and floor section may contain rods 902 in a variety of ways. If the components are made from molded material, the molds may be formed around the rods and the rods may be permanently integrated into the components. If the roof section, mid-section connector or floor section have aluminum frames or other types of frames, the rods may be inserted into the frames or otherwise attached to the frames. Similarly the sleeves 906 may be molded into the side wall panel sections or integrated into the frames or otherwise attached to the frames. Alternatively, the sleeves may be part of the panels themselves (e.g., not separate components but rather indentations in the panel structure).

Figure 33:
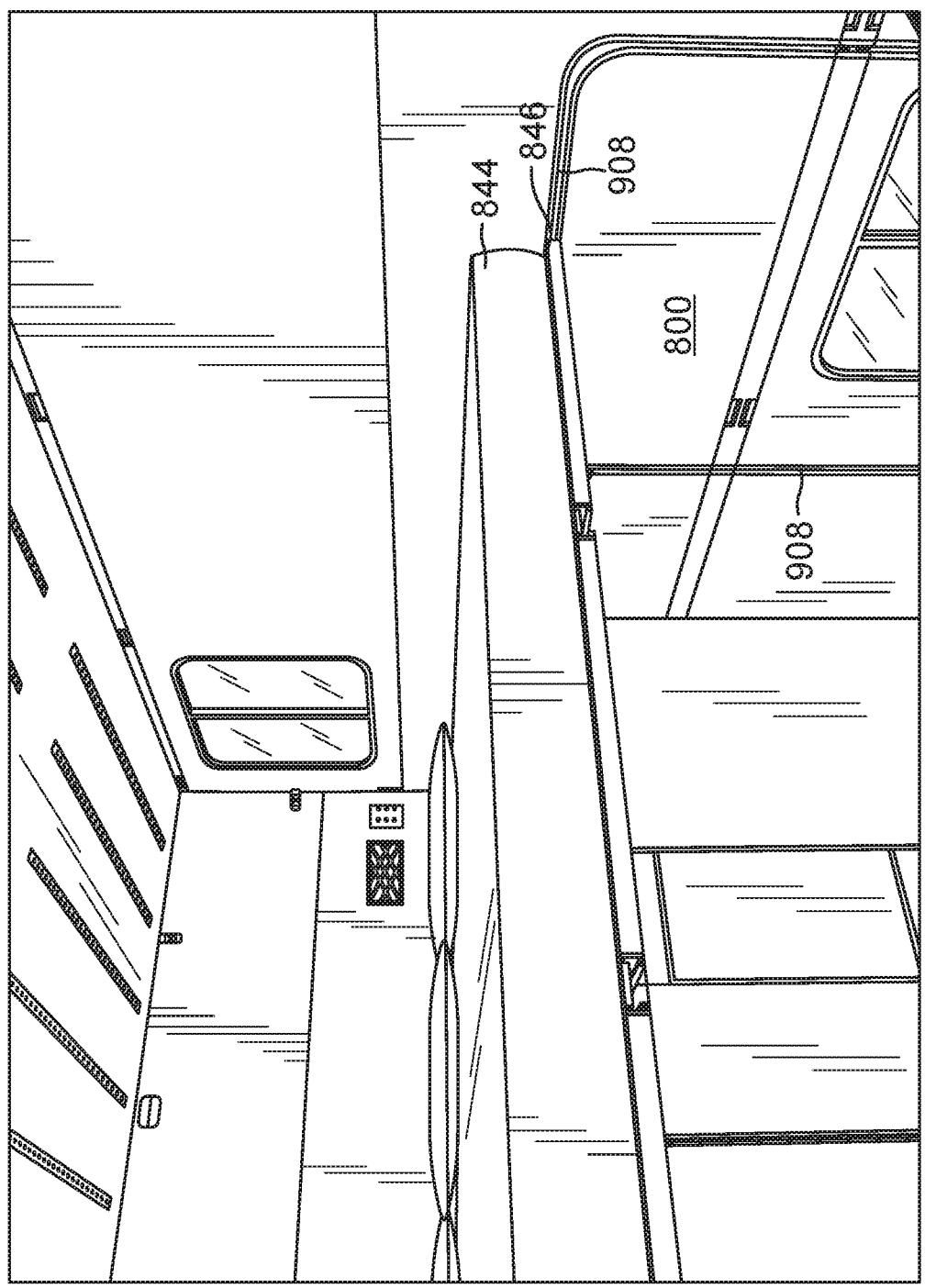
FIG. 33 shows an exemplary track system that may be used to easily move a bed system in a camper or shelter.
Figure 34:
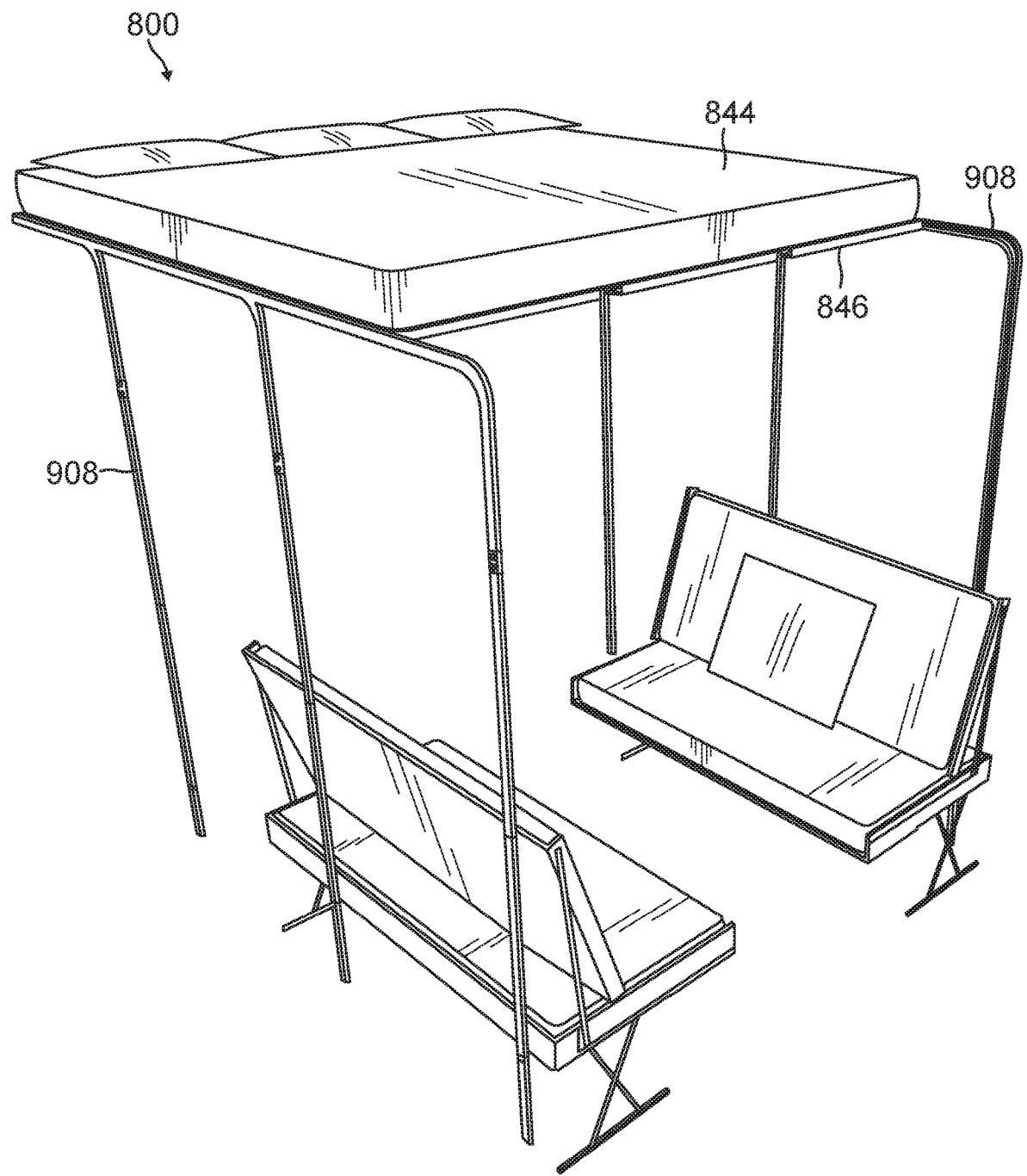
FIG. 34 shows a top perspective view of the interior of a camper or shelter showing an exemplary track system that may be used to easily move a bed system in a camper or shelter.

A track system may be used to lower, raise or otherwise reposition a bed system in shelters/campers with movable bed platforms as described elsewhere. FIGS. 33-34 show an exemplary track system (e.g., track 908 and wheels (not shown)) that may be used to easily move a bed system in camper 100, camper 400 and camper 600 between positions for use and storage or for various purposes. For illustrative purposes, an exemplary camper/shelter 800 containing wall panels, roof, floor, mid-section connectors and bed systems similar to those of camper 100, camper 400 and camper 600 is shown. However, the track system may however be used in any of the shelter/campers described herein that contain a movable bed platform.

The track system may be similar to a c-rail type of track that is in sections embedded in the surfaces of side wall panels, and/or vertical surfaces of the roof section, mid-section connector and/or floor section. The track system 908 may be in several sections spanning multiple panels or component surfaces and may be contain several paths or tracks (e.g., track system 908 may contain two or more tracks per side of the bed platform and may be divided into sections that are embedded in the vertical surfaces of the floor section, bi-fold side wall panels, mid-section connector and roof section, as shown in FIG. 33). The rails of the tracks 908 may contain a channel (e.g., a c-rail) that has an opening wide enough for just an axel of a wheel, connected to an example bed platform 846, to extend beyond the track to connect with a platform (e.g., an axel may extend across, through the platform or under it to the other opposite side of the platform to connect with another wheel and track 908 on the other side of the shelter, or the axels may attach to one wheel only allowing each wheel to be independent), without allowing the wheel to exit the track. This configuration may ensure that the wheels attached to the bed platform remain inside the track, and the bed platform remains securely attached to the track, as the bed is moved for different purposes and or positioned for use or storage.

The rails of the tracks may contain slots, ledges, grooves, catches, stops etc. that may be used to hold the bed system in a particular location or at a particular height during the process of moving it or may secure the bed system in a particular location or at a particular height for use or storage. Latches connected to the bed platform and positioned inside the track may connect to or be inserted into the slots, ledges, grooves, catches or stops in the track rails. The latches may be spring loaded and curved on one end and straight on the other end allowing the bed system to move upward or in a particular direction freely, while preventing unwanted movement downward or in an another unwanted direction unless the latches are unlatched, opened, pulled in, disengaged, etc. (e.g., similar to a door latch which is curved on one end and straight on the other end, allowing free movement in one direction, to close it, but requiring unlatching, by turning the knob, to move in the other direction, to open it). Optionally, the latches may prevent movement of the bed platform in any direction unless the latches are disengaged. The track rails themselves may contain spring loaded stops that allow a wheel to pass in one direction but close the track and prevent the wheel from moving in an opposite, unwanted direction, unless the stops are disengaged.

The tracks may take any path as necessary to move a bed system (e.g., mattress 844 and platform 846) from one location to another, however the track system should contain tracks on both sides of a bed platform to provide support for the bed system. If the track is a straight track, the rails on either side of the shelter/camper or either side of the bed system may not have to be in the same positions along the walls, roof, floor or mid-section connectors, however, if the track is curved or do not follow a straight path, the tracks on either side may need to be at the same positions and be mirror images of each other (e.g., as shown in FIG. 34, without any wall panels, roof, floor or mid-section connector to show detail). The track can be positioned anywhere along the vertical surfaces as necessary to avoid windows or any other components attached to those surfaces or below those surfaces (e.g., as shown in FIG. 33). Other components such as benches may also utilize the same track system 908 using wheels for support or for repositioning those components for use or storage (e.g., as shown in FIG. 34). It may be beneficial for the tracks 908 to be embedded in, made flush with, recessed or otherwise inserted into or integrated with, the components (e.g., roof section, mid-section connector, floor section and bi-fold side wall panels) for the same reasons mentioned above, that other components such as hinges, latches, hooks, or other connectors may be embedded in, made flush with, recessed or otherwise inserted into or integrated with the roof section, mid-section connector, floor section, and bi-fold side wall panels. The tracks may be in separable sections, embedded in the surfaces of each of the components they cross or that are in the path of the tracks (e.g., as shown in FIG. 26).

As the shelter/camper is closed/collapsed the track may separate or come together (e.g., similar to the sectional tracks of toy train sets or slot cars and as shown in transition in FIG. 26). In an opened/expanded shelter/camper, the tracks may come together to form a complete track system or path to facilitate movement of a bed system or other attached component along its path. For closing or collapsing of a shelter/camper, the track may be used to move the bed system (e.g., platform and mattress) to its storage position in the floor section, or optionally in the roof section if the shelter/camper is configured to store the mattress there. In a closed/collapsed shelter/camper, the track system may be configured so that it adds no additional or minimally additional height to any wall panels that contain sections of the track.

Track systems may be configured to move a bed system along any path and position the bed system in any location that is appropriate for that shelter/camper. For example, camper 100 may contain a track system (e.g., tracks 908 and wheels connected to platform 202) with sections of straight track embedded in the right and left sides of roof section 102, bi-fold wall panel sections 126, 128, 130, 132, 134, 136, 138, 140 and right and left sides of mid-section connector 142. This may allow the bed system (e.g., mattress 200 and platform 202) to move downward from a storage position in the roof section to any position between the ceiling and the fixtures below the bed system for use in an open/expanded shelter/camper. Camper 400 may contain a track system (e.g., tracks 908 and wheels connected to platform 488) with sections of straight track embedded in the right and left sides of the floor section 404, bi-fold wall panel sections 430, 432, 438 and 440, right and left sides of mid-section connector 442, and a curved section with multiple tracks embedded in wall panel sections 428 and 436. This may allow the bed system (e.g., mattress 486 and platform 488) to move from a storage position in the floor section and toward the front of the shelter/camper up to a position roughly 3' from the roof section 402 and near the rear of the shelter/camper, forming a loft, in an open/expanded shelter/camper. Camper 600 may contain a track system (e.g., tracks 908 and wheels connected to platform 680) with sections of straight track embedded in the left and right sides of the floor section 604, bi-fold side wall panel sections 626, 628, 630, 632, 634, 636, 638 and 640 and left and right sides of mid-section connector 642, toward the front of the shelter/camper. This may allow the bed system (e.g., mattress 680 and platform 678) to move from a storage position in the floor section 604 in the front section of the shelter/camper (e.g., between the front wall and an interior wall) to second storage position toward the roof section 602, if standing height below the bed system is preferred in that portion of the shelter or camper, or to a position between the ceiling of the shelter/camper and any fixtures below for use, in an open/expanded shelter or camper.

The roof section, mid-section connector, floor sections and bi-fold side wall panel sections may contain tracks 908 in a variety of ways. If the components are made from molded material, the molds may be formed around the tracks and the tracks may be permanently integrated into the component surfaces. If the roof section, mid-section connector, floor section or bi-fold side wall panel sections have aluminum frames or other types of frames, the tracks may be inserted into the frames or otherwise attached to the frames and may even form part of the frame.

Figure 35:
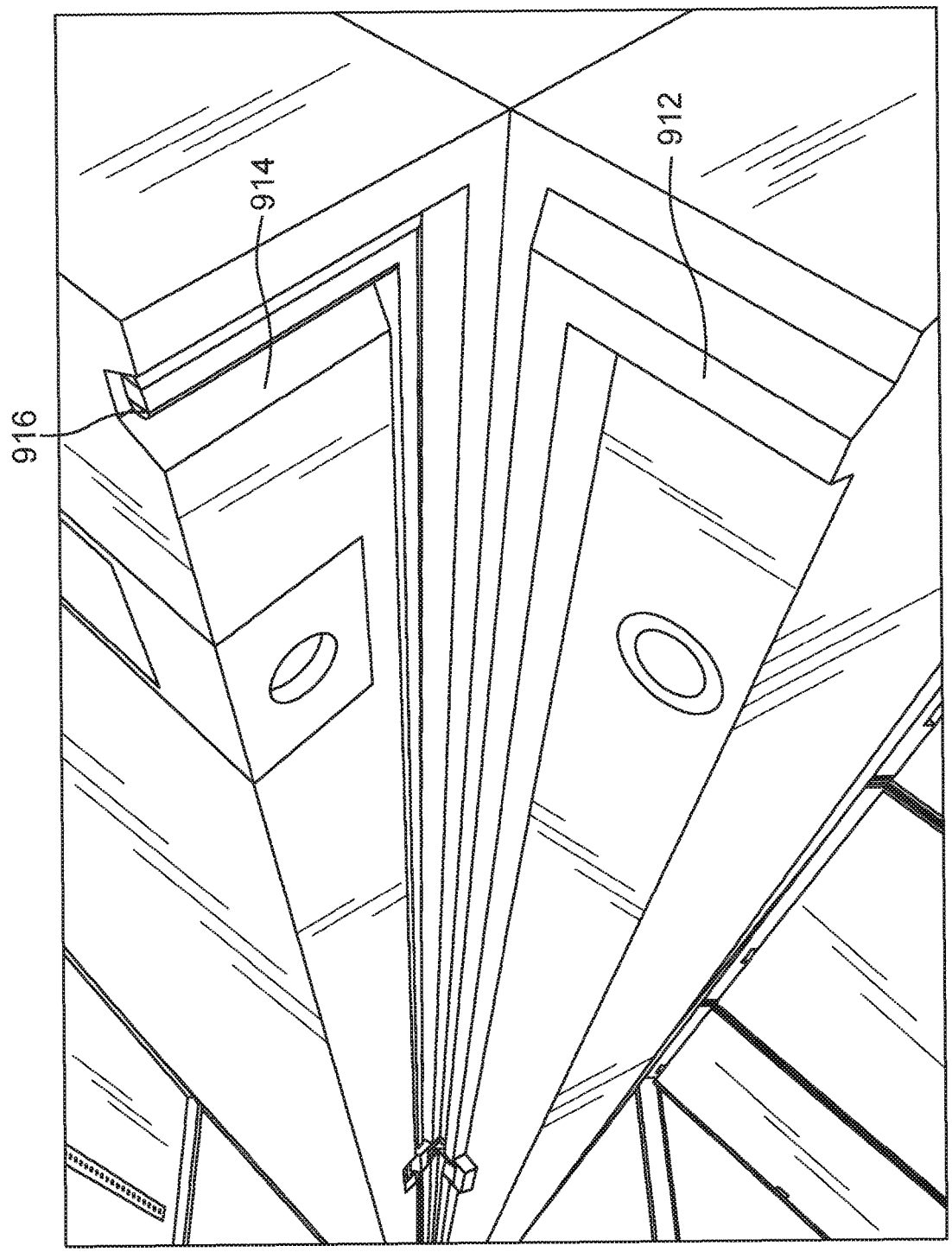
FIG. 35 shows a detail view of one embodiment of tongue and groove joints that may be used to connect sections of a collapsible shelter.

The edges of the bi-fold wall panel sections, roof sections, floor sections, mid-section connectors and front and rear wall panel sections may have weather stripping or gaskets between some or all of the joints, creating a weathertight enclosure in an open/expanded configuration or a weathertight case in a closed/collapsed configuration as previously discussed elsewhere. In some cases, the edges of the wall panels, roof sections, floor sections, mid-section connectors and front and rear wall panels may also benefit from having tongue and groove joints, (e.g., components 912 and 914, as shown in FIG. 35). These joints may further improve the weather tightness between all of the panels, sections or components. A tongue 912 on one panel edge may match a groove 914 in an adjoining panel edge, or adjoining edge of a roof section, floor section or mid-section connector. The tongue and groove joints between the roof, mid-section connector (if used), and floor may match each other in a closed/collapsed shelter/camper and may match the tongue and groove joints in adjoining wall panel sections, in an open/expanded shelter/camper. Weather stripping and gaskets 916 may also be used between a tongue 912 and a groove 916, which may further improve weather tightness.

The above apparatuses, devices, components, systems, assemblies, methods, etc. have generally been described as being applied to a portable shelter or camper and its components; however, the principles described may be applied to other types of shelters (e.g., a permanent, stationary, emergency, or medical shelter), apparatuses, devices, components, systems, assemblies, methods, etc. Further, the features described in one embodiment herein may generally be combined with features described in other embodiments herein.

While the apparatuses, devices, components, systems, assemblies, methods, etc. of this invention may have been described in terms of particular variations and illustrative figures, it will be apparent to those skilled in the art that the invention is not so limited and that variations may be applied to other shelters, apparatuses, devices, components, systems, assemblies, methods, etc. For example, with respect to the methods, uses, and/or steps described herein variations may occur in the steps, uses, the sequence/order of steps, etc. described herein without departing from the concept, spirit, and scope of the invention, as defined by the claims.

Additionally, certain of the steps may be performed concurrently in a parallel process when possible, as well as performed sequentially as described above. Likewise, the dimensions described herein may be viewed as illustrative of preferred embodiments, but are not intended to limit the scope of the invention. Therefore, to the extent there are variations of the invention which are within the spirit of the disclosure or equivalent to the inventions found in the claims, it is the intent that this patent will cover those variations as well.

What is claimed is:

1. A shelter comprising:
a roof section;
two bi-fold side wall panels that are rigid;
a front wall panel;
a rear wall panel;
a floor section; and
a bed system,
wherein the shelter is transitionable between an expanded configuration in which the two bi-fold side wall panels, front wall panel, and rear wall panel are vertical and perpendicular to the floor section and a collapsed configuration in which the two bi-fold side wall panels are folded and fully enclosed in an interior of the shelter; and
wherein the shelter is lockable in the collapsed configuration such that a horizontal surface of the floor section abuts a horizontal surface of the roof section to form a horizontal seal and maintain a weather tight enclosed configuration.

2. The shelter of claim 1, wherein the two bi-fold side wall panels are two upper bi-fold side wall panels, and wherein the shelter further comprises two lower bi-fold side wall panels.

3. The shelter of claim 1, wherein the bed system further comprises a mattress platform.

4. The shelter of claim 1 wherein the two bi-fold side wall panels each contain a window.

5. The shelter of claim 1 further comprising an internal kitchenette.

6. The shelter of claim 1 further comprising an internal bathroom.

7. The shelter of claim 1 wherein the roof section includes a solar panel.

8. The shelter of claim 7 wherein the solar panel continues to operate in the expanded configuration or in the collapsed configuration.

9. The shelter of claim 1 wherein the front wall panel includes a door.

10. The shelter of claim 1 wherein in the collapsed configuration, the shelter is less than 24 inches tall.

11. The shelter of claim 10 wherein in the expanded configuration, the shelter is greater than 6 feet tall.

12. The shelter of claim 1 wherein the shelter is lockable such that a person may not enter the shelter when locked.

13. The shelter of claim 1 wherein the shelter is lockable such that a person may not transition the shelter from the collapsed configuration to the expanded configuration when locked in the collapsed configuration.

14. The shelter of claim 1 wherein the shelter is dimensioned such that it may be transported on the roof of a car while in the collapsed configuration.

15. The shelter of claim 1 wherein the floor section's length and width matches or is equivalent to the roof section's length and width.

16. The shelter of claim 1 wherein the upper bi-fold side panels and the lower bi-fold side wall panels are separated by a connector.

17. A shelter comprising:
a roof;
two rigid foldable side wall panels;
a front wall panel;
a rear wall panel;
a floor;
wherein the shelter is transitionable between an expanded configuration in which the two side wall panels, front wall panel, and rear wall panel are substantially vertically oriented with respect to the floor and a collapsed configuration in which the two side wall panels are folded and enclosed in a weather tight enclosure formed by the roof and floor;
wherein the shelter is lockable in the collapsed configuration such that a horizontal surface of the floor abuts a horizontal surface of the roof to form a horizontal seal and maintain a weather tight enclosed configuration; and
wherein the side wall panels are directly attached to the floor.

18. The shelter of claim 17 wherein in the expanded configuration, the shelter is between approximately 6 feet and approximately 8 feet tall.

19. The shelter of claim 17 further comprising a bed system, wherein the bed system is configured such that it can be raised or lowered to different positions within the shelter in the expanded configuration.

20. The shelter of claim 17 wherein the roof section includes a solar panel.

21. The shelter of claim 17 wherein the solar panel continues to operate in the expanded configuration or in the collapsed configuration.

22. A shelter comprising:
a roof;
two rigid foldable side wall panels;
a front wall panel;
a rear wall panel;
a floor;
wherein the shelter is transitionable between an expanded configuration in which the two side wall panels, front wall panel, and rear wall panel are substantially vertically oriented with respect to the floor and a collapsed configuration in which the two side wall panels are folded and fully enclosed in an interior of the shelter; wherein the side wall panels are directly attached to the floor; and wherein the shelter is lockable in the collapsed configuration such that a horizontal surface of the floor abuts a horizontal surface of the roof to form a horizontal seal and maintain a weather tight enclosed configuration;
and
means for making the shelter in the expanded configuration weather tight.

23. The shelter of claim 22 wherein each of the side wall panels are affixed to at least one of the floor and the roof in both the collapsed and expanded configurations, and wherein each of the front wall panel and the rear wall panel are affixed to at least one of the floor and the roof in both the collapsed and expanded configurations.

24. The shelter of claim 22 wherein the floor section's length and width matches or is equivalent to the roof section's length and width.

25. The shelter of claim 22 wherein the roof section includes a solar panel.

26. The shelter of claim 22 wherein the solar panel continues to operate in the expanded configuration or in the collapsed configuration.

\* \* \* \* \*